United States Patent
Wipf et al.

(10) Patent No.: US 12,486,231 B2
(45) Date of Patent: Dec. 2, 2025

(54) TARGETED NITROXIDE COMPOUNDS AND THEIR USE IN TREATING FERROPTOSIS-RELATED DISEASES

(71) Applicant: University of Pittsburgh—Of the Commonwealth System of Higher Education, Pittsburgh, PA (US)

(72) Inventors: Peter Wipf, Pittsburgh, PA (US); Taber Sarah Maskrey, Pittsburgh, PA (US); Matthew G. LaPorte, Seven Fields, PA (US); Manwika Charaschanya, San Diego, CA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 833 days.

(21) Appl. No.: 17/629,960

(22) PCT Filed: Jul. 27, 2020

(86) PCT No.: PCT/US2020/043682
§ 371 (c)(1),
(2) Date: Jan. 25, 2022

(87) PCT Pub. No.: WO2021/021699
PCT Pub. Date: Feb. 4, 2021

(65) Prior Publication Data
US 2022/0259149 A1    Aug. 18, 2022

Related U.S. Application Data

(60) Provisional application No. 62/879,001, filed on Jul. 26, 2019.

(51) Int. Cl.
*C07D 211/94* (2006.01)
*C07D 405/12* (2006.01)

(52) U.S. Cl.
CPC .......... *C07D 211/94* (2013.01); *C07D 405/12* (2013.01)

(58) Field of Classification Search
CPC ............................ C07D 211/94; C07D 405/12
See application file for complete search history.

(56) References Cited

U.S. PATENT DOCUMENTS

| | | | |
|---|---|---|---|
| 7,528,174 B2 | 5/2009 | Wipf et al. | |
| 7,718,603 B1 | 5/2010 | Wipf et al. | |
| 8,487,079 B2 | 7/2013 | Fink et al. | |
| 9,006,186 B2 | 4/2015 | Wipf et al. | |
| 9,217,000 B2 * | 12/2015 | Wipf | C07D 211/94 |
| 2010/0035869 A1 | 2/2010 | Wipf et al. | |

FOREIGN PATENT DOCUMENTS

| | | |
|---|---|---|
| WO | 2010009389 A1 | 1/2010 |
| WO | 2010009405 A2 | 1/2010 |
| WO | 2010141824 A2 | 12/2010 |
| WO | 2012068081 A1 | 5/2012 |
| WO | 2012112851 A2 | 8/2012 |
| WO | 2016075330 A1 | 5/2016 |
| WO | 2016200934 A1 | 12/2016 |
| WO | 2017193000 A1 | 11/2017 |
| WO | 2018071761 A1 | 4/2018 |

OTHER PUBLICATIONS

Krainz et al., ACS Cent Sci. (2016) vol. 2(9) pp. 653-659.*
Frantz et al. Organic Letters (2011), 13(9), 2318-2321.*
Jiang et al., "Structural Requirements for Optimized Delivery, Inhibition of Oxidative Stress, and Antiapoptotic Activity of Targeted Nitroxides", The Journal of Pharmacology and Experimental Therapeutics, 2007, pp. 1050-1060, vol. 320:3.
Krainz et al., "A Mitochondrial-Targeted Nitroxide Is a Potent Inhibitor of Ferroptosis", ACS Central Science, 2016, pp. 653-659, vol. 2.
Li et al., "Inhibition of neuronal ferroptosis protects hemorrhagic brain", JCI Insight, 2017, pp. 1-19. vol. 2:7.
Li et al., "Activation of Glutathione Peroxidase 4 as a Novel Anti-inflammatory Strategy", Frontiers in Pharmacology, 2018, pp. 1-12, vol. 9.
Li et al., "Ferroptosis: past, present and future", Cell Death & Disease, 2010, pp. 1-13, vol. 11:88.
Patani et al., "Bioisosterism: A Rational Approach in Drug Design", Chemical Reviews, 1996, pp. 3147-3176, vol. 96.
Stockwell et al., "Ferroptosis: a regulated cell death nexus linking metabolism, redox biology, and disease", Cell, 2017, pp. 273-285, vol. 171:2.
Yang et al., "Ferroptosis: death by lipid peroxidation", Trends Cell Biol., 2016, pp. 165-176, vol. 26:3.

* cited by examiner

*Primary Examiner* — Paul V Ward
(74) *Attorney, Agent, or Firm* — The Webb Law Firm

(57) ABSTRACT

Provided herein are compounds useful in the prevention or treatment of ferroptosis in a patient, and methods of preventing or treating ferroptosis, or a treating a condition or disease associated with ferroptosis, such as a patient having a neurodegenerative disease, traumatic brain injury, acute kidney disease, liver injury, ischemia/reperfusion injury, ischemic stroke, intracerebral hemorrhage, liver fibrosis, diabetes, acute myeloid leukemia, age-related macular degeneration, psoriasis, a hemolytic disorder, or an inflammatory disease.

16 Claims, 8 Drawing Sheets

TARGETED NITROXIDE COMPOUNDS AND THEIR USE IN TREATING FERROPTOSIS-RELATED DISEASES

CROSS REFERENCE TO RELATED APPLICATIONS

This application is the United States national phase of International Application No. PCT/US2020/043682 filed Jul. 27, 2020, and claims the benefit of U.S. Provisional Patent Application No. 62/879,001 filed Jul. 26, 2019, the disclosures of which are hereby incorporated by reference in their entirety.

STATEMENT REGARDING FEDERAL FUNDING

This invention was made with government support under Grant No. HDTRA1-16-1-0041, awarded by the Department of Defense. The government has certain rights in the invention.

The conceptualization of ferroptosis has prompted discoveries of small molecules and mechanisms that modulate this cell death pathway with the recognition that targeting ferroptosis is increasingly relevant to numerous diseases. An early mechanism established was centered around glutathione peroxidase (Gpx4), an enzyme that uses glutathione to protect cells against oxidative damage and dysfunction by eliminating lipid peroxides (i.e., via innate conversion of Lipid-OOH to Lipid-OH). Studies that involve Gpx4 inhibition either through small molecules (e.g., RSL3) or genetic deletion were shown to induce ferroptosis. Similarly, this oxidative lipid-damage cell death phenotype, ferroptosis, was also shown to be triggered via depletion of glutathione (GSH) through inhibition of the cystine/glutamate antiporter xc-system (e.g., erastin). These findings established the Gpx4-GSH-cysteine axis as a central regulator of ferroptosis. More recently, other anti-ferroptotic regulators, f. ex. FSP1, have been discovered that also involve lipid peroxyl radicals in their mechanism of action.

There is growing evidence that underlying degenerative diseases in various tissues is a hallmark of ferroptosis, particularly the imbalance between production and dissipation of lipid peroxides due to insufficient cellular defenses. Accordingly, cytoprotection strategies targeting ferroptosis have gained attention. In this regard, radical-trapping antioxidants (RTAs) emerged as promising inhibitors. There is a need for the design of small molecule antioxidants because these molecules can guide new opportunities in pharmaceutical interventions. Some aspects of antioxidant cytoprotection have been known since the 1960-1970's, wherein vitamin E (e.g., α-tocopherol) revealed protective effects against carbon tetrachloride hepatotoxicity and death induced by lack of glutathione and cysteine in cell culture. As nature's premier antioxidant, vitamin E is commonly employed as a chemical probe to rescue such forms of oxidative death. Besides iron chelators such as phenols that prevent ferroptosis, arylamines such as ferrostatin-1 and liproxstatin-1 are described as potent RTAs. The non-iron chelating RTAs undergo hydrogen atom transfer with peroxyl radicals, ultimately decreases accumulation of lipid peroxides and preventing the ferroptosis process. Autoxidation is a key process that contributes to cellular lipid peroxidations, therefore compounds that trap peroxyl radicals to prevent radical chain propagation are rationalized as effective ferroptosis inhibitors.

Two mitochondrial-targeting peptide nitroxide conjugates, XJB-5-131 and JP4-039 (FIG. 1), revealed that protection of mitochondrial lipids is sufficient for the prevention of ferroptosis (See, Krainz, T.; et al. A Mitochondrial-Targeted Nitroxide is a Potent Inhibitor of Ferroptosis. ACS Central Science 2016, 2 (9), 653-659).

Despite successes with XJB-5-131 and JP4-039, more potent compounds are desired, as well as structurally varied analogs that are only accessible with modified synthetic approaches.

SUMMARY

In one aspect or embodiment of the present invention, a compound is provided having the structure:

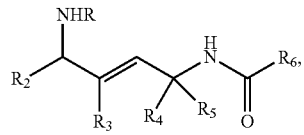

wherein,

R is H or an acyl group, such as —C(O)XR$_1$, where R$_1$ is (C$_1$-C$_6$)alkyl (e.g., isobutyl or 2-methylpropyl) or (C$_3$-C$_8$)cycloalkyl, optionally-substituted with phenyl, substituted phenyl, heteroaryl, or substituted heteroaryl, and X is —NH, —O—, or is not present;

R$_2$ is (C$_1$-C$_6$)alkyl (e.g., isobutyl or 2-methylpropyl) or (C$_3$-C$_8$)cycloalkyl, optionally-substituted with phenyl, substituted phenyl, heteroaryl, or substituted heteroaryl or phenyl, optionally substituted with, independently, 1, 2, or 3 Cl or F atoms:

R$_3$ is H or C$_1$-C$_4$ alkyl, such as methyl, ethyl, or propyl, optionally-substituted with phenyl, substituted phenyl, heteroaryl, or substituted heteroaryl;

R$_4$ and R$_6$ are, independently, H, (C$_1$-C$_6$)alkyl or (C$_3$-C$_6$)cycloalkyl, optionally substituted with a monovalent or divalent benzyl group (—C$_6$H$_4$— or —C$_6$H$_5$) that is optionally substituted with 1, 2, or 3 F or Cl atoms, or R$_4$ and R$_6$ together form a cycloalkyl ring or a heterocycloalkyl ring comprising one O, S, or N atom, such as a cycloalkyl ring of 3, 4, 5, 6, 7, or 8 carbons, or a tetrahydropyran ring;

R$_6$ is optionally substituted —NH—R$_7$, —OR$_7$, or —R$_7$, wherein R$_7$ is a nitroxide-containing group; and the double bond is cis or trans configured, or a pharmaceutically-acceptable salt thereof, including stereoisomers thereof and mixtures of stereoisomers thereof.

According to another aspect or embodiment of the present invention, a compound is provided having the structure:

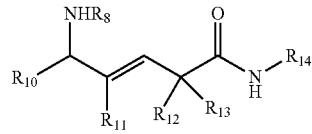

wherein,

R$_8$ is an acyl group, such as —C(O)XR$_9$, where R$_9$ is (C$_1$-C$_6$)alkyl (e.g., isobutyl or 2-methylpropyl) or (C$_3$-C$_6$)cycloalkyl, optionally-substituted with phenyl, substituted phenyl, heteroaryl, or substituted heteroaryl, and X is —NH, —O—, or is not present;

$R_{10}$ is $(C_1\text{-}C_6)$alkyl (e.g., isobutyl or 2-methylpropyl) or $(C_3\text{-}C_6)$cycloalkyl, optionally-substituted with phenyl, substituted phenyl, heteroaryl, or substituted heteroaryl, or phenyl, optionally substituted with, independently, 1, 2, or 3 Cl or F atoms;

$R_{11}$ is H or $C_1\text{-}C_4$ alkyl, such as methyl, ethyl, or propyl, optionally-substituted with phenyl, substituted phenyl, heteroaryl, or substituted heteroaryl;

$R_{12}$ and $R_{13}$ are, independently, $(C_1\text{-}C_6)$alkyl or $(C_3\text{-}C_8)$ cycloalkyl, optionally substituted with a monovalent or divalent benzyl group (—$C_6H_4$— or —$C_6H_5$) that is optionally substituted with 1, 2, or 3 F or Cl atoms, or $R_{12}$ and $R_{13}$ together form a cycloalkyl ring or a heterocycloalkyl ring comprising one O, S, or N atom, such as a cycloalkyl ring of 3, 4, 5, 6, 7, or 8 carbons, or a tetrahydrofuran or tetrahydropyran ring;

$R_{14}$ is optionally substituted —NH—$R_{15}$, —O$R_{15}$, or —$R_{15}$, wherein $R_{15}$ is a nitroxide-containing group; and the double bond is cis or trans configured, or a pharmaceutically-acceptable salt thereof, including stereoisomers thereof and mixtures of stereoisomers thereof.

In another aspect or embodiment, a composition, such as a pharmaceutical composition, is provided, comprising a compound according to the previous paragraphs, and a pharmaceutically-acceptable excipient.

In another aspect or embodiment, a drug product, dosage form, or unit dose, is provided, comprising a compound according to the previous paragraphs, and a pharmaceutically-acceptable excipient.

In yet another aspect or embodiment, a method of treating or preventing ferroptosis in a patient in need thereof is provided. The method comprises administering to the patient an amount of a compound as described herein, effective to reduce or prevent ferroptosis in a cell or patient, thereby reducing ferroptosis in the cell or patient.

The following numbered clauses outline various non-limiting aspects and/or embodiments of the present invention.

Clause 1. A compound having the structure:

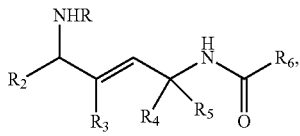

wherein,

R is H or an acyl group, such as —C(O)X$R_1$, where $R_1$ is $(C_1\text{-}C_6)$alkyl (e.g., isobutyl or 2-methylpropyl) or $(C_3\text{-}C_8)$cycloalkyl, optionally-substituted with phenyl, substituted phenyl, heteroaryl, or substituted heteroaryl, and X is —NH, —O—, or is not present;

$R_2$ is $(C_1\text{-}C_6)$alkyl (e.g., isobutyl or 2-methylpropyl) or $(C_3\text{-}C_6)$cycloalkyl, optionally-substituted with phenyl, substituted phenyl, heteroaryl, or substituted heteroaryl or phenyl, optionally substituted with, independently, 1, 2, or 3 Cl or F atoms;

$R_3$ is H or $(C_1\text{-}C_4)$alkyl, such as methyl, ethyl, or propyl, optionally-substituted with phenyl, substituted phenyl, heteroaryl, or substituted heteroaryl;

$R_4$ and $R_5$ are, independently, H, $(C_1\text{-}C_6)$alkyl or $(C_3\text{-}C_6)$ cycloalkyl, optionally substituted with a monovalent or divalent benzyl group (—$C_6H_4$— or —$C_6H_5$) that is optionally substituted with 1, 2, or 3 F or Cl atoms, or $R_4$ and $R_5$ together form a cycloalkyl ring or a heterocycloalkyl ring comprising one O, S, or N atom, such as a cycloalkyl ring of 3, 4, 5, 6, 7, or 8 carbons, or a tetrahydrofuran or tetrahydropyran ring;

$R_6$ is optionally substituted —NH—$R_7$, —O$R_7$, or —$R_7$, wherein $R_7$ is a nitroxide-containing group; and the double bond is cis or trans configured, or a pharmaceutically-acceptable salt thereof, including stereoisomers thereof and mixtures of stereoisomers thereof.

Clause 2. The compound of clause 1, wherein the double bond is trans configured.

Clause 3. The compound of clause 1 or 2, having the structure:

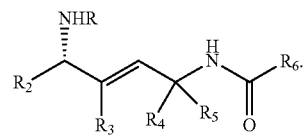

Clause 4. The compound of any one of clauses 1-3, wherein $R_7$ is:

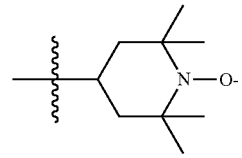 [SMILES: *C1CC(C)(C)N([O-])C(C)(C)C1]

(2,2,6,6-tetramethylpiperidin-N-oxyl).

Clause 5. The compound of any one of clauses 1-4, wherein, R is 9-fluorenylmethyloxy carbonyl (Fmoc), t-butyloxycarbonyl (Boc), benzhydryloxycarbonyl (Bhoc), benzyloxycarbonyl (Cbz), O-nitroveratryloxycarbonyl (Nvoc), benzyl (Bn), allyloxycarbonyl (alloc), trityl (Trt), 1-(4,4-dimethyl-2,6-dioxacyclohexylidene) ethyl (Dde), diathiasuccinoyl (Dts), benzothiazole-2-sulfonyl (Bts), dimethoxytrityl (DMT), or monomethoxytrityl (MMT).

Clause 6. The compound of clause 5, wherein R is Boc.

Clause 7. The compound of any one of clauses 1-6, wherein $R_4$ and $R_5$ together form a cycloalkyl ring or a heterocycloalkyl ring comprising one O, S, or N atom.

Clause 8. The compound of clause 7, wherein $R_4$ and $R_5$ together form a cyclopropyl, cyclobutyl, cyclopentyl, tetrahydrofuranyl ortetrahydropyranyl ring.

Clause 9. The compound of any one of clauses 1-6, wherein $R_4$ and $R_5$ are both methyl.

Clause 10. The compound of any one of clauses 1-9, wherein $R_3$ is H.

Clause 11. The compound of any one of clauses 1-10, wherein $R_2$ is $C_1\text{-}C_4$ alkyl.

Clause 12. The compound of clause 11, wherein $R_2$ is 2-methylpropyl.

Clause 13. The compound of any one of clauses 1-6, wherein one or both of $R_4$ and $R_5$ is H.

Clause 14. The compound of clause 1 having a structure:

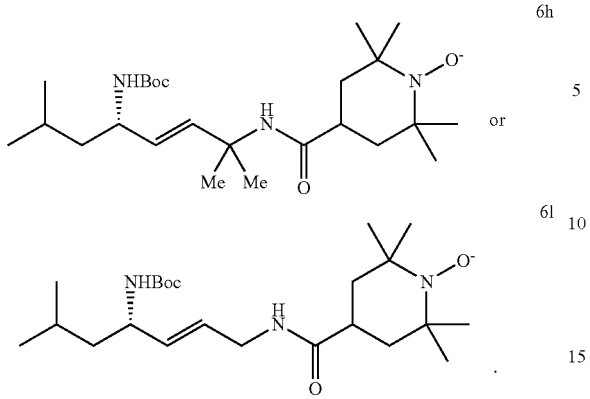

Clause 15. The compound of clause 1, comprising one or more substituted group, wherein each substituent of the one or more substituted groups is, independently, F, Cl, or (C$_1$-C$_6$)alkyl, (C$_1$-C$_6$)alkoxyl, (C$_3$-C$_8$)cycloalkyl, or (C$_2$-C$_7$)cycloether optionally substituted with a monovalent or divalent benzyl group (—C$_6$H$_4$— or —C$_6$H$_5$) that is optionally substituted with 1, 2, or 3 F or Cl atoms.

Clause 16. A compound having the structure:

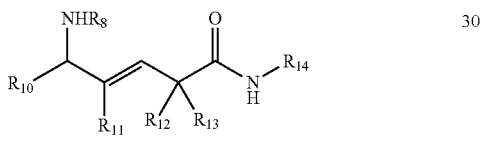

wherein,

R$_8$ is H or an acyl group, such as —C(O)XR$_9$, where R$_9$ is (C$_1$-C$_6$)alkyl (e.g., isobutyl or 2-methylpropyl) or (C$_3$-C$_8$)cycloalkyl, optionally-substituted with phenyl, substituted phenyl, heteroaryl, or substituted heteroaryl, and X is —NH, —O—, or is not present;

R$_{10}$ is (C$_1$-C$_6$)alkyl (e.g., isobutyl or 2-methylpropyl) or (C$_3$-C$_8$)cycloalkyl, optionally-substituted with phenyl, substituted phenyl, heteroaryl, or substituted heteroaryl, or phenyl, optionally substituted with, independently, 1, 2, or 3 Cl or F atoms;

R$_{11}$ is H or C$_1$-C$_4$ alkyl, such as methyl, ethyl, or propyl, optionally-substituted with phenyl, substituted phenyl, heteroaryl, or substituted heteroaryl;

R$_{12}$ and R$_{13}$ are, independently, (C$_1$-C$_6$)alkyl or (C$_3$-C$_8$) cycloalkyl, optionally substituted with a monovalent or divalent benzyl group (—C$_6$H$_4$— or —C$_6$H$_5$) that is optionally substituted with 1, 2, or 3 F or Cl atoms, or R$_{12}$ and R$_{13}$ together form a cycloalkyl ring or a heterocycloalkyl ring comprising one O, S, or N atom, such as a cycloalkyl ring of 3, 4, 5, 6, 7, or 8 carbons, tetrahydrofuran or a tetrahydropyran ring;

R$_{14}$ is optionally substituted —NH—R$_{15}$, —OR$_{15}$, or —R$_{15}$, wherein R$_{15}$ is a nitroxide-containing group; and the double bond is cis or trans configured, or a pharmaceutically-acceptable salt thereof, including stereoisomers thereof and mixtures of stereoisomers thereof.

Clause 17. The compound of clause 16, wherein the double bond is trans configured.

Clause 18. The compound of clause 16 or 17, having the structure:

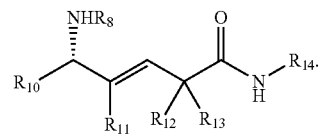

Clause 19. The compound of any one of clauses 16-18, wherein R$_{15}$ is:

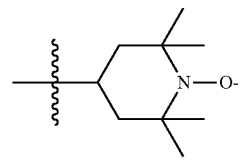

(2,2,6,6-tetramethylpiperidin-N-oxyl).

Clause 20. The compound of any one of clauses 16-19, wherein, R$_8$ is 9-fluorenylmethyloxy carbonyl (Fmoc), t-butyloxycarbonyl (Boc), benzhydryloxycarbonyl (Bhoc), benzyloxycarbonyl (Cbz), O-nitroveratryloxycarbonyl (Nvoc), benzyl (Bn), allyloxycarbonyl (alloc), trityl (Trt), I-(4,4-dimethyl-2,6-dioxacyclohexylidene) ethyl (Dde), diathiasuccinoyl (Dts), benzothiazole-2-sulfonyl (Bts), dimethoxytrityl (DMT), or monomethoxytrityl (MMT).

Clause 21. The compound of clause 20, wherein R$_8$ is Boc.

Clause 22. The compound of any one of clauses 16-21, wherein R$_{12}$ and R$_{13}$ together form a cycloalkyl ring or a heterocycloalkyl ring comprising one O, S, or N atom.

Clause 23. The compound of clause 33, wherein R$_{12}$ and R$_{13}$ together form a cyclopropyl, cyclobutyl, cyclopentyl, tetrahydrofuranyl ortetrahydropyranyl ring.

Clause 24. The compound of any one of clauses 16-21, wherein R$_{12}$ and R$_{13}$ are both methyl.

Clause 25. The compound of any one of clauses 16-24, wherein R$_{11}$ is H.

Clause 26. The compound of any one of clauses 26-25, wherein R$_{10}$ is (C$_1$-C$_4$)alkyl.

Clause 27. The compound of clause 26, wherein R$_{10}$ is 2-methylpropyl or phenyl.

Clause 28. The compound of clause 16, having a structure:

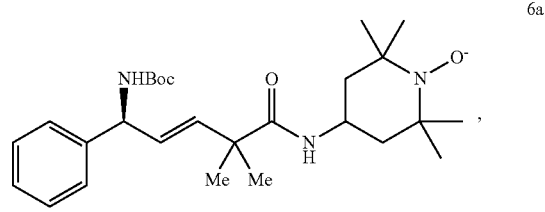

Clause 29. The compound of clause 16, comprising one or more substituted group, wherein each substituent of the one or more substituted groups is, independently, F, Cl, or ($C_1$-$C_6$)alkyl, ($C_1$-$C_6$)alkoxyl, ($C_3$-$C_8$)cycloalkyl, or ($C_2$-$C_7$)cycloether optionally substituted with a monovalent or divalent benzyl group (—$C_6H_4$— or —$C_6H_5$) that is optionally substituted with 1, 2, or 3 F or Cl atoms.

Clause 30. The compound of any one of claims 1-29 in the form of a pharmaceutically-acceptable salt.

Clause 31. A composition comprising a compound as described in any one of clauses 1-30, and a pharmaceutically-acceptable excipient.

Clause 32. A drug product, comprising a compound as described in any one of clauses 1-29.

Clause 33. A method of treating or preventing ferroptosis in a patient in need thereof, comprising administering to the patient an amount of a compound of any one of clauses 1-30 effective to reduce or prevent ferroptosis in a cell or patient, thereby reducing ferroptosis in the cell or patient.

Clause 34. The method of clause 33, wherein the patient has a neurodegenerative disease.

Clause 35. The method of clause 34, wherein the neurodegenerative disease is Alzheimer's disease, Parkinson's disease, Huntington's disease, amyotrophic lateral sclerosis, Friedreich's ataxia, or periventricular leukomalacia.

Clause 36. The method of clause 33, wherein the patient has traumatic brain injury, acute kidney disease, liver injury, ischemia/reperfusion injury, ischemic stroke, intracerebral hemorrhage, liver fibrosis, diabetes, acute myeloid leukemia, age-related macular degeneration, psoriasis, a hemolytic disorder, or an inflammatory disease.

NH$_3$.MeOH, 60° C., 5 days; (e) PIFA, pyridine, MeCN:H$_2$O, rt, 48 h; (f) PIFA, pyridine, dioxane:H$_2$O, 4-12 h; (g) 4-carboxyTEMPO, DMAP, HOBT.H$_2$O, EDC.HCl, CH$_2$Cl$_2$, rt, 44-144 h.

Figure 7:
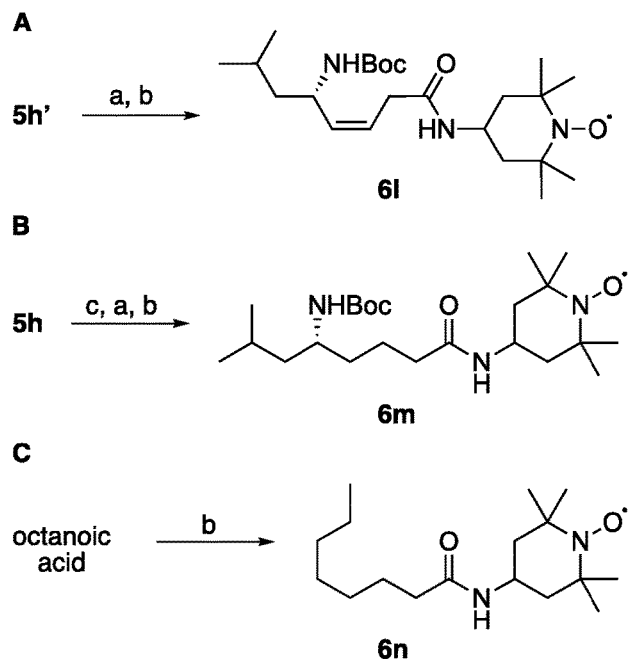

FIG. 7 depicts synthesis Scheme 4 A, B, and C. Reagents and conditions: (A) (a) 1 M LiOH, THF, rt, 4 h; (b) 4-amino-TEMPO, DMAP, HOBT.H$_2$O, EDC.HCl, CH$_2$Cl$_2$, rt, 24 h. (B) (c) Pd/C, H$_2$, MeOH, 14 h. (C) (b) 4-amino-TEMPO, DMAP, HOBT.H$_2$O, EDC.HCl, CH$_2$Cl$_2$, rt, 20 h.

Figure 8:
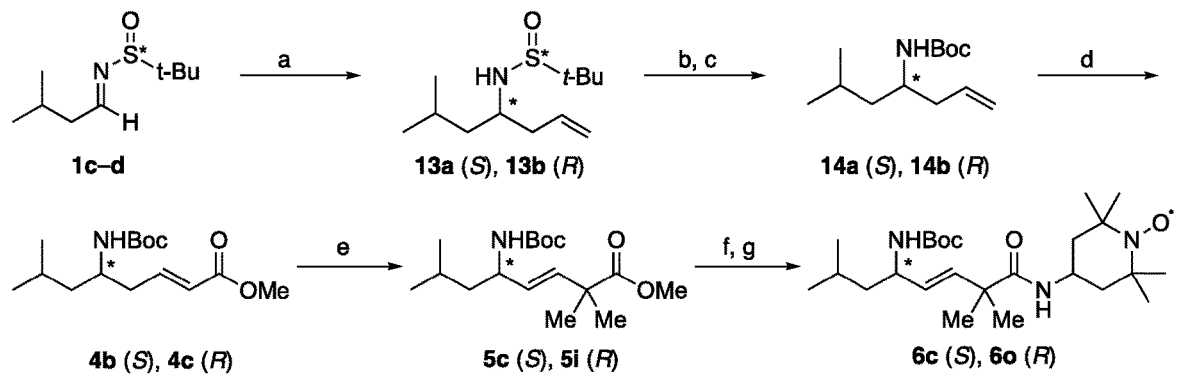
Figure 8:
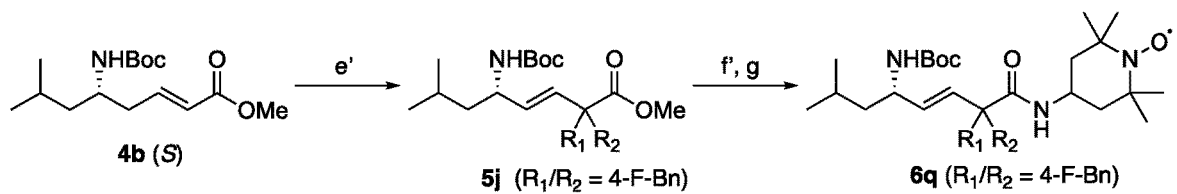

FIG. 8 depicts synthesis Scheme 5. Reagents and conditions: (a) allyl bromide, In powder, aq. sat. NaBr, rt, 14 h; (b) HCl.dioxane, Et$_2$O, rt, 1-2 h; (c) Boc$_2$O, TEA, CH$_2$Cl$_2$, rt, 20-24; (d) methyl acrylate, Hoveyda-Grubbs II, CH$_2$Cl$_2$, reflux; (e) LDA, DMPU, THF, MeI −78° C. to −40° C., 3-4 h; (e') LDA, DMPU, THF, 4-F-benzylbromide, −78° C. to rt, 18-24 h; (f) 1 M LiOH, THF, rt, 4 h; (f') KOH, MeOH/THF/H$_2$O, reflux, 12-18 h; (g) 4-amino-TEMPO, DMAP, HOBT.H$_2$O, EDC.HCl, CH$_2$Cl$_2$, rt, 20 h.

Figure 9:
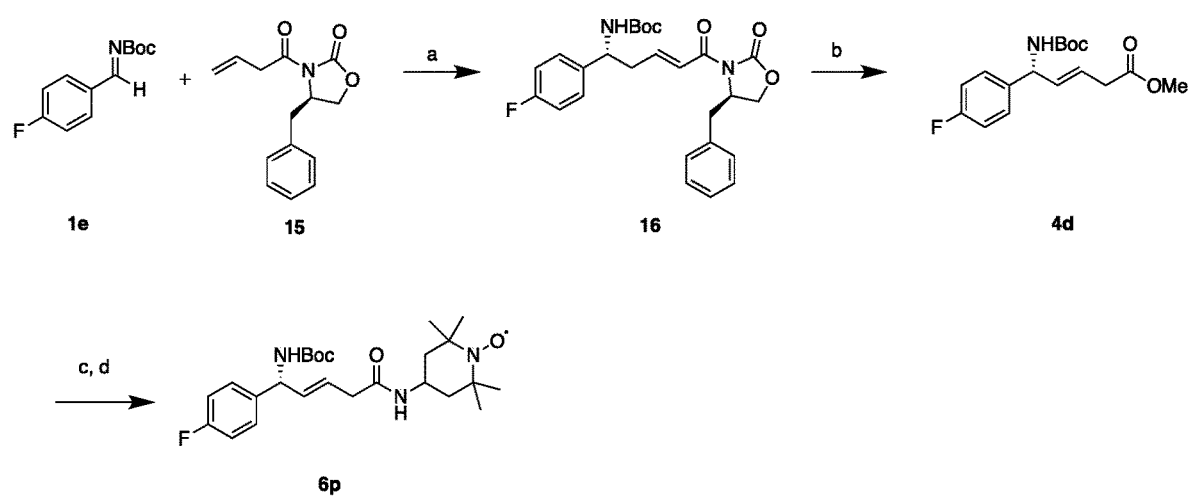

FIG. 9 depicts synthesis Scheme 6. Reagents and conditions: (a) 1e (2.0 equiv), 15 (1.10 mmol, 1.0 equiv), Cu(CH$_3$CN)$_4$PF$_6$ (25 mol %), (S)-DTBM-SEGPHOS (25 mol %), DABCO (50 mol %), THF (0.1 M), −20° C., 5 h, 97:3 dr; (b) LDA, DMPU, THF, MeOH, −78° C., 45 min; (c) 1 M LiOH, THF, rt to 60° C., 25 h; (d) 4-amino-TEMPO, DMAP, HOBT.H$_2$O, EDC.HCl, CH$_2$Cl$_2$, rt, 14.5 h.

DETAILED DESCRIPTION

The use of numerical values in the various ranges specified in this application, unless expressly indicated otherwise, are stated as approximations as though the minimum and maximum values within the stated ranges are both preceded by the word "about". In this manner, slight variations above and below the stated ranges can be used to achieve substantially the same results as values within the ranges. Also, unless indicated otherwise, the disclosure of these ranges is intended as a continuous range including every value between the minimum and maximum values. For definitions provided herein, those definitions also refer to word forms, cognates and grammatical variants of those words or phrases.

As used herein, the terms "comprising," "comprise" or "comprised," and variations thereof, in reference to elements of an item, composition, apparatus, method, process, system, claim etc. are intended to be open-ended, meaning that the item, composition, apparatus, method, process, system, claim etc. includes those elements and other elements can be included and still fall within the scope/definition of the described item, composition, apparatus, method, process, system, claim etc. As used herein, "a" or "an" means one or more. As used herein "another" may mean at least a second or more.

As used herein, the terms "patient" or "subject" refer to members of the animal kingdom, including, but not limited to human beings.

As used herein, "alkyl" refers to straight, branched chain, or cyclic hydrocarbon groups including, for example, from 1 to about 20 carbon atoms, for example and without limitation $C_{1-3}$, $C_{1-6}$, $C_{1-10}$ groups, for example and without limitation, straight, branched chain alkyl groups such as methyl, ethyl, propyl, butyl, pentyl, hexyl, heptyl, octyl, nonyl, decyl, undecyl, dodecyl, and the like. An alkyl group can be, for example, a $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$, $C_{28}$, $C_{29}$, $C_{30}$, $C_{31}$, $C_{32}$, $C_{33}$, $C_{34}$, $C_{35}$, $C_{36}$, $C_{37}$, $C_{38}$, $C_{39}$, $C_{40}$, $C_{41}$, $C_{42}$, $C_{43}$, $C_{44}$, $C_{45}$, $C_{46}$, $C_{47}$, $C_{48}$, $C_{43}$, or $C_{50}$ group that is substituted or unsubstituted. Non-limiting examples of straight alkyl groups include methyl, ethyl, propyl, butyl, pentyl, hexyl, heptyl, octyl, nonyl, and decyl. Branched alkyl groups comprise any straight alkyl group substituted with any number of alkyl groups. Non-limiting examples of branched alkyl groups include isopropyl, isobutyl, sec-butyl, and t-butyl. Non-limiting examples of cyclic alkyl groups include cyclopropyl, cyclobutyl, cyclopentyl, cyclohexyl, cycloheptyl, and cyclooctyl groups. Cyclic alkyl groups also comprise fused-, bridged-, and spiro-bicycles and higher fused-, bridged-, and spiro-systems. A cyclic alkyl group can be substituted with any number of straight, branched, or cyclic alkyl groups. "Substituted alkyl" can include alkyl substituted at 1 or more (e.g., 1, 2, 3, 4, 5, or even 6) positions, which substituents are attached at any available atom to produce a stable compound, with substitution as described herein. "Optionally substituted alkyl" refers to alkyl or substituted alkyl. "Alkylene" and "substituted alkylene" can include divalent alkyl and divalent substituted alkyl, respectively, including, without limitation, methylene, ethylene, trimethylene, tetramethylene, pentamethylene, hexamethylene, hepamethylene, octamethylene, nonamethylene, or decamethylene. "Optionally substituted alkylene" can include alkylene or substituted alkylene.

"Alkene or alkenyl" can include straight, branched chain, or cyclic hydrocarbyl groups including, e.g., from 2 to about 20 carbon atoms, such as, without limitation $C_{2-3}$, $C_{2-6}$, $C_{2-10}$ groups having one or more, e.g., 1, 2, 3, 4, or 5, carbon-to-carbon double bonds. The olefin or olefins of an alkenyl group can be, for example, E, Z, cis, trans, terminal, or exo-methylene. An alkenyl or alkenylene group can be, for example, a $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$, $C_{28}$, $C_{29}$, $C_{30}$, $C_{31}$, $C_{32}$, $C_{33}$, $C_{34}$, $C_{35}$, $C_{36}$, $C_{37}$, $C_{38}$, $C_{39}$, $C_{40}$, $C_{41}$, $C_{42}$, $C_{43}$, $C_{44}$, $C_{45}$, $C_{46}$, $C_{47}$, $C_{48}$, $C_{49}$, or $C_{50}$ group that is substituted or unsubstituted. A halo-alkenyl group can be any alkenyl group substituted with any number of halogen atoms. "Substituted alkene" can include alkene substituted at 1 or more, e.g., 1, 2, 3, 4, or 5 positions, which substituents are attached at any available atom to produce a stable compound, with substitution as described herein. "Optionally substituted alkene" can include alkene or substituted alkene. Likewise, "alkenylene" can refer to divalent alkene. Examples of alkenylene include without limitation, ethylene (—CH═CH—) and all stereoisomeric and conformational isomeric forms thereof. "Substituted alkenylene" can refer to divalent substituted alkene. "Optionally substituted alkenylene" can refer to alkenylene or substituted alkenylene.

"Aryl," alone or in combination refers to an aromatic ring system such as phenyl or naphthyl. "Aryl" also can include aromatic ring systems that are optionally fused with a cycloalkyl ring. A "substituted aryl" is an aryl that is independently substituted with one or more substituents attached at any available atom to produce a stable compound, wherein the substituents are as described herein. The substituents can be, for example, hydrocarbyl groups, alkyl groups, alkoxy groups, and halogen atoms. "Optionally substituted aryl" refers to aryl or substituted aryl. An aryloxy group can be, for example, an oxygen atom substituted with any aryl group, such as phenoxy. An arylalkoxy group can be, for example, an oxygen atom substituted with any aralkyl group, such as benzyloxy. "Arylene" denotes divalent aryl, and "substituted arylene" refers to divalent substituted aryl. "Optionally substituted arylene" refers to arylene or substituted arylene. A "polycyclic aryl group" and related terms, such as "polycyclic aromatic group" refers to a group composed of at least two fused aromatic rings. "Heteroaryl" or "hetero-substituted aryl" refers to an aryl group substituted with one or more heteroatoms, such as N, O, P, and/or S.

"Heteroatom" refers to any atom other than carbon or hydrogen, for example, N, O, P, and S. Compounds that contain N or S atoms can be optionally oxidized to the corresponding N-oxide, sulfoxide or sulfone compounds. "Hetero-substituted" refers to an organic compound in any embodiment described herein in which one or more carbon atoms are substituted with any atom other than carbon or hydrogen, for example, N, O, P, or S. Where a cycloalkyl group is substituted with an O, forming one or more ether groups (—C—O—C) within the ring, the group can be referred to as "cycloether," for example furanyl and tetrahydrofuranyl groups are $C_4$ cycloethers.

"Substituted" or "substitution" refer to replacement of a hydrogen atom of a molecule with one or more atoms or groups (substituents), such as halogen, alkyl, alkoxy, alkylthio, trifluoromethyl, acyloxy, hydroxy, mercapto, carboxy, aryloxy, aryl, arylalkyl, heteroaryl, amino, alkylamino, dialkylamino, morpholino, piperidino, pyrrolidin-1-yl, piperazin-1-yl, nitro, sulfato, or other groups. "Halogen," "halide," and "halo" refers to —F, —Cl, —Br, and/or —I, and "halo-substituted", refers to substitution of one or more atom or group, such as a hydrogen, with a halide. In aspects or embodiments, substituents may be, independently, and without limitation: Cl, F, or ($C_1$-$C_6$)alkyl, ($C_1$-$C_6$)alkoxyl, ($C_3$-$C_8$)cycloalkyl, or ($C_2$-$C_7$)cycloether optionally substituted with a monovalent or divalent benzyl group (—$C_6H_4$— or —$C_6H_5$) that is optionally substituted with 1, 2, or 3 F or Cl atoms.

Compounds are provided herein that have use in preventing or treating ferroptosis-associated diseases in a patient, tissue, or a cell. Pharmaceutically-acceptable salts of any of the described compounds also have use in preventing ferroptosis in a patient, tissue, or cell. Prevention or treating of ferroptosis-associated diseases includes prevention or treatment of ferroptosis associated with any disease or condition in which ferroptosis exists or may exist, e.g., as described elsewhere herein.

In one aspect or embodiment, the compound may be a compound having the structure:

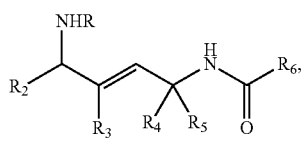

wherein,

R is H or an acyl group, such as —C(O)X$R_1$, where $R_1$ is ($C_1$-$C_6$)alkyl (e.g., isobutyl or 2-methylpropyl) or ($C_3$-$C_8$)cycloalkyl, optionally-substituted with phenyl, substituted phenyl, heteroaryl, or substituted heteroaryl, and X is —NH, —O—, or is not present;

$R_2$ is ($C_1$-$C_6$)alkyl (e.g., isobutyl or 2-methylpropyl) or cycloalkyl, optionally-substituted with phenyl, substituted phenyl, heteroaryl, or substituted heteroaryl or phenyl, optionally substituted with, independently, 1, 2, or 3 Cl or F atoms;

$R_3$ is ($C_1$-$C_6$)alkyl, such as methyl, ethyl, or propyl, optionally-substituted with phenyl, substituted phenyl, heteroaryl, or substituted heteroaryl;

$R_4$ and $R_5$ are, independently, H, ($C_1$-$C_6$)alkyl or ($C_3$-$C_8$)cycloalkyl, optionally substituted with a monovalent or divalent benzyl group (—$C_6H_4$— or —$C_6H_5$) that is optionally substituted with 1, 2, or 3 F or Cl atoms, or $R_4$ and $R_6$ together form a cycloalkyl ring or a heterocycloalkyl ring comprising one O, S, or N atom, such as a cycloalkyl ring of 3, 4, 5, 6, 7, or 8 carbons, or a tetrahydropyran ring;

$R_6$ is optionally substituted —NH—$R_7$, —O$R_7$, or —$R_7$, wherein $R_7$ is a nitroxide-containing group; and the double bond is cis or trans configured, or a pharmaceutically-acceptable salt thereof, including stereoisomers thereof and mixtures of stereoisomers thereof.

The compound may have the structure:

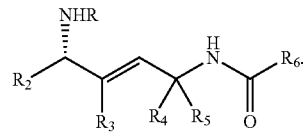

In various aspects or embodiments, $R_7$ can be

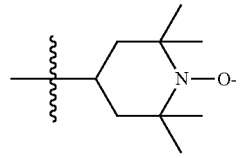 [SMILES: *C1CC(C)(C)N([O-])C(C)(C)C1]

(2,2,6,6-tetramethylpiperidin-N-oxyl), R can be 9-fluorenylmethyloxy carbonyl (Fmoc), t-butyloxycarbonyl (Boc), benzhydryloxycarbonyl (Bhoc), benzyloxycarbonyl (Cbz), O-nitroveratryloxycarbonyl (Nvoc), benzyl (Bn), allyloxycarbonyl (alloc), trityl (Trt), 1-(4,4-dimethyl-2,6-dioxacyclohexylidene)ethyl (Dde), diathiasuccinoyl (Dts), benzothiazole-2-sulfonyl (Bts), dimethoxytrityl (DMT), or monomethoxytrityl (MMT).

The compound can have the structure:

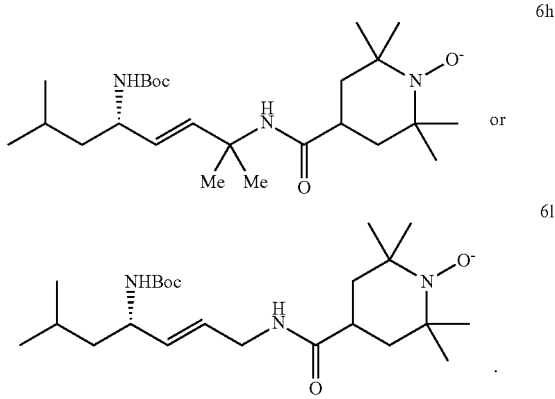

In one aspect or embodiment, the compound may be a compound having the structure:

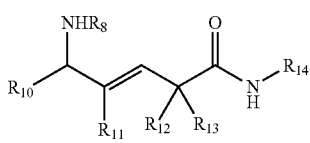

wherein,

- $R_8$ is an acyl group, such as —C(O)$XR_9$, where $R_6$ is ($C_1$-$C_6$)alkyl (e.g., isobutyl or 2-methylpropyl) or ($C_3$-$C_8$)cycloalkyl, optionally-substituted with phenyl, substituted phenyl, heteroaryl, or substituted heteroaryl, and X is —NH—, —O—, or is not present;
- $R_{10}$ is ($C_1$-$C_6$)alkyl (e.g., isobutyl or 2-methylpropyl) or ($C_3$-$C_6$)cycloalkyl, optionally-substituted with phenyl, substituted phenyl, heteroaryl, or substituted heteroaryl, or phenyl, optionally substituted with, independently, 1, 2, or 3 Cl or F atoms;
- $R_{11}$ H or ($C_1$-$C_4$)alkyl, such as methyl, ethyl, or propyl, optionally-substituted with phenyl, substituted phenyl, heteroaryl, or substituted heteroaryl;
- $R_{12}$ and $R_{13}$ are, independently, ($C_1$-$C_6$)alkyl or ($C_3$-$C_6$) cycloalkyl, optionally substituted with a monovalent or divalent benzyl group (—$C_6H_4$— or —$C_6H_5$) that is optionally substituted with 1, 2, or 3 F or Cl atoms, or $R_{12}$ and $R_{13}$ together form a cycloalkyl ring or a heterocycloalkyl ring comprising one O, S, or N atom, such as a cycloalkyl ring of 3, 4, 5, 6, 7, or 8 carbons, or a tetrahydropyran ring;
- $R_{14}$ is optionally substituted —NH—$R_{15}$, —$OR_{15}$, or —$R_{15}$, wherein $R_{15}$ is a nitroxide-containing group; and
- the double bond is cis or trans configured,
- or a pharmaceutically-acceptable salt thereof, including stereoisomers thereof and mixtures of stereoisomers thereof.

In various aspects or embodiments, the double bond b may be in cis or trans configuration, the compound can have the structure:

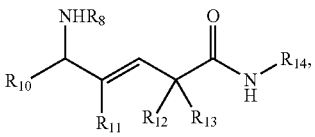

$R_{15}$ can be:

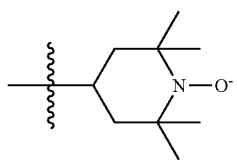 [SMILES: *C1CC(C)(C)N([O-])C(C)(C)C1]

(2,2,6,6-tetramethylpiperidin-N-oxyl), $R_6$ can be 9-fluorenylmethyloxy carbonyl (Fmoc), t-butyloxycarbonyl (Boc), benzhydryloxycarbonyl (Bhoc), benzyloxycarbonyl (Cbz), O-nitroveratryloxycarbonyl (Nvoc), benzyl (Bn), allyloxycarbonyl (alloc), trityl (Trt), 1-(4,4-dimethyl-2,6-dioxacyclohexylidene)ethyl (Dde), diathiasuccinoyl (Dts), benzothiazole-2-sulfonyl (Bts), dimethoxytrityl (DMT), or monomethoxytrityl (MMT), $R_{12}$ and $R_{13}$ together can form a ($C_3$-$C_8$) cycloalkyl ring or a $C_3$-$C_8$ mono-substituted heterocyclic cycloalkyl ring comprising one O, S, or N atom, such as a cyclopropyl, cyclobutyl, cyclopentyl, or tetrahydropyranyl ring, $R_{12}$ and $R_{12}$ are both methyl, $R_{11}$ can be H, or $R_{10}$ can be $C_1$-$C_4$ alkyl, $R_{10}$ can be 2-methylpropyl or phenyl.

In aspects or embodiments, the compound may have the structure:

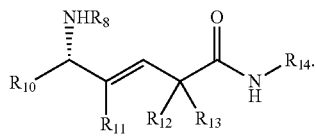

In aspects or embodiments, the compound may have the structure:

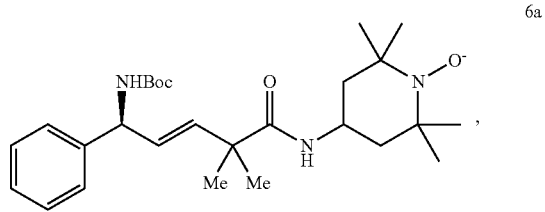

6a

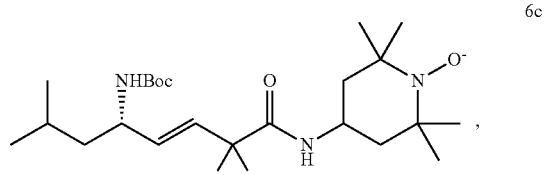

6c

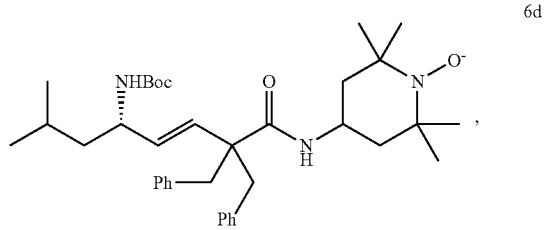

6d

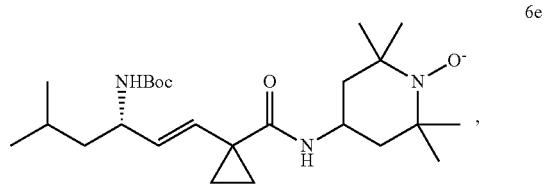

6e

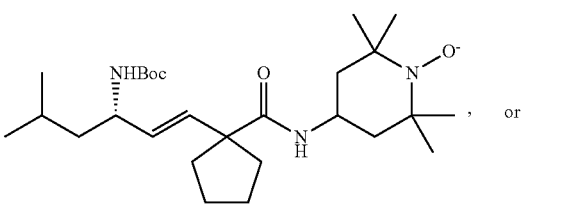

6f

, or

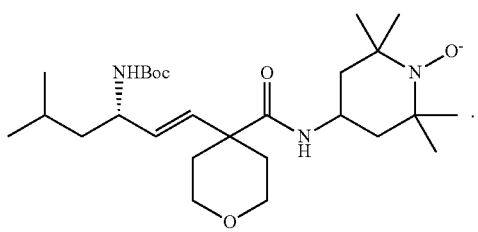

6g

A composition comprising any of the above-described compounds also is provided. The composition is a pharmaceutical composition comprising the compound as described above, in a therapeutically-effective amount, and a pharmaceutically-acceptable excipient. As such, a drug product, dosage form, or unit dosage form comprising the pharmaceutical composition also is provided.

Figure 1:
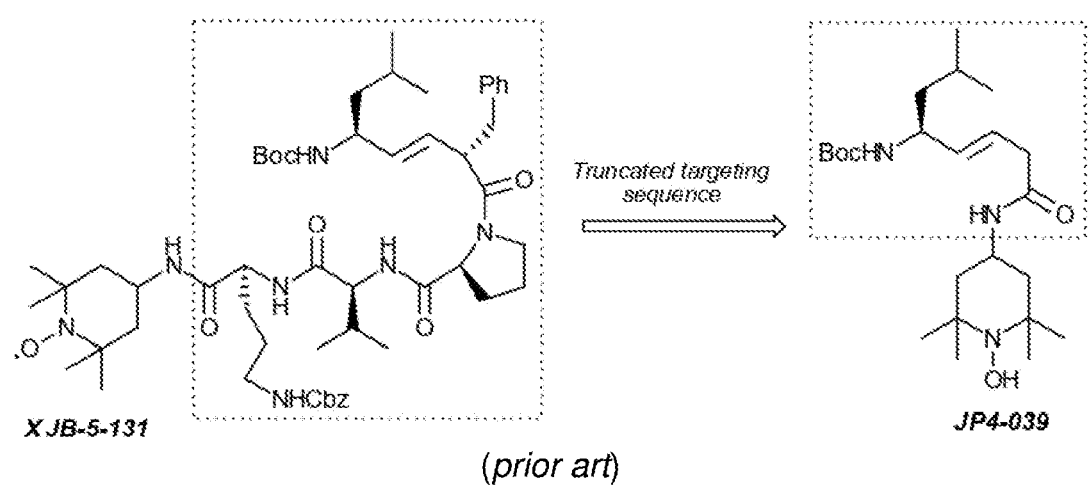
FIG. 1. Structures of XJB-5-131 and JP4-039; the targeting sequences are highlighted in a dashed box; the nitroxide (2,2,6,6-tetramethylpiperidin-N-oxyl) payload provides effective scavenging of reactive oxygen species (ROS), organic radicals, and electrons escaping from, for example, the electron transfer chain (ETC).
Figure 2A:
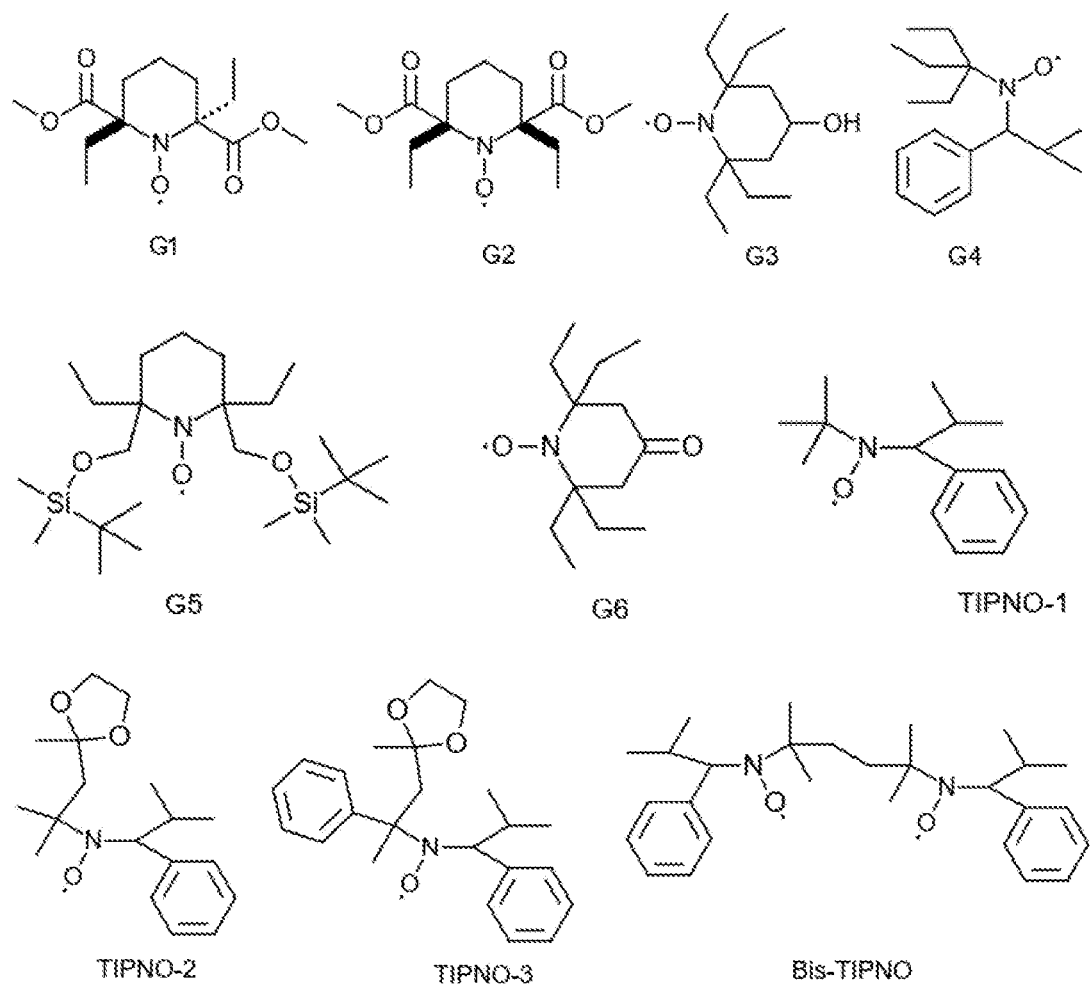
FIGS. 2A and 2B provide additional exemplary nitroxides.
Figure 2B:
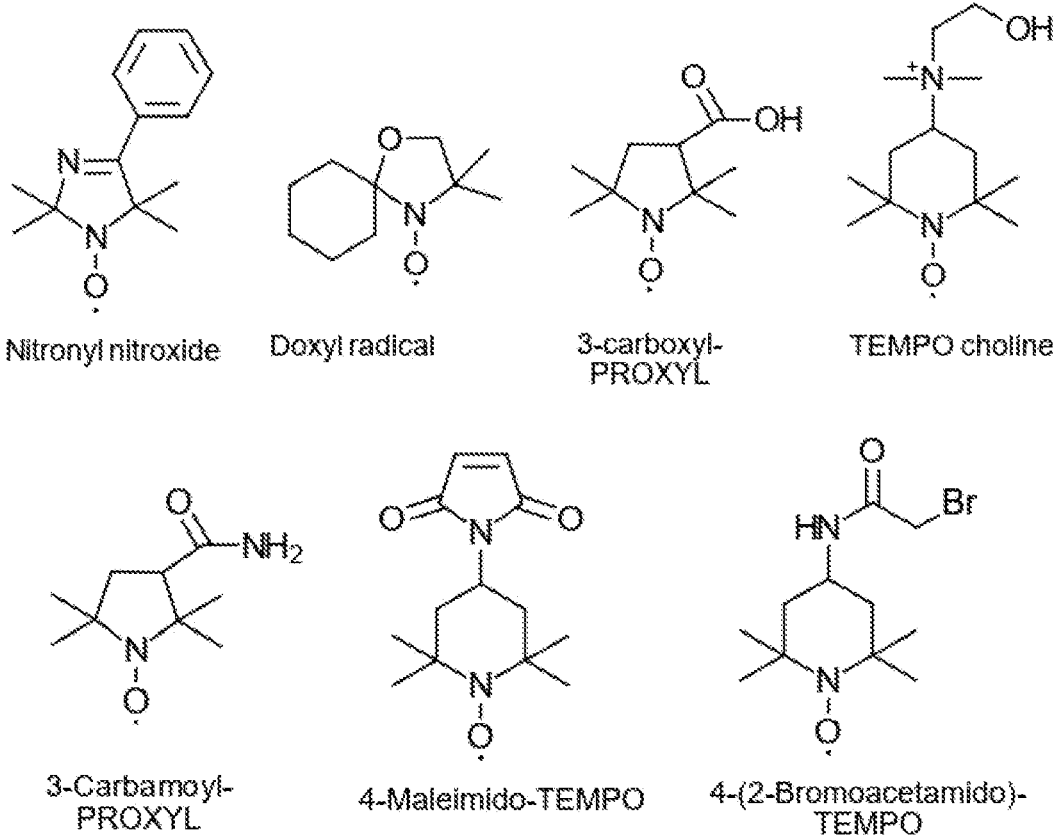

$R_7$ and $R_{15}$ are an —N—O containing group, such as a group containing an —N—O. (nitroxide), =N—O—, or —N=O moiety, such as a 2,2,6,6-Tetramethyl-4-piperidine 1-oxyl group. Additional non-limiting examples of nitroxide-containing groups are provided in FIGS. 2A and 2B (from Jiang, J., et al. "Structural Requirements for Optimized Delivery, Inhibition of Oxidative Stress, and Antiapoptotic Activity of Targeted Nitroxides", *J Pharmacol Exp Therap.* 2007, 320(3):1050-60, see, also U.S. Published Patent Application No. 2010-0035869 A1). A person of ordinary skill in the art would be able to conjugate (covalently attach) any of these compounds to the rest of the compound using common linkers and/or conjugation chemistries, such as the chemistries described herein.

For therapeutic use, salts of the compounds are those wherein the counter-ion is pharmaceutically acceptable. However, salts of acids and bases which are non-pharmaceutically acceptable may also find use, for example, in the preparation or purification of a pharmaceutically acceptable compound.

The pharmaceutically acceptable acid and base addition salts as mentioned herein are meant to comprise the therapeutically active non-toxic acid and base addition salt forms which the compounds are able to form. The pharmaceutically acceptable acid addition salts can conveniently be obtained by treating the base form with such appropriate acid. Appropriate acids comprise, for example, inorganic acids such as hydrohalic acids, e.g. hydrochloric or hydrobromic acid, sulfuric, nitric, phosphoric and the like acids; or organic acids such as, for example, acetic, propanoic, hydroxyacetic, lactic, pyruvic, oxalic (i.e. ethanedioic), malonic, succinic (i.e. butanedioic acid), maleic, fumaric, malic (i.e. hydroxybutanedioic acid), tartaric, citric, methanesulfonic, ethanesulfonic, benzenesulfonic, p-toluenesulfonic, cyclamic, salicylic, p-aminosalicylic, pamoic and the like acids. Conversely the salt forms can be converted by treatment with an appropriate base into the free base form.

The compounds containing an acidic proton may also be converted into their non-toxic metal or amine addition salt forms by treatment with appropriate organic and inorganic bases. Appropriate base salt forms comprise, for example, the ammonium salts, the alkali and earth alkaline metal salts, e.g. the lithium, sodium, potassium, magnesium, calcium salts and the like, salts with organic bases, e.g. the benzathine, N-methyl-D-glucamine, hydrabamine salts, and salts with amino acids such as, for example, arginine, lysine and the like. The term "addition salt" as used hereinabove also comprises the solvates which the compounds described herein are able to form. Such solvates are for example hydrates, alcoholates and the like.

The term "quaternary amine" as used hereinbefore defines the quaternary ammonium salts which the compounds are able to form by reaction between a basic nitrogen of a compound and an appropriate quaternizing agent, such as, for example, an optionally substituted alkylhalide, arylhalide or arylalkylhalide, e.g. methyliodide or benzyliodide. Other reactants with good leaving groups may also be used, such as alkyl trifluoromethanesulfonates, alkyl methanesulfonates, and alkyl p-toluenesulfonates. A quaternary amine has a positively charged nitrogen.

Pharmaceutically acceptable counterions include chloro, bromo, iodo, trifluoroacetate, and acetate. The counterion of choice can be introduced using ion exchange resins.

As used herein, unless indicated otherwise, for instance in a structure, all compounds and/or structures described herein comprise all possible stereoisomers, individually or mixtures thereof. The compound and/or structure may be an enantiopure preparation consisting essentially of an (−) or (+) enantiomer of the compound, or may be a mixture of enantiomers in either equal (racemic) or unequal proportions.

Protected derivatives of the disclosed compounds also are contemplated. Many suitable protecting groups for use with the disclosed compounds are broadly-known in the art. In general, protecting groups are removed under conditions which will not affect the remaining portion of the molecule. These methods are well known in the art and include acid hydrolysis, hydrogenolysis and the like. One method involves the removal of an ester, such as cleavage of a phosphonate ester using Lewis acidic conditions, such as in TMS-Br mediated ester cleavage to yield the free phosphonate. A second method involves removal of a protecting group, such as removal of a benzyl group by hydrogenolysis utilizing palladium on carbon in a suitable solvent system such as an alcohol, acetic acid, and the like or mixtures thereof. A t-butoxy-based group, including t-butoxy carbonyl protecting groups can be removed utilizing an inorganic or organic acid, such as HCl or trifluoroacetic acid, in a suitable solvent system, such as water, dioxane and/or methylene chloride. Another exemplary protecting group, suitable for protecting amino and hydroxy functions amino is trityl. Other conventional protecting groups are known and suitable protecting groups can be selected by those of skill in the art in consultation with any of the large number of broadly-available publications. When an amine is deprotected, the resulting salt can readily be neutralized to yield the free amine. Similarly, when an acid moiety, such as a phosphonic acid moiety is unveiled, the compound may be isolated as the acid compound or as a salt thereof.

According to one aspect, amine side chains are protected using protective groups, for example and without limitation by acylation (See, e.g., U.S. Pat. Nos. 7,528,174; 7,718,603; and 9,006,186, and International Patent Publication Nos. WO 2010/009405 and WO 2012/112851, incorporated herein by reference in their entirety). Protecting groups are known in the art and include, without limitation: 9-fluorenylmethyloxy carbonyl (Fmoc), t-butyloxycarbonyl (Boc), benzhydryloxycarbonyl (Bhoc), benzyloxycarbonyl (Cbz), O-nitroveratryloxycarbonyl (Nvoc), benzyl (Bn), allyloxycarbonyl (alloc), trityl (Trt), I-(4,4-dimethyl-2,6-dioxacyclohexylidene)ethyl (Dde), diathiasuccinoyl (Dts), benzothiazole-2-sulfonyl (Bts), dimethoxytrityl (DMT) and monomethoxytrityl (MMT) groups. A protecting group also includes acyl groups, such as acetyl groups, for example, as described. Non-limiting examples of acyl groups include:

—C(O)XR$_1$, where R$_1$ is (C$_1$-C$_6$)alkyl (e.g., isobutyl or 2-methylpropyl) or (C$_3$-C$_8$)cycloalkyl, optionally-substituted with phenyl, substituted phenyl, heteroaryl, or substituted heteroaryl, and X is —NH—, —O—, or is not present.

Ferroptosis refers to regulated cell death that results from extensive lipid peroxidation. It is often characterized by iron-dependent accumulation of oxidatively-damaged phospholipids. Ferroptosis and related cell death can be suppressed by iron chelators, lipophilic antioxidants, inhibitors of lipid peroxidation, and depletion of polyunsaturated fatty acids (PUFAs), and correlates with the accumulation of markers of lipid peroxidation (See, e.g., Stockwell B R, et al. Ferroptosis: A Regulated Cell Death Nexus Linking Metabolism, Redox Biology, and Disease. *Cell.* 2017; 171 (2):273-285. doi:10.1016/j.cell.2017.09.021). While promotion of ferroptosis has been explored as an anti-cancer therapy, the pathological effect of excessive ferroptosis is also implicated in a number of diseases, such as, for example and without limitation: neurodegenerative disease, including Alzheimer's disease, Parkinson's disease, Huntington's disease, amyotrophic lateral sclerosis, Friedreich's ataxia, and periventricular leukomalacia; stroke, including ischemic stroke and hemorrhagic stroke (intracerebral hemorrhage, ICH); traumatic brain injury; acute kidney injury; liver injury and fibrosis; diabetes, such as Type I diabetes; acute myeloid leukemia; age-related macular degeneration (AMD); psoriasis; hemolytic disorders; and inflammatory disease, e.g., as an anti-inflammatory or cryoprotective therapy. (See, e.g., Li, J., et al. Ferroptosis: past, present and future. *Cell Death Dis.* 11, 88 (2020). https://doi.org/10.1038/s41419-020-2298-2). For instance, neurons undergoing ferroptosis release lipid metabolites that cause brain inflammation, and inhibition of neuronal ferroptosis protects the hemorrhagic brain. In one study, ferroptosis was demonstrated to contribute to neuronal death after ICH, that administration of ferrostatin-1, a specific inhibitor of ferroptosis, protects the hemorrhagic brain (Li, Q. et al. "Inhibition of neuronal ferroptosis protects hemorrhagic brain." *JCI insight* vol. 2, 7 e90777. 6 Apr. 2017, doi:10.1172/jci.insight.90777). As such, the compounds and compositions described herein may be used to treat ferroptosis-associated diseases in a patient, or a disease in which ferroptosis is a co-morbidity.

The compounds typically are administered in an amount and dosage regimen to treat ferroptosis in a patient. The compounds also are expected to be useful in treatment of neurodegeneration includes treatment of neurodegenerative diseases, such as Parkinson's disease (PD), Alzheimer's disease (AD), Multiple Sclerosis (MS) chronic traumatic encephalopathy (CTE), and amyotrophic lateral sclerosis (ALS). The compounds may be administered in any manner that is effective to treat, mitigate or prevent any of the above conditions, including cancer, hyperplasia, neurodegeneration, PD, AD, MS, CTE, and ALS. Examples of delivery routes include, without limitation: topical, for example, epicutaneous, inhalational, enema, ocular, otic and intranasal delivery; enteral, for example, orally, by gastric feeding tube and rectally; and parenteral, such as, intravenous, intraarterial, intramuscular, intracardiac, subcutaneous, intraosseous, intradermal, intrathecal, intraperitoneal, transdermal, iontophoretic, transmucosal, epidural and intravitreal, with oral, intravenous, intramuscular and transdermal approaches being preferred in many instances.

As indicated above, and in the examples, the compounds exhibit ferroptosis-inhibiting activity. Useful dosages range from 300 ng·kg$^{-1}$ to 300 mg·kg$^{-1}$, with the upper limit being dictated by toxicity of the compound and the form of administration, and lower limits determined by efficacy in preventing or treating ferroptosis in a patient, tissue, or cell. Therefore, an "effective amount" of the compound or composition described herein is an amount effective in a dosage regimen (amount of the compound and timing of delivery), to achieve a desired end-point, such as maintaining concentrations at a site of treatment within a range effective to achieve an outcome. Suitable outcomes include prevention of ferroptosis or improvement in any objectively measure of ferroptosis or disease involving ferroptosis in a patient.

The compounds may be compounded or otherwise manufactured into a suitable composition for use, such as a pharmaceutical dosage form or drug product in which the compound is an active ingredient. Compositions may comprise a pharmaceutically acceptable carrier, or excipient. An excipient is an inactive substance used as a carrier for the active ingredients of a medication. Although "inactive," excipients may facilitate and aid in increasing the delivery or bioavailability of an active ingredient in a drug product. Non-limiting examples of useful excipients include: antiadherents, binders, rheology modifiers, coatings, disintegrants, emulsifiers, oils, buffers, salts, acids, bases, fillers, diluents, solvents, flavors, colorants, glidants, lubricants, preservatives, antioxidants, sorbents, vitamins, sweeteners, etc., as are available in the pharmaceutical/compounding arts.

Useful dosage forms include: intravenous, intramuscular, or intraperitoneal solutions, oral tablets or liquids, topical ointments or creams and transdermal devices (e.g., patches). In one embodiment, the compound is a sterile solution comprising the active ingredient (drug, or compound), and a solvent, such as water, saline, lactated Ringer's solution, or phosphate-buffered saline (PBS). Additional excipients, such as polyethylene glycol, emulsifiers, salts and buffers may be included in the solution.

In one aspect, the dosage form is a transdermal device, or "patch". The general structure of a transdermal patch is broadly known in the pharmaceutical arts. A typical patch includes, without limitation: a delivery reservoir for containing and delivering a drug product to a subject, an occlusive backing to which the reservoir is attached on a proximal side (toward the intended subject's skin) of the backing and extending beyond, typically completely surrounding the reservoir, and an adhesive on the proximal side of the backing, surrounding the reservoir, typically completely, for adhering the patch to the skin of a patient. The reservoir typically comprises a matrix formed from a nonwoven (e.g., a gauze) or a hydrogel, such as a polyvinylpyrrolidone (PVP) or polyvinyl acetate (PVA), as are broadly known. The reservoir typically comprises the active ingredient absorbed into or adsorbed onto the reservoir matrix, and skin permeation enhancers. The choice of permeation enhancers typically depends on empirical studies. Certain formulations that may be useful as permeation enhancers include, without limitation: DMSO; 95% Propylene Glycol+ 5% Linoleic Acid; and 50% EtOH+40% HSO+5% Propylene Glycol+5% Brij30. Therapeutic/pharmaceutical compositions are prepared in accordance with acceptable pharmaceutical procedures. The compositions as described herein can be co-administered or formulated with one or more additional active substances, e.g. drugs, small molecule drugs, cytokines, nucleic acids, proteins, polysaccharides, cells, etc. A possible combination is inhibitors of other cell-death pathways, such as anti-apoptotic, anti-pyroptotic, anti-parthanatos, and anti-necroptotic, as well as anti-necrotic compounds and compounds regulating autophagy and DNA damage.

Example 1—Synthesis Overview

Figure 3:
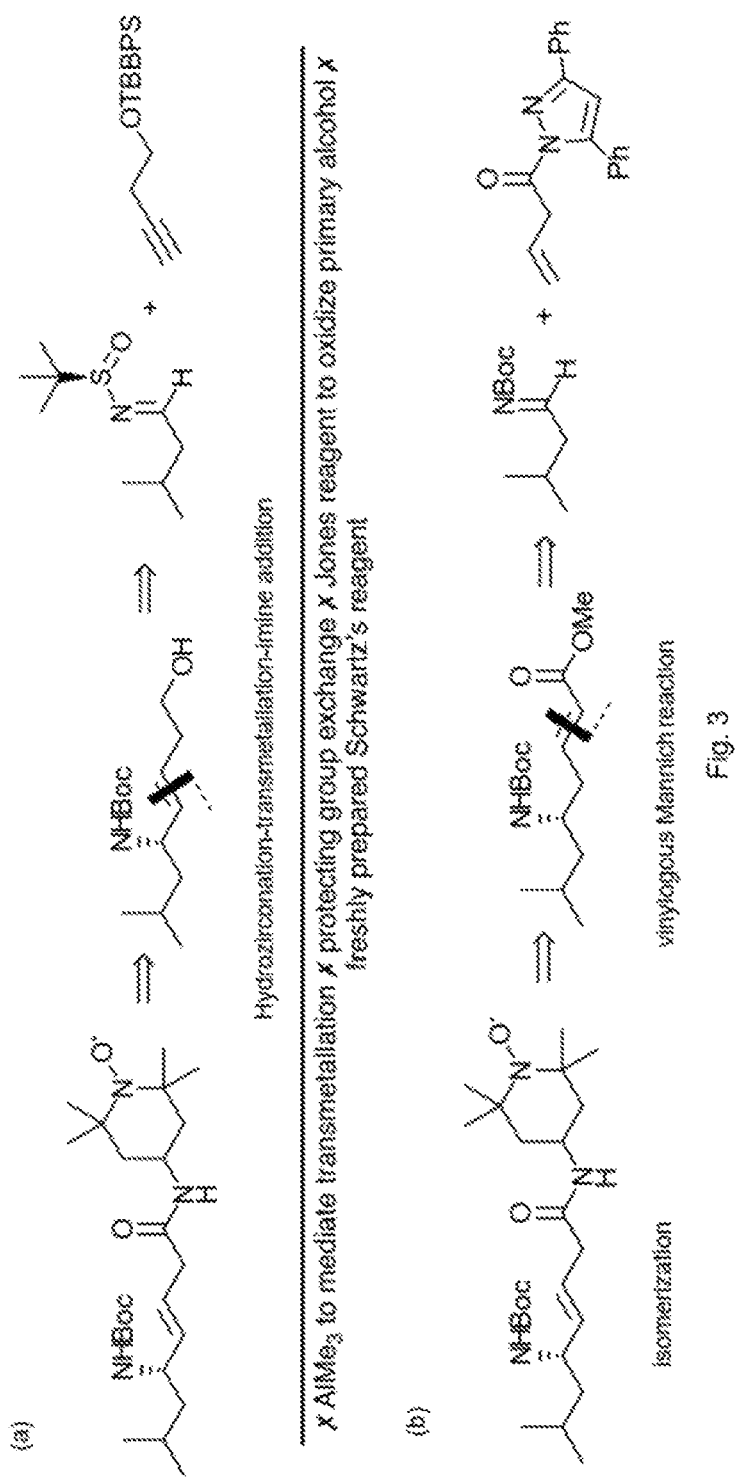
FIG. 3. depicts previous (a), and current (b) retrosynthetic schemes for synthesis of JP4-039.

In order to access the desired compounds, we devised new asymmetric routes envisioning an alternative retrosynthetic disconnection compared to the original route for synthesis of JP4-039 (FIG. 3). The previous route relied on a highly stereoselective methodology for asymmetric synthesis of allylic amines devised by our research group. This proceeded via hydrozirconation of protected alkyne with Schwartz's reagent, followed by transmetallation to afford vinylorganoaluminum, and subsequent addition onto Ellman's auxiliary yielded the allylic amine intermediate with excellent diastereoselectivity. We now adapted a new disconnection relying on an asymmetric vinylogous Mannich-type methodology to directly access the Boc-protected vinyl amine, which was followed by isomerization via either photochemical or LDA-mediated deconjugation chemistry (FIG. 3(b)).

Figure 4:
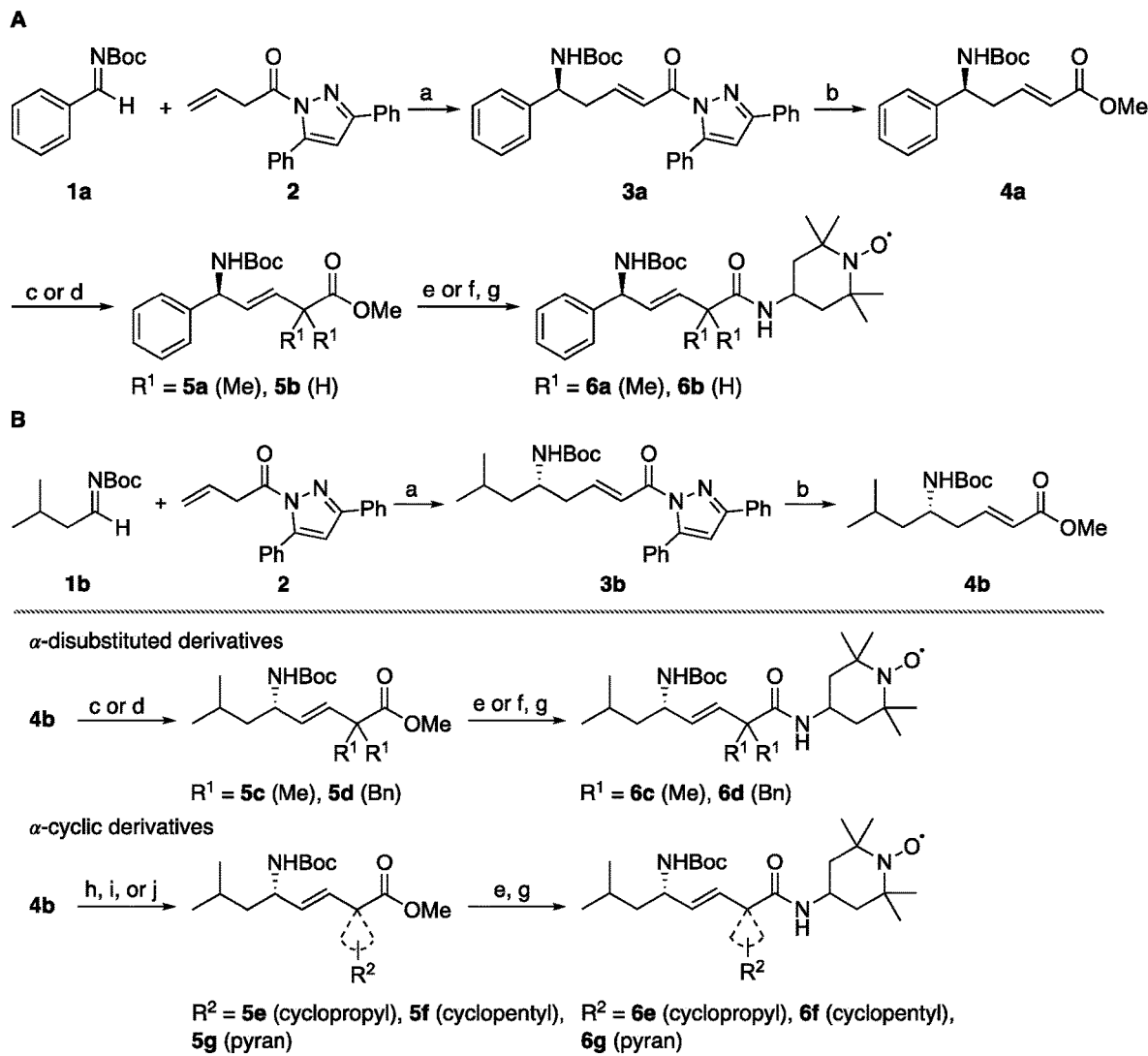
FIG. 4 depicts exemplary synthesis schemes A and B (synthesis Schemes 1 A and B) for compounds described herein. Reagents and conditions: (A) (a) 1a (2.2 equiv), 2 (2.50 mmol, 1.0 equiv), Cu($CH_3CN$)$_4PF_6$ (2 mol %), (R)-DTBM-SEGPHOS (2 mol %), TEA (1 mol %), THF (0.1 M), −45° C., 18 h, 96% ee; (b) MeOH, reflux, 24-38 h; (c) LDA, DMPU, THF, MeI −78° C. to −40° C., 3-4 h; (d) LDA, DMPU, THF, then MeOH, −78° C., 2-3 h; (e) LiOH/$H_2O$, THF, reflux, 15 h; (f) LiOH/$H_2O$, THF, rt, 4 h; (g) 4-amino-TEMPO, DMAP, HOBT.$H_2O$, EDC.HCl, $CH_2Cl_2$, rt, 20-24 h. (B) (a) 1b (4.0 equiv), 2 (2.50-2.60 mmol, 1.0 equiv), Cu($CH_3CN$)$_4PF_6$ (2-4 mol %), (S)-DTBM-SEGPHOS (2-4 mol %), TEA (1-2 mol %), THF (0.1 M), −50° C., 16-18 h, 33-86% ee; (b) MeOH, reflux, 18-24 h; (c) LDA, DMPU, THF, MeI −78° C. to −40° C., 3-4 h; (d) LDA, DMPU, THF, benzyl bromide, −78° C. to −45° C. to rt, 15-16 h; (e) 1 M LiOH, THF, reflux, 12-24 h; (f) KOH, MeOH/$H_2O$, reflux, 48 h; (g) 4-amino-TEMPO, DMAP, HOBT.$H_2O$, EDC.HCl, $CH_2Cl_2$, rt, 20-24 h; (g) 4-amino-TEMPO, DMAP, HOBT.$H_2O$, EDC.HCl, $CH_2Cl_2$, rt, 20-24 h; (h) LDA, DMPU, THF, 1,2-dibromoethane, −78° C. to −45° C. to rt, 14-15 h; (i) LDA, DMPU, THF, 1,2-diiodobutane, −78° C. to −45° C. to rt, 14-15 h; (j) LDA, DMPU, THF, bis(2-bromodiethyl) ether, −78° C. to −45° C. to rt, 22-23 h.

First, we synthesized the phenyl series by converting the α,β-unsaturated ester 4a to the corresponding β,γ-unsaturated ester 5a-b using enolate chemistry (Scheme 1A. FIG. 4). Under kinetic conditions at −78° C., LDA-DMPU was employed for proton abstraction from an α,β-unsaturated ester achieving the conjugated enolate, which kinetically preferred both re-protonation and/or alkylation at the α-carbon. Furthermore, we leveraged the over-reactivity associated with enolate chemistry to access di-alkylated substituents at the α-position in one-pot. For example, phenyl δ-amino-β,γ-unsaturated α-gem-dimethyl ester 5a was synthesized via over-methylation using methyl iodide as the alkylating agent, while the isomer 5b was synthesized via re-protonation using MeOH as the proton source. In doing so, we converted the corresponding esters 5a-5b to final compounds using sequential saponification-amide coupling with 4-amino-TEMPO.

The synthetic strategy described was further extended for the leucine series. As illustrated in Scheme 1B (FIG. 4), imine 1b was reacted with 2 using catalytic copper(1)-(S)-DTBM-SEGPHOS. With the linchpin intermediate 4b in hand, target molecules were prepared by employing LDA-mediated deconjugative alkylation chemistry. This protocol facilitated the synthesis of α-dimethyl 5c and α-dibenzyl 5d esters, and under similar reaction conditions gave access to α-cyclic esters including α-cyclopropyl 5e, α-cyclopentyl 5f, and α-pyran 5g esters. Saponification of these esters followed by amide coupling with 4-amino-TEMPO provided desired final compounds 6c-6g.

Figure 5:
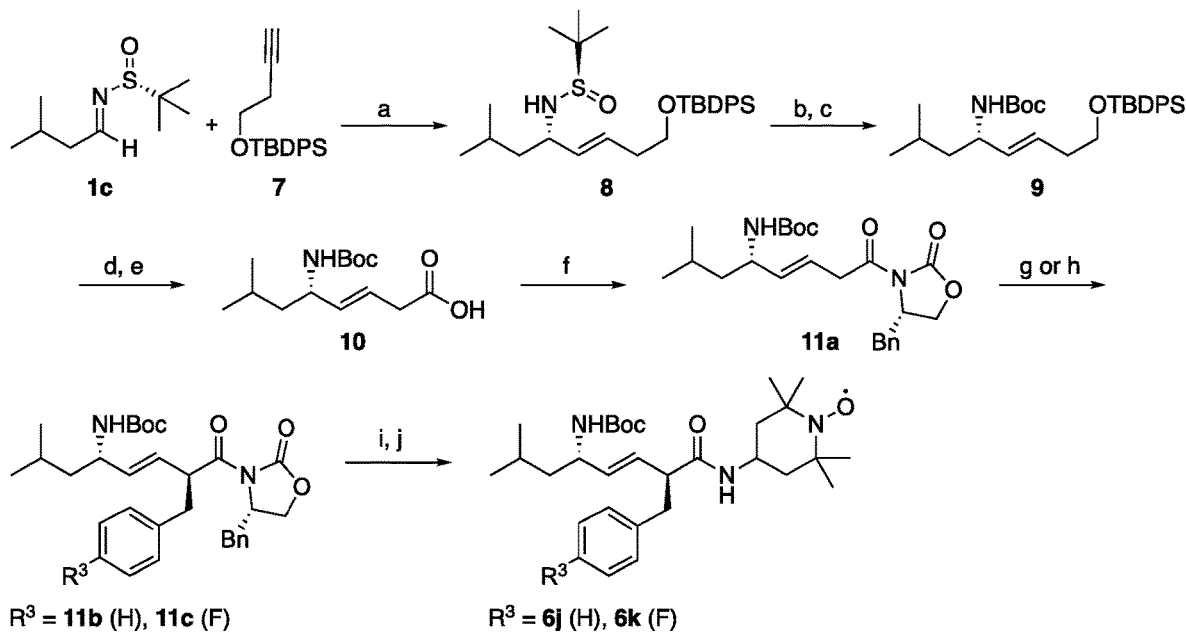
FIG. 5 provides synthesis Scheme 2, as described below. Reagents and conditions: (a) (i) 7, $Cp_2ZrHCl$, $CH_2Cl_2$, rt, 10 min, (ii) $AlMe_3$, $CH_2Cl_2$, 1c, 0° C. to rt, 5-6 h, (iii) MeOH; (b) HCl.dioxane, $Et_2O$, rt, 1 h; (c) $Boc_2O$, TEA, $CH_2Cl_2$, rt, 18 h; (d) TBAF, THF, rt, 7 h; (e) Jones reagent, acetone, 0° C., rt; (f) (i) 10, TEA, pivaloyl chloride, THF, −78° C. to 0° C. to −78° C., 1 h, (ii) Evan's auxiliary, n-BuLi, THF, −78° C., 25 min, (iii) −78° C. to rt, 16 h; (g) NaHMDS, benzylbromide, THF, −78° C. to −30° C., 3 h; (h) NaHMDS, 4-fluorobenzylbromide, THF, −78° C. to −30° C., 3 h; (i) 35% $H_2O_2$, 1M LiOH, THF/$H_2O$, 0° C., 1 h; (j) 4-amino-TEMPO, DMAP, HOBT.$H_2O$, EDC.HCl, $CH_2Cl_2$, rt, 20-24 h.
Figure 6:
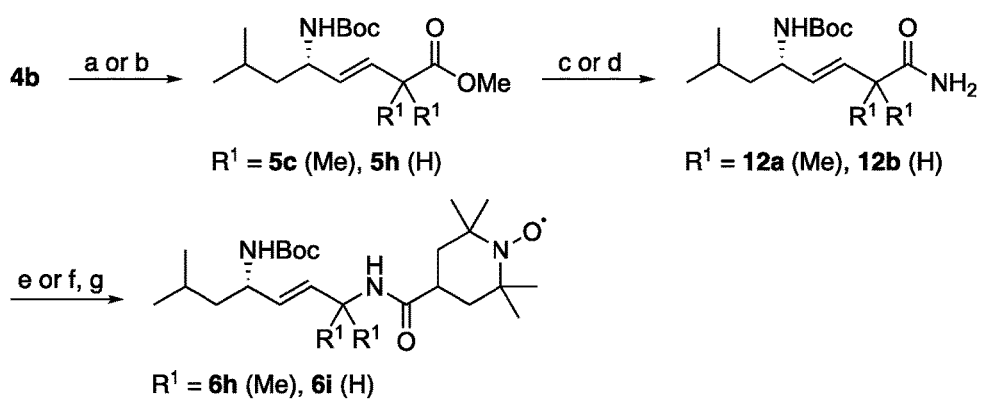
FIG. 6 depicts synthesis Scheme 3. Reagents and conditions: (a) LDA, DMPU, THF, MeI −78° C. to −40° C., 3-4 h; (b) 1,2-dimethylimidazole, MeOH (degassed), hv, 24 hxcycles; (c) (i) 1 M LiOH, THF, reflux, 14 h, (ii) EDC.HCl, HOBT.$H_2O$, $CH_2Cl_2$, rt, 1 h, then ($NH_4$)$HCO_3$, rt, 21 h; (d)

We also used hydrozirconation-transmetallation-imine addition methodology to prepare enantioenriched a-substituted derivatives 6j-k (Scheme 2, FIG. 5). Hydrozirconation of alkyne 7 with Schwartz's reagent followed by transmetallation, and subsequent addition to chiral sulfinimine 1c gave the allylic amine 8 in 86% yield. Protecting group exchange was carried out to access N-Boc allylic amine 9. TBAF-mediated deprotection of the silyl ether afforded the alcohol S4, which was oxidized using Jones reagent to access the corresponding carboxylic acid. At this point, the carboxylic acid 10 served as an intermediate for the preparation of analogs using Evans alkylation chemistry. The attachment of Evans auxiliary (compound 11a) facilitated stereoselective α-installation of substituents 11b-c. Cleavage of Evans auxiliary followed by amide coupling afforded the peptide-nitroxide conjugates 6j-k. Reverse amide analogs also were synthesized. In order to access the allylic amine directly from the β,γ-unsaturated esters, we explored nitrogen-rearrangement chemistry. Hofmann rearrangement, Scheme 3 depicted in FIG. 6, provided primary amides 12a-b either via aminolysis or saponification-amidation sequence of 5c and 5h. PIFA-mediated Hofmann rearrangement of primary amides 12a-b gave allylic amines, which were immediately coupled with 4-carboxyTEMPO in one-pot. The gem-dimethyl allylic amine derived from 12a was coupled with 4-carboxyTEMPO to generate 6h.

A change in geometry from (E)-alkene to (Z)-alkene was feasible. Preparation of 5h (E)-alkene was carried out from 4b using photochemical irradiation with low-pressure mercury lamp and 1,2-dimethylimidazole base resulting in the formation of the thermodynamically less stable β,γ-unsaturated isomers in a mixture of (E)- and (Z)-alkene, 5h and 5h' respectively (Scheme 3). Irradiation on purified (Z)-alkene 5h' provided the desired (E)-alkene 5h. Remaining 5h' was subjected to final compound synthesis 6l (Scheme 4B, FIG. 7). We also reduced the alkene via hydrogenation to access the corresponding saturated analog 6m (Scheme 4B, FIG. 7). A related analog, 6n (Scheme 4C, FIG. 7) was prepared from commercial octanoic acid.

We also explored alternative access to enantiomers of α,β-unsaturated esters 5c and 5i (i.e., (R)-5c). As shown in Scheme 5 (FIG. 8), (S)-13 and (R)-13 were prepared from indium-mediated allylation of chiral sulfinimines in aqueous media at r.t. The corresponding homoallylic amine was subjected to cross-metathesis with methyl acrylate in $CH_2Cl_2$ to yield the desired α,β-unsaturated esters 5c with excellent E:Z ratio >20:1. Deconjugative dimethylation of the α,β-unsaturated esters followed by sequential saponification-amidation gave the desired final compounds (S)-6c and (R)-6o.

4-Fluorophenyl imine 1e and α,β-unsaturated oxazolidinone 15 provided (R,R) diastereomer 16 with 97:3 dr. LDA-mediated deconjugation followed by quenching with MeOH provided α,β-unsaturated ester 4d in a single step. Saponification and amide coupling gave compound 6p (FIG. 9).

Example 2—Protective Effects of Compounds

A. Discovering compounds and mechanisms for inhibiting ferroptosis, a form of regulated, nonapoptotic cell death, has been of great interest in recent years. Several compounds, as described above, were synthesized to probe structure-activity relationships. Preventing mitochondrial lipid oxidation represents a potentially-viable therapeutic opportunity in ischemia/reperfusion-induced tissue injury, acute kidney injury, and other pathologies that involve ferroptotic cell death pathways.

Compounds 6c, 6e, 6f, and 6i, as described above, were tested at a concentration of 1 μM, yielding values of 6c (85%), 6e (80%), 6f (77%), 6g (16%), 6h (78%), 6i (57%), and 6j (83%). For comparison, JP4-039 yielded a value of 56%. The EC50 values were calculated for compounds 6b (948 nM), 6d (173 nM), 6h (576 nM), and 6j (207 nM). Briefly, 200 μL of a 5,000 cell/mL solution of HT-1080 cells were incubated for 24 h at 37° C. at 5% $CO_2$, 95% humidity. The compounds were dissolved in DMSO and diluted to desired testing concentration. Compounds (1 μL) were added to culture medium (1 mL) containing 10 μM Erastin and incubated at 37° C., 5% $CO_2$, 95% humidity for 24 h. CellTiter-Glo® reagent was added and the plate was incubated for 20 min at rt, sealed, centrifuged (1 min) at 1,000 rpm, shaken (1 min), and read in Enspire. % Activity remaining was determined as a function of vehicle sample and Erastin sample.

B. Compounds 6a-6n were tested for their protection against Erastin-induced ferroptosis in HT-1080 cells.

Briefly, 200 μL of a 5,000 cell/mL solution of HT-1080 cells were incubated for 24 h at 37° C. at 5% $CO_2$, 95% humidity. The compounds were dissolved in DMSO and diluted to desired testing concentration. Compounds (1 μL) were added to culture medium (1 mL) containing 10 μM Erastin and incubated at 37° C., 5% $CO_2$, 95% humidity for 24 h. CellTiter-Glo® reagent was added and the plate was incubated for 20 min at rt, sealed, centrifuged (1 min) at 1,000 rpm, shaken (1 min), and read in Enspire. % Activity remaining was determined as a function of vehicle sample and Erastin sample.

TABLE 2

| analog | log P | Erastin-induced ferroptosis in HT-1080 cells | |
|---|---|---|---|
| | | % activity remaining at 1 μM | EC50 |
| JP4-039 | | 56% | |
| 6a | 4.19 | | |
| 6b | 2.92 | | |
| 6c | 4.03 | 85% | |
| 6d | 7.24 | 78% | 173 nM |
| 6e | 3.53 | 80% | 958 nM |
| 6f | 4.37 | 77% | |
| 6g | 3.10 | 16% | |
| 6j | 4.93 | 83% | 207 nM |
| 6k | 5.09 | | |
| 6h | 3.68 | 78% | 576 nM |
| 6i | 3.15 | 57% | |
| 6l | 2.76 | | |
| 6m | 2.94 | | |
| 6n | 2.83 | | |

Example 3—Detailed Synthesis Scheme and Results

All reactions were performed under nitrogen atmosphere that had been passed through a column of Drierite. All glassware was either flame-dried under high vacuum or dried in an oven overnight prior to use, and allowed to cool under a stream of nitrogen. Reactions were stirred magnetically using Teflon-coated magnetic stirring bars, and syringe needles were dried in an oven and cooled in a desiccator cabinet over Drierite. Reactions carried out at a temperature below 0° C. employed brine/ice bath or $CO_2$/acetone bath; Mannich reactions carried out at low temperatures employed a Thermo Scientific Neslab CC65 Immersion Cooler. THF and $Et_2O$ were distilled over sodium/benzophenone prior to use; $CH_2Cl_2$ was distilled from $CaH_2$ system prior to use; triethylamine was distilled over $CaH_2$ and stored over KOH; MeOH was deoxygenated by sparging with $N_2$ for at least 20 min prior to use where indicated. Photochemical irradiation was carried out in a Rayonet housed with low-pressure mercury lamp. All other materials were obtained from commercial sources and used as received. Reactions were monitored by thin-layer chromatography (TLC) analysis on pre-coated silica gel 60 F254 plates (250 μm layer thickness); visualization was accomplished by UV light (254 nm) and/or by staining with $KMnO_4$ solution (1.5 g $KMnO_4$ and 10 g $K_2CO_3$ in 200 mL $H_2O$ with 10% NaOH); reactions were also monitored using LC-MS Agilent Technologies 1260 Infinity II LC at 220 nm UV absorption. Flash chromatography was carried out on silica gel 60 (230-400 mesh). Infrared spectra (IR) were obtained from neat solids or oils using ATR FT-IR PerkinElmer Spectrum 100 spectrometer. Melting points were determined in open capillary tubes, recorded on a Mel-Temp II apparatus fitted with a Fluke 51 II digital thermometer, and are uncorrected. Optical rotations were measured on a PE-241 or Jasco-P2000 polarimeter. Nuclear Magnetic Resonance (NMR) spectra were acquired on Bruker instruments operating at 300, 400, 500, and 600 MHz for $^1H$, $^{13}C$, and $^{19}F$ at ambient temperature. Chemical shifts (δ) were reported in parts per million (ppm) with the residual solvent peak used as an internal standard ($CDCl_3$: 7.26 ppm for $^1H$ and 77.16 ppm for $^{13}C$; $CD_3OD$: 3.31 ppm for $^1H$ and 49.00 ppm for $^{13}C$; $CD_2Cl_2$: 5.32 ppm for $^1H$ and 54.00 ppm for $^{13}C$). $^1H$ NMR were tabulated as follows: chemical shifts, multiplicity (s=singlet, d=doublet, t=triplet, m=multiplet, br=broad), coupling constant(s), and number of protons. Enantiomeric excess or diastereomeric ratios were determined either by analytical HPLC on Rainin Dynamax HPLC (Dual Pump, Model SD-200) with Dynamax UV-1 absorbance detector using Chiralpak AD-H column (5 μM, 4.6×250 mm), or analytical SFC performed on Mettler Toledo instrument using Chiralpak-IC semiprep column (5 μM, 10×250 mm). High resolution mass spectra (HRMS) were obtained on a Thermo Scientific Exactive Orbitrap LC-MS (ESI positive ion mode) coupled to a Thermo Scientific Accela HPLC system using a 3.5 μM Water XTerra C18 column (2.1×50 mm; 10 min gradient elution with $MeCN/H_2O/MeOH$ containing 0.1% formic acid at a flow rate of 500 μL/min from 3:92:5 at 0-0.5 min to 93:2:5 at 4.0, back to 3:92:5 from 6.0 to 7.5 min).

Purity Analysis of Final Compounds: Purity of compounds was assessed using an Agilent Technologies 1260 Infinity II LC at 220 nm UV absorption (Waters XBridge BEH $C_{18}$ 2.1×50 mm, 2.5 μm) or an Agilent Technologies 385-ELSD (Microsolv Cogent 2.0 Bidentate $C_{18}$ 2.1×50 mm, 2.2 μm; ELSD conditions: evaporator and nebulizer set at 45° C.; gas flow set at 1.80 standard liter/min).

General Procedure A: Leucine N-Boc Imine (1b). A solution of tert-butyl (3-methyl-1-(phenylsulfonyl)butyl) carbamate (1.0 equiv) and cesium carbonate (3.0 equiv) in anhydrous $CH_2Cl_2$ (0.2 M) was stirred for ca. 7 h at r.t. under nitrogen atmosphere. The reaction mixture was cooled (0° C. via ice bath), diluted with cold hexanes (ca. 10 mL), filtered through a medium-coarse glass frit, and washed with cold hexanes. The filtrate was concentrated under reduced pressure (bath temperature maintained ca. 20° C.) and dried under high vacuum to give the title compound as a colorless oil. The oil was used immediately in the following step without further purification. Remove solvent to ca. 2-4 mL of colorless solution.

General Procedure B: Vinylogous Mannich reaction between 3,5-diphenylpyrazole (2) and leucine N-Boc imine (1b). A dried 50 mL round bottom flask equipped with a magnetic stir bar was charged with $[Cu(CH_3CN)_4]PF_6$ (2-4 mol %) and (S)-DTMB-SEGPHOS (2-4 mol %) under nitrogen atmosphere. Anhydrous THF (0.1 M) was added and the colorless catalyst solution was stirred (ca. 15 min) at r.t. until imine 1b was prepared. To the catalyst solution was added freshly prepared N-Boc imine 1b (4.0 equiv). The mixture was transferred via syringe to a dried 100 mL round bottom equipped with a magnetic stir bar charged with N-acylpyrazole 2 (2.50-2.60 mmol, 1.0 equiv). The reaction mixture was cooled to −50° C. and TEA (0.02 M in THF, 1-4 mol %) was added. The resulting reaction mixture was stirred at −50° C. for 16-18 h. The reaction mixture was filtered through a plug of basic alumina with EtOAc. The organic layer was washed with 1 N $NH_4OH$ (4×15 mL), saturated $NaHSO_3$ (4×10 mL), $H_2O$ (2×10 mL), and brine (10 mL). The organic layer was dried over $Na_2SO_4$, filtered, and concentrated. Flash column chromatography carried out on silica gel with a gradient elution of 5-10% EtOAc/ hexanes afforded the title compound as a white foam solid (91%—quantitative yields, 33-86% ee).

General Procedure C: Methanolysis. A solution of 3a-b (1.0 equiv) in MeOH (0.1 M) was heated at reflux for 18-38 h. The reaction mixture was concentrated. Flash column chromatography was carried out on silica gel using gradient elution of 5-8% EtOAc/hexanes to afford the title compound.

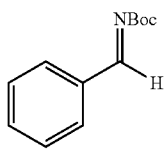

tert-Butyl (Z)-benzylidenecarbamate (1a). A solution of tert-Butyl (phenyl(phenylsulfonyl)methyl)carbamate (1.91 g, 5.50 mmol, 1.0 equiv), cesium carbonate (5.40 g, 16.6 mmol, 3.0 equiv), and $MgSO_4$ (5.50 g, 55.0 mmol, 10.0 equiv) in anhydrous $CH_2Cl_2$ (0.2 M, 28.0 mL) was stirred for 15 h at r.t. under nitrogen atmosphere. The reaction mixture was diluted with $CH_2Cl_2$ and filtered through a medium-coarse glass frit. The filtrate was concentrated under reduced pressure (bath temperature maintained at 20° C.) and dried under high vacuum to give the title compound as a colorless oil. Remove solvent to ca. 2-4 mL of colorless solution. The oil was used in the following step without further purification. $^1$H NMR showed quantitative conversion and minor impurities. Diagnostic peaks of 1: $^1$H NMR (300 MHz, $CDCl_3$) δ 8.87 (s, 1H), 7.91 (m, 2H), 7.59-7.52 (m, 1H), 7.49-7.42 (m, 2H), 1.59 (s, 9H).

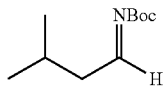

tert-Butyl (Z)-(3-methylbutylidene)carbamate (1b). The reaction was carried out according to General Procedure A. $^1$H NMR showed quantitative conversion and minor impurities. Diagnostic NMR peaks of 1b: $^1$H NMR (300 MHz, $CDCl_3$) δ 8.25 (s, 1H), 2.23 (m, 2H), 2.00 (m, 1H), 1.48 (s, 9H), 0.95 (d, J=6.7 Hz, 6H).

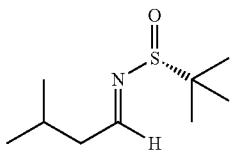

(R,E)-2-Methyl-N-(3-methylbutylidene)propane-2-sulfinamide (1c). To a solution of isovaleraldehyde (4.1 mL, 37.3 mmol, 1.2 equiv) in anhydrous $CH_2Cl_2$ (126 mL, 0.25 M) was added sequentially (R)-2-methyl-2-propane-sulfinamide (4.00 g, 31.4 mmol, 1.0 equiv), anhydrous $MgSO_4$ (15.5 g, 157 mmol, 5.0 equiv), and PPTS (0.796 g, 3.14 mmol, 0.1 equiv) under nitrogen atmosphere. The white suspension was stirred at rt for 36 h. The suspension was filtered through a Celite pad. The resulting solution was concentrated under reduced pressure to afford a pale yellow oil. Flash column chromatography carried out on silica gel using gradient elution of 10-20% EtOAc/hexanes afforded the title compound as a pale yellow oil (5.10 g, 26.9 mmol, 86% yield). $^1$H NMR (300 MHz, $CDCl_3$) δ 8.06 (t, J=5.2 Hz, 1H), 2.41 (m 2H) 2.06 (m 1H), 1.20 (s, 9H), 0.99 (dd, J=6.7, 0.9 Hz, 6H).

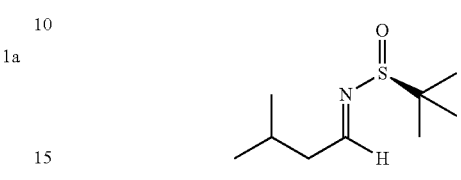

(S,E)-2-Methyl-N-(3-methylbutylidene)propane-2-sulfinamide (1d). To a solution of isovaleraldehyde (4.3 mL, 38.9 mmol, 1.2 equiv) in anhydrous $CH_2Cl_2$ (150 mL, 0.25 M) were added sequentially (S)-2-methyl-2-propane-sulfinamide (4.00 g, 32.3 mmol, 1.0 equiv), anhydrous $MgSO_4$ (15.9 g, 162 mmol, 5.0 equiv), and PPTS (0.821 g, 3.23 mmol, 0.1 equiv) under nitrogen atmosphere. The white suspension was stirred at r.t. for 36 h. The reaction mixture was filtered through a Celite pad and the resulting solution was concentrated under reduced pressure to afford a pale yellow suspension. Flash column chromatography carried out on silica gel using gradient elution of 10-20% EtOAc/hexanes afforded the title compound as a pale yellow oil (5.94 g, 31.4 mmol, 97% yield). $R_f$=0.57 (20% EtOAc/hexanes; IR (neat) 2958, 2871, 1727, 1621, 1464, 1363, 1163, 1083, 676 $cm^{-1}$; $[α]_D^{23}$=+288.1 (c 1.0, $CHCl_3$); $^1$H NMR (300 MHz, $CDCl_3$) δ 8.05 (t, J=5.2 Hz, 1H), 2.40-2.38 (m, 2H), 2.07-2.01 (m, 1H), 1.19 (s, 9H), 0.99 (d, J=6.7 Hz, 6H); $^{13}$C NMR (75 MHz, $CDCl_3$) δ 169.6, 56.7, 45.1, 26.3, 22.8, 22.7, 22.5; HRMS (ESI) m/z: $[M+H]^+$ calcd for $C_9H_{20}NOS$ 190. 1260, found 190.1256.

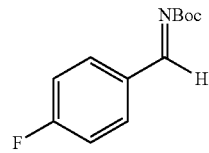

tert-Butyl (E)-(4-fluorobenzylidene)carbamate (1e). A solution of tert-butyl ((4-fluorophenyl)(phenylsulfonyl)methyl)carbamate (0.330 g, 0.903 mmol, 1.0 equiv) and cesium carbonate (0.892 g, 2.71 mmol, 3.0 equiv) were dried under high vacuum for 1 hour in a 50 mL round bottom. Anhydrous $CH_2Cl_2$ (0.2 M, 5.0 mL) was added and the mixture was stirred for 2.5 h at 40° C. under nitrogen atmosphere. The reaction mixture was diluted with cold hexanes (2.0 mL, 0° C.) filtered through a plug of Hyflo® Super-Cel® and the plug was washed with hexanes (5.0 mL). The filtrate was concentrated under reduced pressure (bath temperature maintained at −20° C.) and dried under high vacuum to give the title compound as a white solid. The solid was used in the following step without further purification. $^1$H NMR showed quantitative conversion and minor impurities. Diagnostic peaks of 1e: $^1$H NMR (300 MHz, $CDCl_3$) δ 8.85 (s, 1H), 7.96-7.91 (m, 2H), 7.16 (t, J=8.4 Hz, 2H), 1.58 (s, 9H).

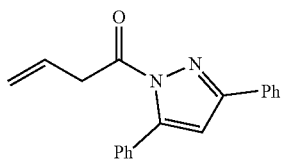

2

1-(3,5-Diphenyl-1H-pyrazolyl)but-3-enone (2). To a mixture of but-3-enoic acid (1.0 mL, 11.7 mmol, 1.0 equiv) and 3,5-diphenylpyrazole (2.62 g, 11.7 mmol, 1.0 equiv) in anhydrous $CH_2Cl_2$ (23 mL) was added EDC.HCl (3.58 g, 18.6 mmol, 1.6 equiv) at −10° C. under nitrogen atmosphere. After stirring for 90 min, the reaction was quenched with brine (50 mL) and $H_2O$ (20 mL). The organic layer was separated and the aqueous phase was extracted with $CH_2Cl_2$ (3×30 mL). The combined organic layers were dried over $Na_2SO_4$, filtered, and concentrated. Flash column chromatography carried out on silica gel using isocratic elution of 2% EtOAc/hexanes afforded the title compound as a white amorphous solid (2.01 g, 6.99 mmol, 60% yield). $^1$H NMR (300 MHz, $CDCl_3$) δ 7.91 (m, 2H), 7.50-7.39 (m, 8H), 6.74 (s, 1H), 6.10 (m, 1H), 5.28 (m, 2H), 4.07 (dt, J=6.9, 1.4 Hz, 2H).

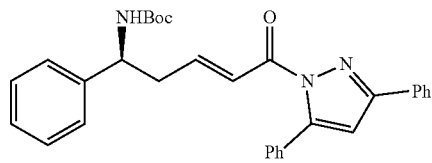

3a tert-Butyl (S,E)-(5-(3,5-diphenyl-1H-pyrazol-1-yl)-5-oxo-1-phenylpent-3-en-1-yl)carbamate (3a). A dried 50 mL round bottom equipped with a magnetic stir bar was charged with [Cu(CH$_3$CN)$_4$]PF$_6$ (19.0 mg, 0.0499 mmol, 2 mol %) and (R)-DTMB-SEGPHOS (59.5 mg, 0.0499 mmol, 2 mol %) under nitrogen atmosphere. Anhydrous THF (25 mL) was added and the colorless catalyst solution was stirred (ca. 15 min) at r.t. until imine 1a was prepared. To the catalyst solution was added freshly prepared N-Boc imine 1a (>1.1 g, ca 2.2 equiv). The mixture was transferred via syringe to a dried 100 mL round bottom flask equipped with a magnetic stir bar charged with N-acylpyrazole 2 (0.720 g, 2.50 mmol, 1.0 equiv). The reaction mixture was cooled to −45° C. and TEA (0.02 M in THF, 1.40 mL, 0.028 mmol, 1 mol %) was added. The resulting reaction mixture was stirred at −45° C. for 18 h. The reaction mixture was filtered through a plug of basic alumina and rinsed with EtOAc. The organic layer was washed with 1 N NH$_4$OH (3×15 mL), saturated NaHSO$_3$ (3×15 mL), H$_2$O (2×10 mL), and brine (1×5 mL). The organic layer was dried over Na$_2$SO$_4$, filtered, and concentrated. Flash column chromatography carried out on silica gel using gradient elution of 5-15% EtOAc/hexanes afforded the title compound as a white foam solid (1.19 g, 2.41 mmol, 96% yield). R$_f$=0.49 (15% EtOAc/hexanes); mp 58-63° C. (foam); IR (neat) 3348, 2976, 1709, 1638, 1489, 1339, 1163, 946 cm$^{-1}$; [α]$_D^{25}$=−16.6 (c 0.5, CH$_2$Cl$_2$, 96% ee); $^1$H NMR (400 MHz, CDCl$_3$) δ 7.92 (m, 2H), 7.56-7.40 (m, 9H), 7.36-7.24 (m, 5H), 7.05 (dt, J=15.7, 7.3 Hz, 1H), 6.75 (s, 1H), 4.90 (br s, 2H), 2.88 (br s, 2H), 1.41 (s, 9H); $^{13}$C NMR (126 MHz, CDCl$_3$) δ 163.9, 155.1, 153.6, 147.8, 147.0, 141.5, 131.9, 131.4, 129.3, 129.1, 128.9, 128.0, 127.8, 126.5, 124.0, 110.2, 80.0, 54.0, 39.9, 28.5; HRMS (ESI) m/z: [M+H]$^+$ calcd for C$_{31}$H$_{32}$N$_3$O$_3$ 494.2438, found 494.2437. HPLC: Chiralcel ADH, 8% EtOH/hexanes over 60 min, flow rate=1.0 mL/min, λ=254 nm, (R) t$_R$=23.4 min, (S) t$_R$=31.9 min, ee=96%.

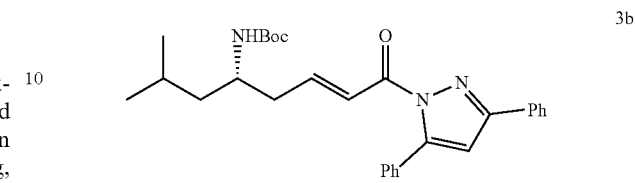

3b tert-Butyl (S,E)-(8-(3,5-diphenyl-1H-pyrazol-1-yl)-2-methyl-8-oxooct-6-en-4-yl)carbamate (3b). A dried 50 mL round bottom equipped with a magnetic stir bar was charged with [Cu(CH$_3$CN)$_4$]PF$_6$ (20.0 mg, 0.0526 mmol, 2 mol %) and (S)-DTMB-SEGPHOS (62.0 mg, 0.0520 mmol, 2 mol %) under nitrogen atmosphere. Anhydrous THF (26 mL) was added and the colorless catalyst solution was stirred (ca. 15 min) at r.t. until imine 1b was prepared. To the catalyst solution was added freshly prepared N-Boc imine 1b (>1.93 g, 4.0 equiv). The mixture was transferred via syringe to a dried 100 mL round bottom flask equipped with a magnetic stir bar charged with N-acylpyrazole 2 (0.750 g, 2.60 mmol, 1.0 equiv). The reaction mixture was cooled to −50° C. and TEA (0.02 M in THF, 2.6 mL, 2 mol %) was added. The resulting reaction mixture was stirred at −50° C. for 16 h. The reaction mixture was filtered through a plug of basic alumina and rinsed with EtOAc. The organic layer was washed with 1 N NH$_4$OH (4×15 mL), aqueous solution of saturated NaHSO$_3$ (4×10 mL), H$_2$O (2×10 mL), and brine (10 mL). The organic layer was dried over Na$_2$SO$_4$, filtered, and concentrated. Flash column chromatography carried out on silica gel with gradient elution of 5-10% EtOAc/hexanes afforded the title compound as a white foam solid (1.15 g, 2.42 mmol, 93% yield). R$_f$=0.59 (15% EtOAc/hexanes); IR (neat) 3356, 2958, 1714, 1638, 1339, 1167, 946 cm$^{-1}$; [α]$_D^{25}$=−25.2 (c 0.5, H$_2$Cl$_2$, 73% ee); mp=46-53° C.; $^1$H NMR (300 MHz, CDCl$_3$) δ 7.93 (m, 2H), 7.55-7.11 (m, 9H), 7.17 (m, 1H), 6.76 (s, 1H), 4.35 (d, J=8.8 Hz, 1H), 3.87 (m, 1H), 2.64-2.48 (m, 2H), 1.73-1.64 (m, 2H), 1.50-1.44 (m, 9H), 1.37-1.24 (m, 2H), 0.92 (d, J=6.7 Hz, 6H); $^{13}$C NMR (76 MHz, CDCl$_3$) δ 164.1, 155.4, 153.5, 148.0, 147.8, 131.9, 131.5, 129.3, 129.1 (2C), 128.93 (2C), 128.87 (2C), 128.0 (2C), 126.5 (2C), 123.7, 110.1, 79.4, 48.2, 43.9, 38.8, 28.5 (2C), 28.4, 25.0, 23.2, 22.2; HRMS (ESI) m/z: [M+H]$^+$ calcd for C$_{31}$H$_{36}$N$_3$O$_3$ 474.2751, found 474.2755. HPLC: Chiralcel ADH, 2% EtOH/hexanes over 60 min, flow rate=1.0 mL/min, λ=254 nm, (S) t$_R$=35.1 min, (R) t$_R$=47.7 min, ee=73%. Note alternative SFC conditions: Chiralpak-IC semiprep, 18% MeOH/CO$_2$ over 18 min, 70 uL injection, flow rate=8.0 mL/min, λ=220 nm, (S) t$_R$=12.2 min, (R) t$_R$=10.8 min, ee=73%.

Synthesis of α,β-Unsaturated Esters

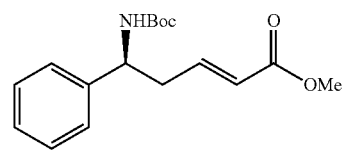

4a

Methyl (S,E)-5-((tert-butoxycarbonyl)amino)-5-phenylpent-2-enoate (4a). A solution of 3a (0.800 g, 1.62 mmol, 1.0 equiv) in methanol (16 mL, 0.1 M) was heated at reflux for 38 h. The reaction mixture was concentrated and purified by silica gel chromatography with isocratic elution of 5% EtOAc/hexanes to afford the title compound as a white amorphous solid (0.292 g, 0.957 mmol, 59% yield). $R_f$=0.32 (15% EtOAc/hexanes); IR (neat) 3385, 2982, 1718, 1678, 1514, 1266, 1253, 1168 cm$^{-1}$; $[\alpha]_D^{25}$=−26.0 (c 0.5, CH$_2$Cl$_2$); mp 90-92° C.; $^1$H NMR (300 MHz, CDCl$_3$) δ 7.37-7.31 (m, 2H), 7.30-7.23 (m, 3H), 6.84 (dt, J=15.6, 7.3 Hz, 1H), 5.87 (dt, J=15.6, 1.5 Hz, 1H), 4.81 (br s, 2H), 3.71 (s, 3H), 2.69 (br s, 2H), 1.41 (s, 9H); $^{13}$C NMR (126 MHz, CDCl$_3$) δ 166.6, 155.1, 144.4, 141.4, 128.9, 127.8, 126.4, 124.0, 80.0, 53.9, 51.6, 39.5, 28.5; HRMS (ESI) m/z: [M+Na]$^+$ calcd for C$_{17}$H$_{23}$NNaO$_4$ 328.1519, found 328.1517.

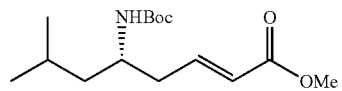

4b

Methyl (S,E)-5-((tert-butoxycarbonyl)amino)-7-methyloct-2-enoate (4b). The reaction was carried out according to General Procedure C. A solution of ester 3b (2.16 g, 4.57 mmol, 1.0 equiv) in MeOH (46 mL) was heated at reflux (60° C.) for 18 h. The reaction mixture was concentrated. Flash column chromatography carried out on silica gel using a gradient elution of 5-8% EtOAc/hexanes afforded the title compound as a colorless sticky oil (1.14 g, 4.36 mmol, 88% yield) with minor impurities. $R_f$=0.49 (15% EtOAc/hexanes); IR (neat) 3347, 2956, 1687, 1659, 1519, 1167 cm$^{-1}$; $[\alpha]_D^{25}$=−30.8 (c 1.0, CH$_2$Cl$_2$); $^1$H NMR (400 MHz, CDCl$_3$) δ 6.91 (dt, J=15.3, 7.5 Hz, 1H), 5.86 (dt, J=15.6, 1.5 Hz, 1H), 4.30 (d, J=9.0 Hz, 1H), 3.80 (m, 1H), 3.72 (s, 3H), 2.46-2.26 (m, 2H), 1.65 (m, 1H), 1.42 (m, 9H), 1.28 (m, 2H), 0.90 (d, J=6.6 Hz, 6H); $^{13}$C NMR (101 MHz, CDCl$_3$) δ 166.8, 155.5, 145.3, 123.7, 79.4, 51.6, 48.0, 44.0, 38.6, 28.5, 28.4, 25.0, 23.1, 22.2; HRMS (ESI) m/z: [M+Na]$^+$ calcd for C$_{15}$H$_{27}$NNaO$_4$ 308.1832, found 308.1831.

Synthesis of β,γ-Unsaturated Esters

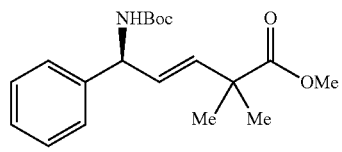

5a

Methyl (S,E)-5-((tert-butoxycarbonyl)amino)-2,2-dimethyl-5-phenylpent-3-enoate (5a). A solution of n-BuLi (2.5 M hexanes, 0.26 mL, 0.650 mmol, 2.4 equiv) was added dropwise to a solution of diisopropylamine (0.10 mL, 0.704 mmol, 2.6 equiv) in anhydrous THF (1.5 mL) at −78° C. The reaction was kept at the same temperature for 15 min, and warmed to 0° C. for 15 min. The reaction was then cooled to −78° C. and DMPU (0.07 mL, 0.567 mmol, 2.1 equiv) was added and stirred for 15 min. A solution of ester 4a (81.6 mg, 0.267 mmol, 1.0 equiv) in anhydrous THF (2.7 mL) was added over a period of 20 min. After the addition was complete, the reaction was stirred for 30 min at −78° C. Iodomethane (0.05 mL, 0.795 mmol, 3.0 equiv) was added and stirred for 20 min at −78° C. The reaction mixture was warmed to −40° C. and stirred for 1.5 h. The reaction was quenched with saturated NH$_4$Cl (10 mL) and H$_2$O (10 mL) and extracted with CH$_2$Cl$_2$ (3×10 mL). The combined organic layers were dried over Na$_2$SO$_4$, filtered, and concentrated. Flash column chromatography was carried out on silica gel using an isocratic elution of 5% EtOAc/hexanes gave the title compound as a pale yellow oil (0.0577 g, 0.173 mmol, 65% yield). IR (neat) 3349, 2977, 1693, 1494, 1365, 1246, 1141, 699 cm$^1$; $[\alpha]_D^{24}$=−15.3 (c 0.5, CH$_2$Cl$_2$); $^1$H NMR (300 MHz, CDCl$_3$) δ 7.36-7.30 (m, 2H), 7.29-7.24 (m, 3H), 5.84 (dd, J=15.7, 1.5 Hz, 1H), 5.63 (dd, J=15.7, 5.8 Hz, 1H), 5.29 (br s, 1H), 4.83 (br s, 1H), 3.67 (s, 3H), 1.43 (s, 10H), 1.31 (d, J=1.8 Hz, 6H); $^{13}$C NMR (126 MHz, CDCl$_3$) δ 176.8, 155.1, 141.6, 136.0, 128.8, 128.5, 127.6, 127.1, 125.8, 79.8, 55.9, 52.2, 44.2, 28.5, 25.3, 25.2; HRMS (ESI) m/z: [M+H]$^+$ calcd for C$_{19}$H$_{23}$NO$_4$ 334.2013, found 344.2005.

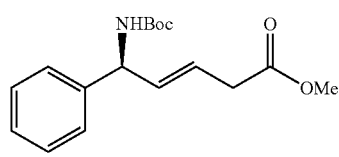

5b

Methyl (S,E)-5-((tert-butoxycarbonyl)amino)-5-phenylpent-3-enoate (5b). A solution of n-BuLi (2.32 M in hexanes, 0.42 mL, 0.974 mmol, 2.2 equiv) was added dropwise to a solution of diisopropylamine (0.14 mL, 0.986 mmol, 2.2 equiv) in anhydrous THF (2.0 mL) at −78° C. under nitrogen atmosphere. The reaction was kept at −78° C. for 15 min and warmed to 0° C. for 15 min. The reaction was cooled to −78° C. and DMPU (0.12 mL, 0.973 mmol, 2.2 equiv) was added and stirred for 15 min. A solution of ester 4a (0.135 g, 0.442 mmol, 1.0 equiv) in anhydrous THF (4.0 mL) was added slowly over 30 min at −78° C. The reaction mixture was stirred at −78° C. for 30 min, then MeOH (0.5 mL) was added and stirred for an additional 30 min. The reaction was quenched with saturated NH$_4$Cl (10 mL) and H$_2$O (20 mL). The aqueous layer was extracted with CH$_2$Cl$_2$ (3×10 mL). The combined organic layers were dried over Na$_2$SO$_4$, filtered, and concentrated. Flash column chromatography carried out on silica gel using gradient elution of 5-10% EtOAc/hexanes afforded the title compound as a colorless solid (low-melting solid) (0.0928 g, 0.304 mmol, 69% yield) containing minor impurities. $R_f$=0.20 (15% EtOAc/hexanes); IR (neat) 3349, 2978, 1739, 1700, 1514, 1495, 1366, 1249, 1164 cm$^{-1}$; $[\alpha]_D^{25}$=−25.8 (c 0.5, CH$_2$Cl$_2$); mp 35-38° C.; $^1$H NMR (300 MHz, CDCl$_3$) δ 7.37-7.23 (m, 5H), 5.82-5.69 (m, 2H), 5.28 (br s, 1H), 4.85 (br s, 1H), 3.69 (s, 3H), 3.12 (m, 2H), 1.43 (m, 9H); $^{13}$C NMR (126 MHz, CDCl$_3$) δ 172.0, 155.1, 141.4, 134.1, 128.9, 127.7, 127.1, 123.4, 79.9, 55.9, 52.0, 37.5, 28.5; HRMS (ESI) m/z: [M+H]$^+$ calcd for C$_{17}$H$_{24}$NO$_4$ 306.1700, found 306.1709.

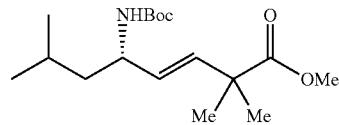

5c

Methyl (S,E)-5-((tert-butoxycarbonyl)amino)-2,2,7-trimethyloct-3-enoate (5c). A solution of n-BuLi (2.5 M in hexanes, 0.80 mL, 2.10 mmol, 2.2 equiv) was added dropwise to a solution of diisopropylamine (0.30 mL, 2.12 mmol, 2.2 equiv) in anhydrous THF (4.2 mL) at −78° C. The reaction was kept at −78° C. for 15 min and warmed to 0° C. for 15 min. The reaction was cooled to −78° C. and DMPU (0.26 mL, 2.11 mmol, 2.2 equiv) was added and stirred for 15 min. A solution of ester 4b (0.272 g, 0.952 mmol, 1.0 equiv) in anhydrous THF (9.5 mL) was added slowly over 30 min and stirred for 20 min at −78° C. MeI (0.18 mL, 2.28 mmol, 3.0 equiv) was added and stirred for 30 min at −78° C. The reaction mixture was warmed to −40° C. and stirred for 1 h. The reaction mixture was quenched with saturated NH$_4$Cl (20 mL) and H$_2$O (20 mL). The aqueous layer was extracted with CH$_2$Cl$_2$ (3×15 mL). The combined organic layers were dried over Na$_2$SO$_4$, filtered, and concentrated. Flash column chromatography carried out on silica gel using isocratic elution of 5% EtOAc/hexanes afforded the title compound as a colorless oil (0.158 g, 0.504 mmol, 53% yield). R$_f$=0.40 (15% EtOAc/hexanes); IR (neat) 3362, 2956, 1700, 1514, 1365, 1250, 1167, 1142 cm$^{-1}$; [α]$_D^{25}$=−9.4 (c 0.5, CH$_2$Cl$_2$); $^1$H NMR (400 MHz, CDCl$_3$) δ 5.75 (d, J=15.7 Hz, 1H), 5.36 (dd, J=15.9, 6.1 Hz, 1H), 4.35 (br s, 1H), 4.13 (br s, 1H), 3.65 (s, 3H), 1.61 (m, 1H), 1.43 (s, 9H), 1.34-1.25 (m, 8H, with an apparent d, 1.28 J=1.8 Hz), 0.90 (dd, J=6.6, 4.6 Hz, 6H); $^{13}$C NMR (126 MHz, CDCl$_3$) δ 177.0, 155.3, 134.7, 129.7, 79.4, 52.1, 50.4, 45.0, 44.1, 28.5, 25.2, 24.9, 22.8, 22.6; HRMS (ESI) m/z: [M+H]$^+$ calcd for C$_{17}$H$_{32}$NO$_4$ 314.2326, found 314.2341.

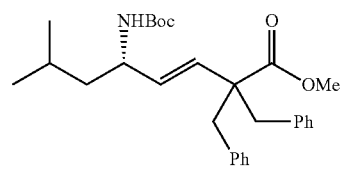

5d

Methyl (S,E)-2,2-dibenzyl-5-((tert-butoxycarbonyl)amino)-7-methyloct-3-enoate (5d). A solution of n-BuLi (2.32 M in hexanes, 0.33 mL, 0.766 mmol, 2.2 equiv) was added dropwise to a solution of diisopropylamine (0.11 mL, 0.775 mmol, 2.2 equiv) in anhydrous THF (1.5 mL) at −78° C. The reaction was kept at −78° C. for 15 min, and warmed to 0° C. for 15 min. The reaction was cooled to −78° C. and DMPU (0.10 mL, 0.810 mmol, 2.3 equiv) was added and stirred for 15 min. A solution of ester 4b (0.100 g, 0.350 mmol, 1.0 equiv) in anhydrous THF (3.5 mL) was added slowly over 30 min at −78° C. The reaction mixture was warmed to −45° C. over 30 min, and benzylbromide (0.2 mL, 1.63 mmol, 4.6 equiv) was added. The reaction mixture was allowed to warm to r.t. overnight (ca. 14 h). The reaction was quenched with saturated NH$_4$Cl (10 mL) and H$_2$O (10 mL). The aqueous layer was extracted with CH$_2$Cl$_2$ (3×15 mL). The combined organic layers were dried over Na$_2$SO$_4$, filtered, and concentrated. Flash column chromatography carried out on silica gel using isocratic elution of 5% EtOAc/hexanes afforded the title compound as a colorless oil (0.0863 g, 0.185 mmol, 53% yield). R$_f$=0.56 (15% EtOAc/hexanes); IR (neat) 3379, 2953, 2929, 1701, 1496, 1365, 1167 cm$^{-1}$; [α]$_D^{24}$=−8.8 (c 0.5, CH$_2$Cl$_2$, 33-50% ee); $^1$H NMR (300 MHz, CDCl$_3$) δ 7.25-7.17 (m, 6H), 7.10-7.06 (m, 4H), 5.79 (d, J=16.6 Hz, 1H), 5.38 (d, J=16.2, 6.4 Hz, 1H), 4.29 (br s, 1H), 4.15 (br s, 1H), 3.62 (s, 3H), 3.21 (dd, J=13.8, 5.8 Hz, 2H), 3.00 (dd, J=13.7, 8.1 Hz, 2H), 1.55-1.43 (m, 10H, with app s, 1.46 ppm), 1.31-1.21 (m, 2H), 0.86 (d, J=6.5 Hz, 6H); $^3$C NMR (126 MHz, CDCl$_3$) δ 174.9, 155.3, 137.3, 132.9, 131.1, 130.4, 128.0, 126.6, 79.2, 53.9, 51.8, 50.9, 44.7, 44.4, 44.2, 28.6, 24.7, 22.6; HRMS (ESI) m/z: [M+Na]$^+$ calcd for C$_{29}$H$_{39}$NNaO$_4$ 488.2771, found 488.2770.

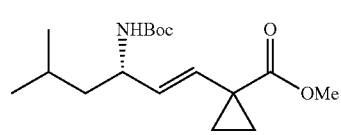

5e

Methyl (S,E)-1-(3-((tert-butoxycarbonyl)amino)-5-methylhex-1-en-1-yl)cyclopropane-1-carboxylate (5e). A solution of n-BuLi (2.35 M in hexanes, 0.33 mL, 0.776 mmol, 2.2 equiv) was added dropwise to a solution of diisopropylamine (0.11 mL, 0.775 mmol, 2.2 equiv) in anhydrous THF (1.8 mL) at −78° C. under nitrogen atmosphere. The reaction was kept at −78° C. for 15 min, and warmed to 0° C. for 15 min. The reaction cooled to −78° C. and DMPU (0.10 mL, 0.810 mmol, 2.3 equiv) was added and stirred for 15 min. A solution of ester 4b (0.100 g, 0.350 mmol, 1.0 equiv) in anhydrous THF (3.5 mL) was added slowly over 30 min at −78° C. The reaction mixture was warmed to −45° C. over 30 min and 1,2-dibromoethane (0.05 mL, 0.574 mmol, 1.6 equiv) was added. The reaction mixture was allowed to warm to r.t. overnight (ca 12 h). The reaction was quenched with saturated NH$_4$Cl (20 mL) and H$_2$O (10 mL). The aqueous layer was extracted with CH$_2$Cl$_2$ (3×15 mL). The combined organic layers were dried over Na$_2$SO$_4$, filtered, and concentrated. Flash column chromatography carried out on silica gel using an isocratic elution of 5% EtOAc/hexanes afforded the title compound as a colorless oil (0.0488 g, 0.156 mmol, 45% yield). R$_f$=0.38 (15% EtOAc/hexanes); IR (neat) 3361, 2955, 1692, 1513, 1365, 1251, 1154 cm$^{-1}$; [α]$_D^{25}$=−19.2 (c 0.5, CH$_2$Cl$_2$, 72-76% ee); $^1$H NMR (400 MHz, CDCl$_3$) δ 6.20 (d, J=15.6, 1.3 Hz, 1H), 5.23 (d, J=15.6 Hz, 1H), 4.36 (br s, 1H), 4.13 (br s, 1H), 3.67 (s, 3H), 1.67-1.55 (m, 1H), 1.49-1.39 (m, 11H, apparent s, 1.44 ppm), 1.37-1.25 (m, 2H), 0.99 (q, J=3.8 Hz, 2H), 0.90 (dd, J=6.6, 2.1 Hz, 6H); 3C NMR (126 MHz, CDCl$_3$) δ 175.0, 155.3, 129.5, 128.5, 79.3, 52.2, 50.3, 44.9, 28.6, 24.9, 24.6, 22.8, 22.6, 18.6; HRMS (ESI) m/z: [M+H]$^+$ calcd for C$_{17}$H$_{30}$NO$_4$ 312.2169, found 312.2183.

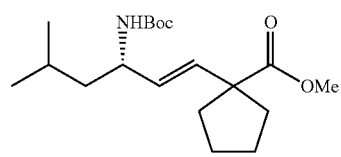

5f

Methyl (S,E)-1-(3-((tert-butoxycarbonyl)amino)-5-methylhex-1-en-1-yl)cyclopentane-1-carboxylate (5f). A solution of n-BuLi (2.32 M in hexanes, 0.65 mL, 1.51 mmol, 2.3 equiv) was added dropwise to a solution of diisopropylamine (0.21 mL, 1.48 mmol, 2.2 equiv) in anhydrous THF (3.0 mL) at −78° C. under nitrogen atmosphere. The reaction was kept at −78° C. for 15 min and warmed to 0° C. for 15 min. The reaction cooled to −78° C. and DMPU (0.18 mL, 1.46 mmol, 2.2 equiv) was added and stirred for 15 min. A solution of ester 4b (0.189 g, 0.663 mmol, 1.0 equiv) in anhydrous THF (6.6 mL) was added slowly over 30 min at −78° C. The reaction mixture was warmed to −45° C. over 30 min and 1,2-diiodobutane (0.2 mL, 1.50 mmol, 2.3 equiv) was added. The reaction mixture was allowed to warm to r.t. overnight (ca. 12 h). The reaction was quenched with saturated NH$_4$Cl (20 mL) and H$_2$O (10 mL). The aqueous layer was extracted with CH$_2$Cl$_2$ (3×15 mL). The combined organic layers were dried over Na$_2$SO$_4$, filtered, and concentrated. Flash column chromatography carried out on silica gel using an isocratic elution of 4% EtOAc/hexanes afforded the title compound as a colorless oil (0.100 g, 0.297 mmol, 45% yield). R$_f$=0.38 (15% EtOAc/hexanes); IR (neat) 3366, 2955, 2871, 1699, 1512, 1365, 1245, 1164 cm$^{-1}$; $[\alpha]_D^{25}$=−16.0 (c 0.5, CH$_2$Cl$_2$, 72-76% ee); $^1$H NMR (400 MHz, CDCl$_3$) δ 5.74 (d, J=15.7 Hz, 1H), 5.34 (d, J=15.7, 6.5 Hz, 1H), 4.34 (br s, 1H), 4.12 (br s, 1H), 3.65 (s, 3H), 2.17-2.11 (m, 2H), 1.72-1.56 (m, 7H), 1.43 (s, 9H), 1.34-1.27 (m, 2H), 0.90 (dd, J=6.6, 4.9 Hz, 6H); $^{13}$C NMR (151 MHz, CDCl$_3$) δ 176.6, 155.3, 133.1, 130.4, 79.3, 56.0, 52.2, 50.6, 44.9, 35.9, 35.8, 28.5, 24.9, 24.0, 22.7; HRMS (ESI) m/z: [M+H]$^+$ calcd for C$_{19}$H$_{34}$NO$_4$ 340.2482, found 340.2494.

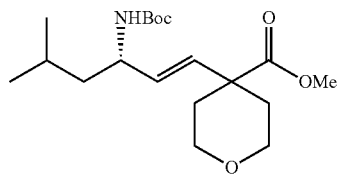

5g

Methyl (S,E)-4-(3-((tert-butoxycarbonyl)amino)-5-methylhex-1-en-1-yl)tetrahydro-2H-pyran-4-carboxylate (5g). A solution of n-BuLi (2.32 M in hexanes, 1.0 mL, 2.5 equiv) was added dropwise to a solution of diisopropylamine (0.33 mL, 2.32 mmol, 2.5 equiv) in anhydrous THF (4.6 mL) at −78° C. under nitrogen atmosphere. The reaction was kept at −78° C. for 15 min and warmed to 0° C. for 15 min. The reaction was cooled to −78° C. and DMPU (0.34 mL, 2.76 mmol, 3.0 equiv) was added and stirred for 15 min. A solution of ester 4b (0.262 g, 0.918 mmol, 1.0 equiv) in anhydrous THF (9.2 mL) was added slowly over 30 min at −78° C. The reaction mixture was warmed to −45° C. over 30 min, and bis(2-bromodiethyl)ether (0.40 mL, 2.86 mmol, 3.1 equiv) was added. The reaction mixture was allowed to warm to r.t. overnight (ca. 20 h). The reaction was quenched with saturated NH$_4$Cl (10 mL) and H$_2$O (10 mL). The aqueous layer was extracted with CH$_2$Cl$_2$ (3×15 mL). The combined organic layers were dried over Na$_2$SO$_4$, filtered, and concentrated. Flash column chromatography carried out on silica gel using gradient elution of 8-15% EtOAc/hexanes afforded the title compound as a pale yellow oil (0.142 g, 0.400 mmol, 44% yield). R$_f$=0.21 (15% EtOAc/hexanes); IR (neat) 3333, 2956, 2932, 2869, 1729, 1712, 1515, 1366, 1221, 1247, 1194, 1165, 1103 cm$^-$; $[\alpha]_D^{23}$=−12.2 (c 0.5, CH$_2$Cl$_2$, 75% ee); $^1$H NMR (400 MHz, CDCl$_3$) δ 5.56 (d, J=15.8 Hz, 1H), 5.39 (dd, J=15.8, 6.4 Hz, 1H), 4.34 (br s, 1H), 4.13 (br s, 1H), 3.80-3.75 (m, 2H), 3.70 (s, 3H), 3.53-3.47 (m, 2H), 2.15-2.09 (m, 2H), 1.70 (ddd, J=13.5, 9.3, 3.9 Hz, 2H), 1.65-1.60 (m, 1H), 1.43 (s, 9H), 1.34-1.25 (m, 2H), 0.90 (m, 6H); $^{13}$C NMR (126 MHz, CDCl$_3$) δ 174.8, 155.2, 132.9, 132.4, 79.5, 65.2, 52.3, 50.7, 46.4, 44.7, 34.0, 33.8, 28.5, 24.9, 22.7, 22.6; HRMS (ESI) m/z: [M+Na]$^+$ calcd for C$_{19}$H$_{33}$NO$_5$ 378.2251, found 378.2250.

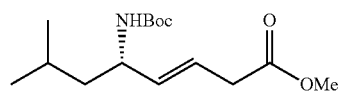

5h

Methyl (S,E)-5-((tert-butoxycarbonyl)amino)-7-methyloct-3-enoate (5h). General procedure: A solution of 4b (1.00 g, 3.50 mmol, 1.0 equiv) and 1,2-dimethylimidazole (1.5 equiv) in degassed MeOH (0.1 M) was irradiated with 15-W low-mercury pressure lamps housed in a Rayonet for 24 h in a 100 mL quartz cuvette round bottom flask. The constitutional isomers were separated via silica gel chromatography using isocratic elution of 5% EtOAc/hexanes to afford the title compound as a colorless sticky oil (0.575 g, 2.01 mmol, 57% yield) and cis-alkene as a colorless oil (0.0804 g, 0.282 mmol, 8% yield). Note cis-alkene was recovered from 24 h irradiation and subjected 4 rounds of 24 h irradiation with 1,2-dimethylimidazole (1.5 equiv) in order to obtain the combined yield of the title compound. (5h) trans-alkene: R$_f$=0.40 (15% EtOAc/hexanes); IR (neat) 3367, 2956, 1740, 1694, 1513, 1365, 1247, 1161 cm$^{-1}$; $[\alpha]_D^{25}$=−7.0 (c 0.5, CH$_2$Cl$_2$); $^1$H NMR (400 MHz, CDCl$_3$) δ 5.68 (dtd, J=15.3, 6.9, 1.3 Hz, 1H), 5.48 (dd, J=15.0, 5.3 Hz, 1H), 4.39 (br s, 1H), 4.15 (br s, 1H), 3.67 (s, 3H), 3.06 (d, J=7.0 Hz, 2H) 1.67-1.61 (m, 1H), 1.43 (s, 9H), 1.35-1.31 (m, 2H), 0.91 (dd, J=6.6, 2.3 Hz, 6H); $^{13}$C NMR (151 MHz, CDCl$_3$) δ 172.2, 155.4, 135.5, 121.9, 79.4, 52.0, 44.7, 37.7, 28.5, 24.8, 22.8, 22.5; HRMS (ESI) m/z: [M+Na]$^+$ calcd for C$_{15}$H$_{27}$NNaO$_4$ 308.1832, found 308.1829. (5h') cis-alkene: R$_f$=0.45 (15% EtOAc/hexanes); IR (neat) 3374, 2956, 1740, 1693, 1511, 1164 cm$^{-1}$; $[\alpha]_D^{25}$=+31.0 (c 0.5, CH$_2$Cl$_2$); $^1$H NMR (400 MHz, CDCl$_3$) δ 5.65 (dt, J=10.7, 7.2 Hz, 1H), 5.35 (m, 1H), 4.35 (m, 2H), 3.68 (s, 3H), 3.27 (d, J=6.8 Hz, 2H), 1.66-1.55 (m, 1H), 1.49-1.37 (m, 10H, with an apparent s, 1.42 ppm), 1.24 (m, 1H), 0.91 (dd, J=9.1, 6.6 Hz, 6H); $^{13}$C NMR (101 MHz, CDCl$_3$) δ 172.3, 155.3, 134.5, 123.1, 79.4, 51.9, 46.4, 45.0, 33.1, 28.5, 24.8, 22.7; HRMS (ESI) m/z: [M+Na]$^+$ calcd for C$_{15}$H$_{27}$NNaO$_4$ 308.1832, found 308.1831.

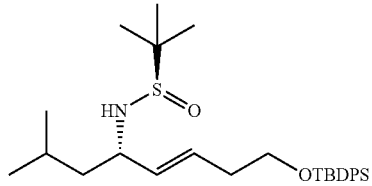

8

(R)—N—((S,E)-8-((tert-Butyldiphenylsilyl)oxy)-2-methyl-oct-5-en-4-yl)-2-methylpropane-2-sulfinamide (8). To a solution of 7 (8.32 g, 27.0 mmol, 1.7 equiv) in anhydrous CH$_2$Cl$_2$ (135 mL, 0.2 M) was added Schwartz's reagent (6.54 g, 25.4 mmol, 1.6 equiv) in three portions at r.t. under nitrogen atmosphere. The reaction was stirred for 10 min, and then the reaction mixture was cooled to 0° C. To the cooled solution was added freshly prepared AlMe$_3$ (2.1 M in CH$_2$Cl$_2$, 13 mL, 1.7 equiv) dropwise over 30 min. After stirring for an additional 20 min, a solution of (R,E)-2-methyl-N-(3-methylbutylidene)propane-2-sulfinamide 1c (3.00 g, 15.8 mmol, 1.0 equiv) in anhydrous CH$_2$Cl$_2$ (23 mL, 0.7 M) was added dropwise over 20 min. The resulting orange solution was allowed to warm up to r.t. over 30 min. The reaction mixture was stirred at r.t. for an additional 4 h. MeOH (15 mL) was carefully added dropwise to quench the reaction, and then followed by H₂O (15 mL). The reaction mixture was partitioned between CH₂Cl₂ and H₂O (10% HCl solution was added as necessary to help solubilize emulsion). The aqueous layer was extracted with CH₂Cl₂ (3×20 mL). The combined organic layers were dried MgSO₄, filtered, and concentrated under reduced pressure. The resulting crude was diluted with Et₂O and filtered over a plug of Celite to remove alumina salts. The resulting filtrate was concentrated under reduced pressure to obtain a yellow oil. Flash column chromatography carried out on silica gel using gradient elution of 20-40% EtOAc/hexanes afforded the title compound as a yellow oil (6.79 g, 13.6 mmol, 86% yield). $R_f$=0.25 (20% EtOAc/hexanes); IR (neat) 2955, 2930, 2859, 1472, 1428, 1386, 1362, 1106, 1051 cm⁻¹; $[\alpha]_D^{25}$=−42.8 (c 1.0, CH₂Cl₂); ¹H NMR (400 MHz, CDCl₃) δ 7.68-7.65 (m, 4H), 7.45-7.36 (m, 6H), 5.68 (dt, J=15.6, 6.9 Hz, 1H), 5.27 (ddt, J=15.4, 8.0, 1.4 Hz, 1H), 3.83 (m, 1H), 3.69 (t, J=6.5 Hz, 2H), 3.02 (d, J=3.1 Hz, 1H), 2.30 (m, 2H), 1.65 (m, 1H), 1.39 (m, 2H), 1.17 (s, 9H), 1.04 (s, 9H), 0.89 (dd, J=6.6, 4.6 Hz, 6H); ¹³C NMR (101 MHz, CDCl₃) δ 135.7, 134.0, 133.0, 130.1, 129.7, 127.8, 63.7, 55.8, 55.3, 46.0, 35.8, 26.9, 24.7, 23.2, 22.7, 22.3, 19.3; HRMS (ESI) m/z: [M+H]⁺ calcd for C₂₉H₄₆NO₂SSi 500.3013, found 500.3011.

Preparation of Schwartz' reagent: To a flame-dried 250 mL round bottom flask equipped with a magnetic stir bar under nitrogen atmosphere was added zirconocene dichloride (13.3 g, 45.5 mmol, 1.0 equiv) in anhydrous THF (120 mL, 0.4 M). Dissolution of the solid was accomplished by gentle heating with a heat gun. Lithium aluminum hydride in ether (1 M, 11.4 mL, 38.0 mmol, 0.25 equiv) was added dropwise via a syringe pump (0.3 mL/min, 12 mL syringe needle) over a 45 min period at r.t. under nitrogen atmosphere. The resulting beige suspension was stirred at r.t. for an additional 90 min. The resulting precipitate was filtered under nitrogen atmosphere using Schlenk filter with a frit. The resulting white solid was washed with THF (3×30 mL), CH₂Cl₂ (10 mL), THF (20 mL), and Et₂O (2×30 mL). The product was dried overnight under high vacuum wrapped in aluminum foil to give the reagent as a white powder (8.23 g, 31.9 mmol, 70% yield).

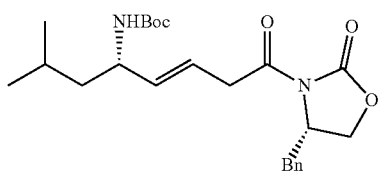

tert-Butyl ((S,E)-8-((S)-4-benzyl-2-oxooxazolidin-3-yl)-2-methyl-8-oxooct-5-en-4-yl)carbamate (11a). To a solution of tert-Butyl (S,E)-(8-hydroxy-2-methyloct-5-en-4-yl)carbamate (0.3247 g, 1.26 mmol, 1.0 equiv) in acetone (12.6 mL, 0.1 M) at 0° C. was added freshly prepared Jones reagent (2.5 M, 1.3 mL, 2.6 equiv). The reaction mixture was stirred at 0° C. for 1 h. The dark brown solution was partitioned between with Et₂O (10 mL) and H₂O (10 mL & 1 mL isopropanol). The layers were separated, and the aqueous layer was extracted with Et₂O (3×10 mL). The combined organic layers were dried over Na₂SO₄, filtered, concentrated, and dried under high vacuum. The carboxylic acid 10 was obtained as a pale yellow oil (0.300 g, 1.11 mmol 88% crude yield), and was used without further purification.

To the solution of crude carboxylic acid 10 (0.300 g, 1.10 mmol, 1.0 equiv) in anhydrous THF (11 mL, 0.1 M) at −78° C. was added TEA (0.17 mL, 1.22 mmol, 1.1 equiv) and pivaloyl chloride (0.15 mL, 1.21 mmol, 1.1 equiv). The resulting mixture was stirred at −78° C. for 20 min (white suspension), warmed to 0° C. immediately, and stirred for 30 min at 0° C. (yellow suspension). The solution was re-cooled to −78° C. and treated with lithiated Evan's auxiliary prepared in a separate flask. Preparation of lithiated Evan's auxiliary: In a separate flask, a solution of (S)-4-benzyl-2-oxazolidinone (0.228 g, 1.27 mmol, 1.15 equiv) in anhydrous THF (11 mL) at −78° C. was added n-BuLi (2.3 M in hexanes, 0.54 mL, 1.25 mmol, 1.1 equiv) and stirred for 25 min. The lithium anion was transferred to the flask containing mixed anhydride via a syringe.

The resulting solution was stirred at −78° C. for an additional 20 min. The cooling bath was removed and stirred at r.t. for 16 h. The reaction mixture was quenched with saturated NH₄Cl (10 mL) and then H₂O (10 mL). The aqueous layer was extracted with EtOAc (3×15 mL). The organic layer was dried over Na₂SO₄, filtered, and concentrated. Flash column chromatography was carried out on silica gel with gradient elution of 10-20% EtOAc/hexanes afforded the title compound as a white solid (0.207 g, 0.480 mmol, 43% yield over two steps). $R_f$=0.46 (30% EtOAc/hexanes); mp 123-126° C.; IR (neat) 3374, 2957, 1779, 1697, 1499, 1389, 1365, 1213, 1171 cm⁻¹; $[\alpha]_D^{23}$=+42.3 (c 1.0, CH₂Cl₂); ¹H NMR (400 MHz, CDCl₃) δ 7.36-7.26 (m, 3H), 7.21-7.19 (m, 2H), 5.79 (m, 1H), 5.58 (dd, J=15.2, 5.8 Hz, 1H), 4.66 (m, 1H), 4.40 (m, 1H), 4.23-4.16 (m, 3H), 3.70 (m, 2H), 3.30 (dd, J=13.4, 3.3 Hz, 1H), 2.76 (dd, J=13.4, 9.7 Hz, 1H), 1.72-1.62 (m, 1H), 1.44 (s, 9H), 1.41-1.33 (m, 2H), 0.91 (dd, J=6.6, 2.1 Hz, 6H); ¹³C NMR (126 MHz, CDCl₃) δ 171.4, 155.4, 153.5, 136.3, 135.4, 129.6, 129.1, 127.5, 121.4, 79.4, 66.4, 55.3, 50.4, 44.8, 39.0, 38.0, 28.6, 24.9, 22.9, 22.6; HRMS (ESI) m/z: [M+H]⁺ calcd for C₂₄H₃₅N₂O₅ 431.2540, found 431.2534.

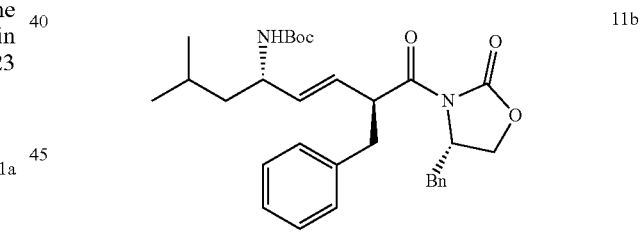

tert-Butyl ((4S,7S,E)-7-benzyl-8-((S)-4-benzyl-2-oxooxazolidin-3-yl)-2-methyl-8-oxooct-5-en-4-yl)carbamate (11b). To a −78° C. solution of 11a (0.180 g, 0.418 mmol, 1.0 equiv) in anhydrous THF (4.2 mL, 0.1 M) was added slowly a freshly prepared solution of NaHMDS (94.0 mg, 0.487 mmol, 1.2 equiv) in anhydrous THF (0.5 mL). The resulting mixture was stirred for 15 min and benzyl bromide (0.77 mL, 6.29 mmol, 15 equiv) was added. The solution was allowed to warm to −30° C. over 60 min, and kept at this temperature for an additional 1.5 h. The reaction was quenched with saturated NH₄Cl (10 mL) and H₂O (10 mL) while allowing to warm to r.t. The aqueous layer was extracted with EtOAc (3×15 mL). The combined organic layers were dried over Na₂SO₄, filtered, and concentrated. Flash column chromatography was carried out on silica gel using gradient elution of 5-20% EtOAc/hexanes afforded the title compound as a white foam (0.133 g, 0.256 mmol, 61% yield). $R_f$=0.37 (20% EtOAc/hexanes); mp 35-45° C.; IR (neat) 3379, 2955, 1776, 1694, 1497, 1384, 1365, 1207, 1167, 1105 cm$^{-1}$; $[\alpha]^{23}$=+56.1 (c 1.0, CHCl$_3$); $^1$H NMR (400 MHz, CDCl$_3$) δ 7.30-7.22 (m, 7H), 7.21-7.16 (m, 1H), 7.03-7.00 (m, 2H), 5.67 (ddd, J=15.5, 8.8, 1.2 Hz, 1H), 5.43 (m, 1H), 4.83 (m, 1H), 4.63 (m, 1H), 4.16-4.12 (m, 1H), 4.11-4.04 (m, 2H, with app dd, J=9.1, 2.7 Hz, 1H), 3.20 (dd, J=13.3, 8.0 Hz, 1H), 3.04 (dd, J=13.4, 7.3 Hz, 1H), 2.84 (dd, J=13.4, 7.3 Hz, 1H), 2.53 (dd, J=13.5, 9.3 Hz, 1H), 1.47-1.41 (m, 10H, with app s, 1.43 ppm), 1.30-1.18 (m, 2H), 0.85 (d, J=6.6 Hz, 6H); $^{13}$C NMR (151 MHz, CDCl$_3$) δ 173.7, 155.2, 153.0, 138.6, 135.7, 135.3, 129.7, 129.5, 129.0, 128.5, 127.4, 127.2, 126.6, 79.2, 65.9, 55.4, 50.5, 48.0, 44.7, 39.1, 37.8, 28.5, 24.7, 22.9, 22.6; HRMS (ESI) m/z: [M+H]$^+$ calcd for C$_{31}$H$_{41}$N$_2$O$_5$ 543.2829, found 543.2877.

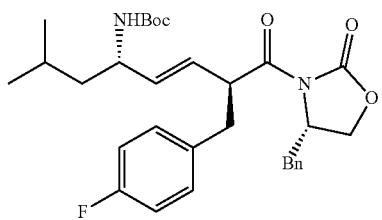

11c tert-Butyl ((4S,7S,E)-8-((S)-4-benzyl-2-oxooxazolidin-3-yl)-7-(4-fluorobenzyl)-2-methyl-8-oxooct-5-en-4-yl)carbamate (11c). To a −78° C. solution of 11a (0.201 g, 0.467 mmol, 1.0 equiv) in anhydrous THF (4.7 mL) was added slowly a freshly prepared solution of NaHMDS (~1 M in THF, 0.109 g, 0.562 mmol, 1.2 equiv in 0.6 mL THF). The reaction mixture was stirred for 15 min, and 4-fluorobenzyl bromide (0.67 mL, 5.22 mmol, 11.0 equiv) was added. The solution was stirred at −78° C. for 10 min, allowed to warm to −30° C. over 60 min, and kept at this temperature for 1.5 h. The reaction was quenched with saturated NH$_4$Cl (5 mL) and H$_2$O (5 mL). The aqueous solution was extracted with CH$_2$Cl$_2$ (3×15 mL). The combined organic layers were dried over Na$_2$SO$_4$, filtered, and concentrated. Flash column chromatography carried out on silica gel using gradient elution of 10-20% EtOAc/hexanes afforded the title compound as a colorless oil (0.178 g, 0.219 mmol, 71% yield). R$_f$=0.31 (20% EtOAc/hexanes); IR (neat) 3370, 2957, 1777, 1695, 1509, 1385, 1366, 1220, 1168, 1096, 1045, 1015, 971 cm$^{-1}$; mp 65° C. (softening point: 55° C.); $^1$H NMR (400 MHz, CDCl$_3$) δ 7.34-7.24 (m, 3H), 7.22-7.17 (m, 2H), 7.07-7.04 (m, 2H), 6.98-6.94 (m, 2H), 5.65 (dd, J=15.5, 8.9 Hz, 1H), 5.41 (dd, J=15.8, 6.1 Hz, 1H), 4.79-4.73 (m, 1H), 4.66-4.60 (m, 1H), 4.18-4.02 (m, 3H), 3.17 (dd, J=13.5, 7.7 Hz, 1H), 3.08 (dd, J=13.5, 3.3 Hz, 1H), 2.79 (dd, J=13.5, 7.5 Hz, 1H), 2.58 (dd, J=13.4, 9.3 Hz, 1H), 1.43 (s, 9H) 1.30-1.19 (m, 3H), 0.86 (m, 6H); $^{13}$C NMR (101 MHz, CDCl$_3$) δ 173.6, 163.0, 160.6, 155.2, 153.1, 136.0, 135.2, 134.30, 134.27, 131.2, 131.1, 129.5, 129.1, 127.5, 126.9, 115.3, 115.1, 79.3, 66.0, 55.4, 50.5, 48.1, 44.7, 38.2, 37.8, 28.5, 24.7, 22.6; HRMS (ESI) m/z: [M+H]$^+$ calcd for C$_{31}$H$_{40}$FN$_2$O$_5$ 539.2916, found 539.2911.

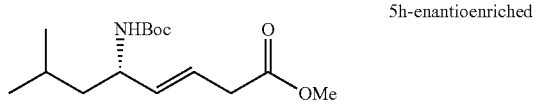 [SMILES: COC(=O)C/C=C/[C@H](CC(C)C)NC(=O)OC(C)(C)C]

5h-enantioenriched

Methyl (S,E)-5-((tert-butoxycarbonyl)amino)-7-methyloct-3-enoate, (5h). To a solution of crude carboxylic acid (10) (0.175 g, 0.645 mmol, 1.0 equiv) in dry acetonitrile (12 mL) was added anhydrous K$_2$CO$_3$ (0.445 g, 3.22 mmol, 5.0 equiv) followed by MeI (0.42 mL, 6.68 mmol, 10 equiv). The reaction mixture was stirred in the dark at r.t. for 24 h under nitrogen atmosphere. The reaction mixture was diluted with H$_2$O (20 mL) and extracted with CH$_2$Cl$_2$ (3×15 mL). The combined organic layers were dried over Na$_2$SO$_4$, filtered, and concentrated. Flash column chromatography carried out on silica gel using isocratic elution of 5% EtOAc/hexanes afforded the title compound as a colorless oil (0.115 g, 0.402 mmol, 62% yield over two steps). R$_f$=0.35 (10% EtOAc/hexanes); IR (neat) 3354, 2956, 2871, 1740, 1693, 1514, 1365, 1247, 1162, 1017, 968 cm$^{-1}$; $[\alpha]_D^{24}$=−14.0 (c 0.5, CH$_2$Cl$_2$); $^1$H NMR (400 MHz, CDCl$_3$) δ 5.69 (dtd, J=15.3, 6.9, 1.3 Hz, 1H), 5.49 (m, 1H), 4.38 (br s, 1H), 4.15 (br s, 1H), 3.68 (s, 3H), 3.08 (d, J=6.9 Hz, 2H), 1.70-1.60 (m, 1H), 1.44 (s, 9H), 1.37-1.30 (m, 2H), 0.91 (dd, J=6.6, 2.3 Hz, 6H); $^{13}$C NMR (126 MHz, CDCl$_3$) δ 172.2, 155.4, 135.4, 121.9, 79.4, 51.9, 50.3, 44.7, 37.7, 28.5, 24.8, 22.8, 22.5; HRMS (ESI) m/z: [M+H]$^+$ calcd for C$_{15}$H$_{28}$NO$_4$ 286.2013, found 286.2027.

Synthesis of Primary Amides

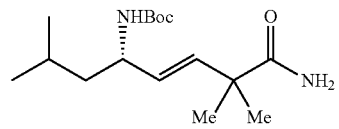

12a (S,E)-(8-amino-2,7,7-trimethyl-8-oxooct-5-en-4-yl)carbamate (12a). To a solution of ester 5c (0.143 g, 0.455 mmol, 1.0 equiv) in THF (4.5 mL, 0.1 M) was added LiOH (1.0 M in H$_2$O, 2.3 mL, 5.0 equiv) at rt. The reaction mixture was heated at reflux for 14 h. The reaction mixture was acidified with 1 M KHSO$_4$ (ca. 2 mL) at 0° C. The aqueous layer was extracted with EtOAc (3×10 mL). The combined organic layers were dried over Na$_2$SO$_4$, filtered, concentrated, and dried under high vacuum to afford the carboxylic acid as a colorless oil.

To a 0° C. cooled solution of crude carboxylic acid in anhydrous CH$_2$Cl$_2$ (4.5 mL), was added EDC.HCl (132 mg, 0.688 mmol, 1.5 equiv) and HOBT.H$_2$O (95.0 mg, 0.693 mmol, 1.5 equiv). The reaction mixture was stirred for 1 h at r.t. under nitrogen atmosphere. Ammonium bicarbonate (360 mg, 4.55 mmol, 10.0 equiv) was added portion-wise over 1 h and stirred overnight (ca 20 h) at rt. The reaction mixture was filtered to remove by-products and the filtrate was concentrated under reduced pressure. Flash column chromatography carried out on silica gel using gradient elution of 40-50% EtOAc/hexanes afforded the title compound as a white solid (79.3 mg, 0.266 mmol, 59% yield). R$_f$=0.58 (80% EtOAc/hexanes); mp 104-109° C. $[\alpha]_D^{25}$=−8.4 (c 0.5, MeOH); IR (neat) 3316, 2959, 1662, 1519, 1389, 1365, 1168 cm$^{-1}$; $^1$H NMR (400 MHz, CD$_3$OD) δ 6.68 (d, J=8.2 Hz, 1H), 5.76 (dd, J=15.8, 1.2 Hz, 1H), 5.48 (dd, J=15.7, 6.6 Hz, 1H), 4.02 (m, 1H), 1.72-1.58 (m, 1H), 1.43 (s, 9H), 1.42-1.36 (m, 1H), 1.33-1.27 (m, 1H), 1.25 (d, J=2.8 Hz, 6H), 0.92 (d, J=6.6 Hz, 6H); $^{13}$C NMR (101 MHz, CD$_3$OD) δ 182.3, 158.1, 136.2, 132.1, 80.0, 52.2, 45.0, 28.8, 25.93, 25.89, 25.5, 23.1, 22.6; HRMS (ESI) m/z: [M+Na]$^+$ calcd for C$_{16}$H$_{30}$N$_2$NaO$_3$ 321.2149, found 321.2147.

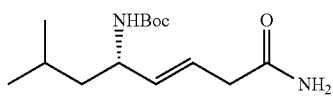

tert-Butyl (S,E)-(8-amino-2-methyl-8-oxooct-5-en-4-yl)carbamate (12b). A solution of 5h (0.200 g, 0.700 mmol, 1.0 equiv) in ammonia (7 N in MeOH, 3.5 mL) was heated at 60° C. for 48 h in a microwave vial. The reaction progress was monitored by TLC. After 48 h, additional ammonia (7 N in MeOH, 1.0 mL) was added and heated at 60° C. for another 72 h. The solution was concentrated and the residue was purified by flash column chromatography on silica gel with a gradient elution of 20-100% EtOAc/hexanes to afford the title compound as a white powder (0.159 g, 0.591 mol, 84% yield). $R_f$=0.25 (80% EtOAc/hexanes); IR (neat) 3354, 3198, 2959, 2869, 1677, 1628, 1517, 1366, 1249, 1166 cm$^{-1}$; $[\alpha]_D^{25}$=+3.4 (c 0.5, CH$_2$Cl$_2$); mp 85-90° C.; $^1$H NMR (300 MHz, CD$_2$Cl$_2$) δ 6.18 (br s, 1H), 5.71 (dtd, J=15.6, 7.3, 1.1 Hz, 1H), 5.47 (ddt, J=15.3, 6.8, 1.2 Hz), 4.58 (br s, 1H), 4.02 (m, 1H), 2.93 (d, J=7.3 Hz, 2H), 1.64 (m, 1H), 1.47-1.26 (m, 11H, apparent s at 1.40 ppm), 0.91 (dd, J=6.6, 1.3 Hz, 6H); $^{13}$C NMR (101 MHz, CD$_2$Cl$_2$) δ 173.6, 156.0, 137.3, 124.4, 79.6, 51.8, 44.4, 39.9, 28.7, 25.5, 22.9, 22.8; HRMS (ESI) m/z: [M+H]$^+$ calcd for C$_{14}$H$_{27}$N$_2$O$_3$ 271.2016, found 271.2021.

Enantioenriched batch: To a 0° C. solution of carboxylic acid 10 (0.348 g, 1.28 mmol, 1.0 equiv) in anhydrous CH$_2$Cl$_2$ (13 mL, 0.1 M) was added EDC.HCl (0.369 g, 1.92 mmol, 1.5 equiv) and HOBT.H$_2$O (0.260 g, 1.92 mmol, 1.5 equiv). The reaction mixture was stirred at r.t. for 1 h under nitrogen atmosphere. Ammonium bicarbonate (1.01 g, 12.8 mmol, 10 equiv) was added portion-wise over 1 h. The round bottom flask was sealed with a septum and stirred for 24 h at r.t. The reaction mixture was filtered to remove the white solids and washed using CH$_2$Cl$_2$. The filtrate was concentrated under reduced pressure and purified by flash column chromatography on silica gel with gradient elution of 40-90% EtOAc/hexanes to afford the title compound as a white solid (0.193 g, 0.714 mmol, 56% yield over two steps). $R_f$=0.21 (70% EtOAc/hexanes); IR (neat) 3326, 2957, 2870, 1674, 1521, 1391, 1366, 1249, 1169 cm$^{-1}$; $[\alpha]_D^{23}$=−25.2 (c 0.5, MeOH); $^1$H NMR (500 MHz, CD$_3$OD) δ 5.68 (dtd, J=15.4, 7.1, 1.2 Hz, 1H), 5.52 (dd, J=15.4, 6.3 Hz, 1H), 4.06 (br s, 1H), 2.93 (d, J=7.0 Hz, 2H), 1.69-1.59 (m, 1H), 1.44 (s, 9H), 1.40-1.36 (m, 1H), 1.32-1.26 (m, 1H), 0.92 (dd, J=6.7, 1.9 Hz, 6H); $^{13}$C NMR (126 MHz, CDCl$_3$) δ 177.0, 157.9, 136.9, 124.1, 79.9, 51.6, 45.2, 40.0, 28.8, 25.9, 23.2, 22.6; HRMS (ESI) m/z: [M+H]$^+$ calcd for C$_{14}$H$_{27}$N$_2$O$_3$ 271.2016, found 271.2028.

Synthesis of Intermediates Via Cross-Metathesis Route

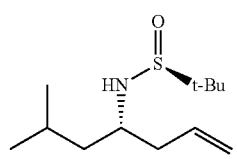

(S)-2-Methyl-N—((S)-6-methylhept-1-en-4-yl)propane-2-sulfinamide (13a). A suspension of indium powder (1.21 g, 10.5 mmol, 4.0 equiv) and (S,E)-2-methyl-N-(3-methylbutylidene)propane-2-sulfinamide 1d (0.500 g, 2.64 mmol, 1.0 equiv) in saturated NaBr (0.05 M, 52 mL) was treated with allyl bromide (0.92 mL, 10.5 mmol) at room temperature. After 14 h, the reaction mixture was transferred to a separatory funnel using H$_2$O (50 mL) to rinse the reaction flask. The aqueous layer was extracted with EtOAc (3×20 mL). The combined organic layers were washed with saturated NaHCO$_3$ (2×10 mL), brine (10 mL), dried over Na$_2$SO$_4$, filtered, and concentrated. Flash column chromatography carried out on silica gel using gradient elution of 10-25% EtOAc/hexanes afforded the title compound as a white sticky solid (0.544 g, 2.35 mmol, 89% yield). $R_f$=0.43 (25% EtOAc/hexanes); IR (neat) 3187, 2956, 2927, 2869, 1640, 1468, 1388, 1363, 1172, 1146, 1044, 910 cm$^{-1}$; $[\alpha]_D^{25}$=+49.8 (c 0.5, CH$_2$Cl$_2$); $^1$H NMR (300 MHz, CDCl$_3$) δ 5.86-5.72 (m, 1H), 5.18-5.10 (m, 2H), 3.42-3.31 (m, 1H), 3.16 (d, J=7.5 Hz, 1H), 2.46-2.60 (m, 2H), 1.80-1.66 (m, 1H), 1.43-1.24 (m, 2H), 1.19 (s, 9H), 0.93-0.87 (m, 6H); 13C NMR (75 MHz, CDCl$_3$) δ 134.2, 119.1, 56.0, 53.8, 44.8, 41.3, 24.7, 23.2, 22.8, 22.2; HRMS (ESI) m/z: [M+H]$^+$ calcd for C$_{12}$H$_{26}$NOS 232.1730, found 232.1745.

(S)-2-Methyl-N—((S)-6-methylhept-1-en-4-yl)propane-2-sulfinamide (13a). The reaction was scaled up and the procedure was modified as described. To a suspension of indium powder (2.05 g, 16.9 mmol, 325 mesh) in saturated NaBr (50 mL) was added (S,E)-2-methyl-N-(3-methylbutylidene)propane-2-sulfinamide (1d, 2.12 g, 11.2 mmol) in THF (10 mL). To this mixture was added allylbromide (2.0 mL, 22.7 mmol) at room temperature and the mixture was sonicated (approx. 2 min) and vigorously stirred. After 17 h, the mixture was filtered through Celite and rinsed with EtOAc. The filtrate was extracted with EtOAc, washed with brine, dried (Na$_2$SO$_4$), filtered and concentrated to give a crude oil (2.62 g) that was purified by chromatography on SiO$_2$ (ISCO-Rf, 0-100% EtOAc/hexanes) to give (S)-2-methyl-N—((S)-6-methylhept-1-en-4-yl)propane-2-sulfinamide as a colorless oil (13a, 2.33 g, 90%). $^1$H NMR spectrum identical to that detailed above.

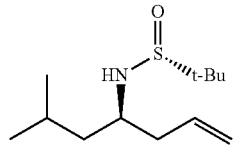

(R)-2-Methyl-N—((S)-6-methylhept-1-en-4-yl)propane-2-sulfinamide (13b). A suspension of indium powder (0.607 g, 5.29 mmol, 2.0 equiv) and (R,E)-2-methyl-N-(3-methylbutylidene)propane-2-sulfinamide (1c, 0.500 g, 2.64 mmol, 1.0 equiv) in saturated NaBr (0.1 M, 26 mL) was treated with allyl bromide (0.46 mL, 5.23 mmol) at room temperature. After 14 h, the reaction mixture was transferred to a separatory funnel and saturated aqueous NaHCO$_3$ (30 mL) and H$_2$O (20 mL) were used to rinse the reaction flask. The aqueous layer was extracted with EtOAc (3×20 mL). The combined organic layers were washed with brine (2×10 mL), dried over Na$_2$SO$_4$, filtered, and concentrated. Flash column chromatography carried out on silica gel with gradient elution of 10-40% EtOAc/hexanes afforded the title compound as a colorless sticky solid (0.299 g, 1.29 mmol, 49% yield). $[\alpha]_D^{25}$=−50.0 (c 0.5, CH$_2$Cl$_2$); $^1$H NMR (300

MHz, CDCl$_3$) δ 5.86-5.72 (m, 1H), 5.19-5.11 (m, 2H), 3.42-3.32 (m, 1H), 3.16 (d, J=7.5 Hz, 1H), 2.46-2.27 (m, 2H), 1.81-1.67 (m, 1H), 1.44-1.22 (m, 2H), 1.20 (s, 9H), 0.95-0.87 (m, 6H); $^{13}$C NMR (75 MHz, CDCl$_3$) (134.2, 119.1, 56.0, 53.8, 44.8, 41.3, 24.7, 23.2, 22.8, 22.2.

(R)-2-Methyl-N—((R)-6-methylhept-1-en-4-yl)propane-2-sulfinamide (13b). The reaction was scaled up and the procedure was modified as described. To a suspension of indium powder (2.07 g, 18.0 mmol, 325 mesh) in saturated NaBr (50 mL) was added (R,E)-2-methyl-N-(3-methylbutylidene)propane-2-sulfinamide (1c, 2.13 g, 11.2 mmol) in THF (10 mL). To this mixture was added allylbromide (2.0 mL, 22.7 mmol) at room temperature and the mixture was sonicated (approx. 2 min) and vigorously stirred. After 19 h, the mixture was filtered through Celite and rinsed with EtOAc. The filtrate was extracted with EtOAc, washed with brine, dried (Na$_2$SO$_4$), filtered and concentrated to give a crude oil (2.29 g) that was purified by chromatography on SiO$_2$ (ISCO—Rf, 0-100% EtOAc/hexanes) to give (R)-2-methyl-N—((R)-6-methylhept-1-en-4-yl)propane-2-sulfinamide as a colorless oil (13b, 2.03 g, 78%). $^1$H NMR spectrum identical to that detailed above.

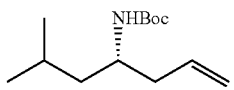

14a tert-Butyl (S)-(6-methylhept-1-en-4-yl)carbamate (14a). To a solution of 13a (0.474 g, 2.05 mmol, 1.0 equiv) in anhydrous Et$_2$O (0.04 M, 51 mL) was added 4N HCl in dioxane (1.0 mL, 4.00 mmol, 2.0 equiv). The reaction mixture was stirred under nitrogen atmosphere for 2 h. The resulting white suspension was filtered, rinsed with dry Et$_2$O (40 mL), and dried under high vacuum to afford the title compound as a white fluffy solid (0.257 g, 1.57 mmol, 77% yield).

To a solution of this hydrochloride salt (0.257 g, 1.57 mmol, 1.0 equiv) in anhydrous CH$_2$Cl$_2$ (31 mL) was added TEA (0.66 mL, 4.74 mmol, 3.0 equiv) and di-tert-butyl dicarbonate (0.414 g, 1.89 mmol, 1.2 equiv) sequentially at 0° C. under nitrogen atmosphere. The reaction mixture was stirred at rt for 24 h under nitrogen atmosphere. The reaction mixture was diluted with CH$_2$Cl$_2$. The organic layer was washed with saturated NH$_4$Cl (2×10 mL). The organic layer was dried over Na$_2$SO$_4$, filtered, and concentrated. Flash column chromatography carried out on silica gel with gradient elution of 5-10% EtOAc/hexanes afforded the title compound as a white solid (0.305 g, 1.34 mmol, 85% yield). R$_f$=0.50 (10% EtOAc/hexanes); IR (neat) 3347, 2958, 2932, 1699, 1684, 1520, 1389, 1366, 1268, 1169, 1084, 1046, 1013, 911 cm$^{-1}$; [α]$_D^{26}$=−35.0 (c 0.5, CH$_2$Cl$_2$); $^1$H NMR (300 MHz, CDCl$_3$) δ 5.77 (m, 1H), 5.06 (m, 2H), 4.26 (br s, 1H), 3.72 (br s, 1H), 2.19 (m, 2H), 1.66 (m, 1H), 1.43 (s, 9H), 1.25 (t, J=7.1 Hz, 2H), 0.90 (d, J=6.6 Hz, 6H); $^{13}$C NMR (126 MHz, CDCl$_3$) δ 155.6. 134.7, 117.7, 79.0, 48.3, 44.1, 40.2, 28.6, 25.0, 23.2, 22.4; HRMS (ESI) m/z: [M+H]$^+$ calcd for C$_{13}$H$_{26}$NO$_2$ 228.1958, found 228.1949.

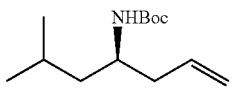

14b tert-butyl (R)-(6-methylhept-1-en-4-yl)carbamate (14b). To a solution of 13b (0.470 g, 2.03 mmol, 1.0 equiv) in anhydrous Et$_2$O (0.04 M, 50 mL) was added 4N HCl in dioxane (1.0 mL, 4.00 mmol, 2.0 equiv). The reaction mixture was stirred under nitrogen atmosphere for 1.5 h. The resulting white suspension was filtered, rinsed with dry Et$_2$O (50 mL), and dried under high vacuum to afford the title compound as a white fluffy solid (0.264 g, 1.62 mmol, 80% yield). To a solution of this hydrochloride salt (0.264 g, 1.62 mmol, 1.0 equiv) in anhydrous CH$_2$Cl$_2$ (32 mL) was added TEA (0.68 mL, 4.88 mmol, 3.0 equiv) and di-tert-butyl dicarbonate (0.426 g, 1.94 mmol, 1.2 equiv) sequentially at 0° C. under nitrogen atmosphere. The reaction mixture was stirred at rt for 20 h under nitrogen atmosphere. The reaction mixture was diluted with CH$_2$Cl$_2$. The organic layer was washed with saturated NH$_4$Cl (2×10 mL). The organic layer was dried over Na$_2$SO$_4$, filtered, and concentrated. Flash column chromatography carried out on silica gel with gradient elution of 5-10% EtOAc/hexanes afforded the title compound as a white solid (0.305 g, 1.34 mmol, 85% yield). IR (neat) 3345, 2959, 1810, 1700, 1681, 1521, 1365, 1270, 1213, 1170, 1118, 1070 cm$^{-1}$; [α]$_D^{25}$=+31.8 (c 0.5, CH$_2$Cl$_2$); $^1$H NMR (300 MHz, CDCl$_3$) δ 5.77 (m, 1H), 5.06 (m, 2H), 4.26 (br s, 1H), 3.72 (br s, 1H), 2.19 (m, 2H), 1.67 (m, 1H), 1.43 (s, 9H), 1.25 (t, J=7.1 Hz, 2H), 0.90 (d, J=6.6 Hz, 6H); $^{13}$C NMR (75 MHz, CDCl$_3$) δ 155.6, 134.7, 117.7, 79.0, 48.3, 44.1, 40.2, 28.6, 25.0 23.3, 22.4; HRMS (ESI) m/z: [M+H]$^+$ calcd for C$_{13}$H$_{26}$NO$_2$ 228.1958, found 228.1956.

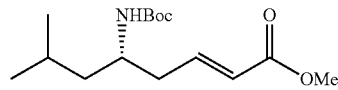

4b

Methyl (S,E)-5-((tert-butoxycarbonyl)amino)-7-methyloct-2-enoate (4b). To a solution of 14a (0.368 g, 1.62 mmol, 1.0 equiv) and methyl acrylate (1.5 mL, 16.5 mmol, 10 equiv) in anhydrous CH$_2$Cl$_2$ (162 mL, 0.01 M) was added a solution of Hoveyda-Grubbs 2 catalyst (53.0 mg, 0.0804 mmol, 5 mol %) in anhydrous CH$_2$Cl$_2$ (1 mL, followed by additional 1 mL that was used to rinse vial) under nitrogen atmosphere. The reaction mixture was refluxed for 24 h under nitrogen atmosphere. The reaction mixture was concentrated under reduced pressure. Flash column chromatography carried out with gradient elution of 5-10% EtOAc/hexanes afforded the title compound as a pale green oil (0.402 g, 1.40 mmol, 87% yield). IR (neat) 3355, 2955, 1707, 1659, 1518, 1436, 1366, 1268, 1166, 1041, 978 cm$^{-1}$; [α]$_D^{24}$=−44.6 (c 0.5, CH$_2$Cl$_2$); $^1$H NMR (400 MHz, CDCl$_3$) δ 6.91 (dt, J=15.3, 7.5 Hz, 1H), 5.86 (dt, J=15.6, 1.4 Hz, 1H), 4.29 (d, J=9.0 Hz, 1H), 3.80 (br s, 1H), 3.72 (s, 3H), 2.46-2.26 (m, 2H), 1.69-1.62 (m, 1H), 1.42 (s, 9H), 1.33-1.20 (m, 2H), 0.90 (d, J=6.6 Hz, 6H); $^{13}$C NMR (101 MHz, CDCl$_3$) δ 166.8, 155.5, 145.3, 123.7, 79.4, 51.6, 48.0, 44.0, 38.6, 28.5, 25.0, 23.1, 22.2; HRMS (ESI+) m/z [M+H]$^+$ calcd for C$_{15}$H$_{23}$NO$_4$ 286.2013, found 286.2015.

Methyl (S,E)-5-((tert-butoxycarbonyl)amino)-7-methyl-oct-2-enoate (4b). A solution of 14a (0.357 g, 1.57 mmol, 1.0 equiv) and methyl acrylate (1.0 mL, 11.1 mmol, 7 equiv) in anhydrous CH$_2$Cl$_2$ (90 mL) was degassed by N$_2$ bubbling (approx. 2 min). To this solution was added Hoveyda-Grubbs 2 catalyst (34.0 mg, 0.052 mmol, 3 mol %). The reaction solution was degassed and heated to reflux for 15 h under nitrogen atmosphere. The reaction mixture was concentrated under reduced pressure and the residue was purified by chromatography on silica gel with a gradient elution of 0-100% CH$_2$Cl$_2$/hexanes to afford the title compound as a light yellow oil (0.306 g, 1.07 mmol, 68% yield). $^1$H NMR spectrum identical and optical rotation consistent to that detailed above.

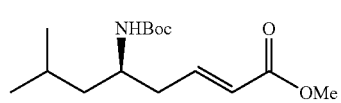

Methyl (R,E)-5-((tert-butoxycarbonyl)amino)-7-methyloct-2-enoate (4c). To a solution of 14b (0.368 g, 1.62 mmol, 1.0 equiv) and methyl acrylate (1.5 mL, 16.5 mmol, 10 equiv) in anhydrous CH$_2$Cl$_2$ (162 mL, 0.01 M) was added a solution of Hoveyda-Grubbs 2 catalyst (53.0 mg, 0.0804 mmol, 5 mol %) in anhydrous CH$_2$Cl$_2$ (1 mL, followed by additional 1 mL that was used to rinse vial) under nitrogen atmosphere. The reaction mixture was refluxed for 24 h under nitrogen atmosphere. The reaction mixture was concentrated under reduced pressure. Flash column chromatography carried out with gradient elution of 5-10% EtOAc/hexanes afforded the title compound as a pale green oil (0.356 g, 1.25 mmol, 77% yield). IR (neat) 3358, 2956, 1707, 1689, 1519, 1437, 1366, 1268, 1166, 1041, 978 cm$^{-1}$; $[\alpha]_D^{24}$=+42.2 (c 0.5, CH$_2$Cl$_2$); $^1$H NMR (400 MHz, CDCl$_3$) δ 6.92 (dt, J=15.3, 7.5 Hz, 1H), 5.86 (dt, J=15.6, 1.4 Hz, 1H), 4.29 (d, J=9.0 Hz, 1H), 3.80 (br s, 1H), 3.72 (s, 3H), 2.45-2.26 (m, 2H), 1.69-1.58 (m, 1H), 1.42 (s, 9H), 1.33-1.99 (m, 2H), 0.90 (d, J=6.6 Hz, 6H); $^3$C NMR (101 MHz, CDCl$_3$) δ 166.8, 155.5, 145.3, 123.7, 79.4, 51.6, 48.0, 44.0, 38.6, 28.5, 25.0, 23.2, 22.2; HRMS (ESI) m/z: [M+H]$^+$ calcd for C$_{15}$H$_{28}$NO$_4$ 286.2013, found 286.2007.

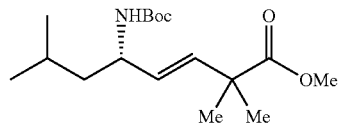

Methyl (S,E)-5-((tert-butoxycarbonyl)amino)-2,2,7-trimethyloct-3-enoate (5c). A solution of n-BuLi (2.5 M in hexanes, 0.77 mL, 1.93 mmol, 2.2 equiv) was added dropwise to a solution of diisopropylamine (0.28 mL, 1.96 mmol, 2.2 equiv) in anhydrous THF (3.8 mL) at −78° C. The reaction was kept at −78° C. for 15 min and warmed to 0° C. for 15 min. The reaction was cooled to −78° C. and DMPU (0.24 mL, 1.95 mmol, 2.2 equiv) was added and stirred for 15 min. A solution of ester 4b (0.250 g, 0.876 mmol, 1.0 equiv) in anhydrous THF (8.8 mL) was added slowly over 30 min and stirred for 20 min at −78° C. MeI (0.16 mL, 2.54 mmol, 2.9 equiv) was added and stirred for 30 min at −78° C. The reaction mixture was warmed to −40° C. and stirred for 1 h. The reaction mixture was quenched with a saturated NH$_4$Cl (10 mL) and H$_2$O (20 mL). The aqueous layer was extracted with CH$_2$Cl$_2$ (3×15 mL). The combined organic layers were dried over Na$_2$SO$_4$, filtered, and concentrated. Flash column chromatography carried out on silica gel with isocratic elution of 5% EtOAc/hexanes afforded the title compound as a colorless oil (0.196 g, 0.625 mmol, 71% yield). R$_f$=0.43 (15% EtOAc/hexanes); IR (neat) 3376, 2955, 1693, 1514, 1365, 1250, 1167, 1142 cm$^{-1}$; $[\alpha]_D^{24}$=−15.9 (c 0.5, CH$_2$Cl$_2$); $^1$H NMR (500 MHz, CDCl$_3$) δ 5.75 (d, J=15.7 Hz, 1H), 5.36 (m, 1H), 4.35 (br s, 1H), 4.14 (br s, 1H), 3.65 (s, 3H), 1.64-1.59 (m, 1H), 1.43 (s, 9H), 1.37-1.27 (m, 8H, with apparent d, 1.27 ppm, J=2.4 Hz, 6H), 0.90 (t, J=6.2 Hz, 6H); $^{13}$C NMR (75 MHz, CDCl$_3$) δ 177.0, 155.3, 134.7, 129.7, 79.3, 52.1, 50.5, 44.9, 44.1, 28.5, 25.2, 24.9, 22.8, 22.6; HRMS (ESI) m/z: [M+H]$^+$ calcd for C$_{17}$H$_{32}$NO$_4$ 314.2326, found 314.2314.

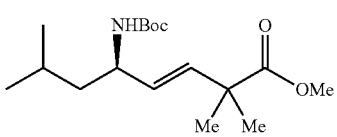

Methyl (R,E)-5-((tert-butoxycarbonyl)amino)-2,2,7-trimethyloct-3-enoate (5i). A solution of n-BuLi (2.6 M in hexanes, 0.41 mL, 1.07 mmol, 2.2 equiv) was added dropwise to a solution of diisopropylamine (0.15 mL, 1.05 mmol, 2.2 equiv) in anhydrous THF (2.1 mL) at −78° C. The reaction was kept at −78° C. for 15 min and warmed to 0° C. for 15 min. The reaction was cooled to −78° C. and DMPU (0.09 mL, 1.05 mmol, 2.2 equiv) was added and stirred for 15 min. A solution of ester 4c (0.138 g, 0.485 mmol, 1.0 equiv) in anhydrous THF (5.0 mL) was added slowly over 30 min and stirred for 20 min at −78° C. MeI (0.09 mL, 1.45 mmol, 3.0 equiv) was added and stirred for 30 min at −78° C. The reaction mixture was warmed to −40° C. and stirred for 1 h. The reaction mixture was quenched with saturated NH$_4$Cl (5 mL) and H$_2$O (10 mL). The aqueous layer was extracted with CH$_2$Cl$_2$ (3×15 mL). The combined organic layers were dried over Na$_2$SO$_4$, filtered, and concentrated. Flash column chromatography carried out on silica gel with isocratic elution of 5% EtOAc/hexanes afforded the title compound as a colorless oil (89.4 mg, 0.285 mmol, 59% yield). IR (neat) 3372, 2955, 2870, 1700, 1514, 1470, 1387, 1365, 1250, 1167, 1142, 1043, 1014, 972 cm$^{-1}$; $[\alpha]_D^{24}$=−15.9 (c 0.5, CH$_2$Cl$_2$); $^1$H NMR (300 MHz, CDCl$_3$) δ 5.75 (d, J=15.8 Hz, 1H), 5.36 (dd, J=15.8, 6.2 Hz, 1H), 4.34 (br s, 1H), 4.13 (br s, 1H), 3.65 (s, 3H), 1.68-1.55 (m, 1H), 1.43 (s, 9H), 1.37-1.25 (m, 8H, with apparent s, 1.27 ppm), 0.90 (t, J=6.6, 3.4 Hz, 6H); $^{13}$C NMR (75 MHz, CDCl$_3$) δ 177.0, 155.4, 134.7, 129.7, 79.3, 52.1, 50.5, 44.9, 44.1, 28.5, 25.2, 24.8, 22.8, 22.6; HRMS (ESI) m/z: [M+H]$^+$ calcd for C$_{17}$H$_{32}$NO$_4$ 314.2326, found 314.2314.

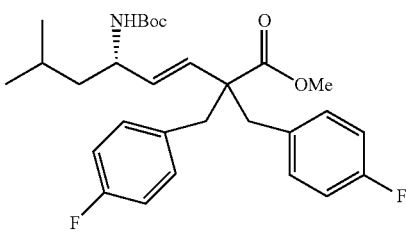

Methyl (S,E-5-((tert-butoxycarbonyl)amino)-2,2-bis(4-fluorobenzyl)-7-methyloct-3-enoate (5j). A flame dried flask was treated with anhydrous THF (3.5 mL) and cooled to −78° C. The solution was then treated with diisopropylamine (0.55 mL, 3.87 mmol, 3.6 equiv) followed by BuLi (2.1 M in hexanes, 1.80 mL, 3.78 m mol, 3.5 equiv). The reaction was kept at −78° C. for 20 min and warmed to 0° C. for 10 min.

The reaction was cooled back down to −78° C. and DMPU (dried over 4 Å sieves, 0.44 mL, 3.56 mmol, 3.3 equiv) was added. After 10 min, a solution of ester 4b (0.306 g, 1.07 mmol, 1.0 equiv) in anhydrous THF (3.0 mL) was added dropwise over 10 min. After 20 min, 4-fluorobenzyl bromide (0.44 mL, 3.53 mmol, 3.3 equiv) was added and the solution was slowly warmed to room temperature overnight. After 18 h, the reaction mixture was treated with saturated NH$_4$Cl and extracted with EtOAc (2×). The combined organic layer was washed with brine, dried over Na$_2$SO$_4$, filtered, and concentrated. The residue was purified by flash column chromatography carried out on silica gel with a gradient elution of 0-50% Et$_2$O/hexanes to give the title compound as a light yellow oil (194 mg, 0.387 mmol, 36% yield). IR (neat) 2954, 1698 1604, 1508, 1365, 1221, 1158, 1099, 1016, 838, 739 cm$^{-1}$; $[\alpha]_D^{24}$=−10.1 (c 0.3, CH$_2$Cl$_2$); $^1$H NMR (600 MHz, CDCl$_3$) δ 7.05-7.03 (m, 4H), 6.92-6.89 (m, 4H), 5.75 (d, J=16.1 Hz, 1H), 5.37 (dd, J=16.1, 6.4 Hz, 1H), 4.33-4.31 (m, 1H), 4.17-4.14 (m, 1H), 3.61 (s, 3H), 3.16 (d, J=10.9 Hz, 1H), 3.14 (d, J=10.6 Hz, 1H), 2.94 (app t, J=16.1 Hz, 2H), 1.45 (s, 9H), 1.29-1.24 (m, 4H), 0.87 (d, J=6.8 Hz, 6H); $^{13}$C NMR (151 MHz, CDCl$_3$) δ 174.4, 162.5, 162.4, 160.83, 160.81, 155.0, 133.2, 132.54, 132.53, 131.7, 131.6, 130.5, 114.75, 114.73, 114.61, 114.60, 79.1, 53.8, 51.7, 50.8, 44.4, 43.5, 43.3, 28.4, 24.6, 22.4; $^{19}$F NMR (565 MHz, CDCl$_3$) δ−116.49, −116.56; HRMS (ESI) m/z: [M+H]$^+$ calcd for C$_{29}$H$_{38}$F$_2$NO$_4$ 502.2763, found 502.2748.

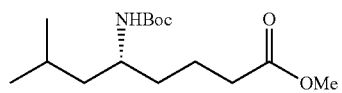
S5

Methyl (R)-5-((tert-butoxycarbonyl)amino)-7-methyloctanoate (S5). A solution of 5h (0.0791 g, 0.277 mmol, 1.0 equiv) and 10% Pd/C (15 mg, 0.0141 mmol, 5 mol %) in MeOH (4 mL) was stirred for 14 h under hydrogen atmosphere. The reaction was filtered over Celite. The filtrate was concentrated under reduced pressure, and the title compound was dried under high vacuum. The title compound was obtained as a colorless oil (0.0759 g, 0.264 mmol, 95% yield). IR (neat) 3365, 2954, 1740, 1689, 1518, 1438, 1365, 1247, 1165, 1114, 1050, 1007 cm$^{-1}$; $[\alpha]_D^{24}$=−7.7 (c 0.5, CH$_2$Cl$_2$); $^1$H NMR (400 MHz, CDCl$_3$) δ 4.20 (d, J=9.4 Hz, 1H), 3.68-3.59 (m, 4H, with app s, 3.68), 2.33 (m, 2H), 1.71-1.59 (m, 3H), 1.51-1.43 (m, 10H, with app s, 1.43 ppm), 1.38-1.22 (m, 3H), 0.90 (dd, J=6.6, 3.4 Hz, 6H); $^{13}$C NMR (101 MHz, CDCl$_3$) δ 174.2, 155.8, 79.0, 51.6, 48.5, 45.1, 35.6, 34.0, 28.6, 25.0, 23.2, 22.4, 21.3; HRMS (ESI) m/z: [M+H]$^+$ calcd for C$_5$H$_{30}$NO$_4$ 288.2169, found 288.2163.

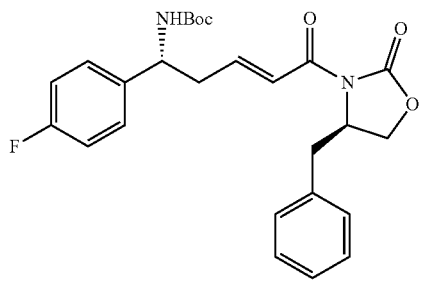
16 tert-Butyl ((R,E)-5-((R)-4-benzyl-2-oxooxazolidin-3-yl)-1-(4-fluorophenyl)-5-oxopent-3-en-1-yl)carbamate (16). A dried 50 mL round bottom flask equipped with a magnetic stir bar was charged with [Cu(CH$_3$CN)$_4$]PF$_6$ (0.116 g, 0.306 mmol, 25 mol %) and (S)-DTMB-SEGPHOS (0.364 g, 0.306 mmol, 25 mol %) under nitrogen atmosphere. Anhydrous THF (13 mL, 0.1 M) was added and the colorless catalyst solution was stirred (ca. 15 min) at r.t. until imine 1a was prepared. To the catalyst solution was added N-oxazolidinone 15 (0.300 g, 1.22 mmol, 1.0 equiv.) followed by freshly prepared N-Boc imine 1a (0.502 g, 2.45 mmol, 2.0 equiv). The reaction mixture was cooled to −20° C. and DABCO (0.61 mL, 0.611 mmol, 1.0 M in THF, 0.5 equiv) was added. The resulting reaction mixture was stirred at −20° C. for 5 h. The reaction mixture was filtered through a plug of basic alumina washed with EtOAc and concentrated. Flash column chromatography carried out on silica gel with gradient elution of 0-10% EtOAc/hexanes afforded the title compound as a white solid (0.199 g, 0.424 mmol, 35% yield, 97:3 dr). Mp 54-56° C.; IR (neat) 3356, 2978, 2929, 1774, 1683, 1509, 1356, 1220, 1190, 836, 701 cm$^{-1}$; $[\alpha]_D^{25}$=−32.3 (c 0.5, CHCl$_3$); $^1$H NMR (500 MHz, CDCl$_3$) δ 7.26-7.19 (m, 5H), 7.04 (d, J=1.5 Hz, 2H), 7.04-7.01 (m, 3H), 4.85 (br s, 1H), 4.71-4.67 (m, 1H), 4.22-4.15 (m, 2H), 3.30 (dd, J=13.5, 3.0 Hz, 1H), 2.79-2.73 (m, 3H), 1.41 (s, 9H); $^{13}$C NMR (150 MHz, CDCl$_3$) δ 164.3, 162.9, 161.3, 154.9, 153.4, 145.8, 135.2, 129.43, 129.40, 129.0, 127.91, 127.86, 127.4, 123.3, 115.7, 115.6, 66.2, 55.3, 37.8, 28.3; $^{19}$F NMR (376 MHz, CDCl$_3$) δ −114.9; HRMS (ESI) m/z: [M+H]$^+$ calcd for C$_{26}$H$_{30}$FN$_2$O$_5$ 469.2133, found 469.2135. SFC: Chiralpak-IC Semiprep, 13% MeOH over 35 min, flow rate=5.0 mL/min, pressure=100 bar, λ=210 nm, (R,R) t$_R$=21.1 min, (S,R) t$_R$=25.0 min, dr=97:3.

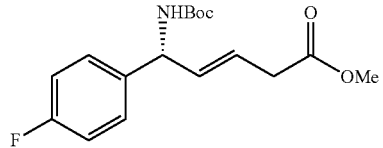
4d

Methyl (R,E)-5-((tert-butoxycarbonyl)amino)-5-(4-fluorophenyl)pent-3-enoate (4d). A solution of n-BuLi (0.29 mL, 0.728 mmol, 3.1 equiv) was added dropwise to a solution of diisopropylamine (0.10 mL, 0.704 mmol, 3.0 equiv) in anhydrous THF (3.0 mL) at −78° C. The reaction was kept at the same temperature for 15 min, and warmed to 0° C. for 15 min. The reaction was re-cooled to −78° C., DMPU (0.09 mL, 0.704 mmol, 3.0 equiv) was added and stirred for 15 min. A solution of oxazolidinone 16 (0.110 g, 0.235 mmol, 1.0 equiv) in anhydrous THF (0.7 mL) was added over a period of 2 min. After the addition was complete, the reaction was stirred for 15 min at −78° C., 15 min at −40° C., and 60 min at −20° C. The reaction was re-cooled to −78° C. and MeOH (0.5 mL) was added and stirred for 45 min at −78° C. The reaction was quenched with saturated NH$_4$Cl (5 mL) and H$_2$O (5 mL). The aqueous layer was extracted with CH$_2$Cl$_2$ (3×5 mL). The combined organic layer was dried over MgSO$_4$, filtered, and concentrated. Flash column chromatography carried out on silica gel using isocratic elution of 5% EtOAc/hexanes gave the title compound as a pale yellow oil (0.0498 g, 0.154 mmol, 66% yield). IR (neat) 3354, 2978, 1694, 1508, 1222, 1188, 1014, 838 cm$^{-1}$; $[\alpha]_D^{25}$=+16.3 (c 0.2, CHCl$_3$); $^1$H NMR (400 MHz, CDCl$_3$) δ 7.26-7.23 (m, 2H), 7.02 (t, J=8.4 Hz), 5.74-5.71 (m, 2H), 5.26 (br s, 1H), 4.88-4.83 (m, 1H), 3.69 (s, 3H), 3.11 (d, J=5.2 Hz, 2H), 1.43 (s, 9H); $^{13}$C NMR (125 MHz, CDCl$_3$) δ 171.8, 162.9 161.3, 154.8, 137.0, 133.7, 128.6, 123.6, 115.5, 115.4, 51.9, 37.3, 28.3; $^{19}$F NMR (376 MHz, CDCl$_3$) δ −115.1; HRMS (ESI) m/z: [M+H]$^+$ calcd for C$_{17}$H$_{23}$FNO$_4$ 324.1606, found 324.1618.

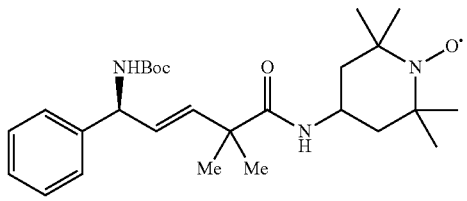

6a tert-Butyl (S,E)-(5-((1-oxy-2,2,6,6-tetramethylpiperidin-4-yl)amino)-4,4-dimethyl-5-oxo-1-phenylpent-2-en-1-yl)carbamate (6a). To a solution of ester 5a (91.7 mg, 0.275 mmol, 1.0 equiv) in THF (3.0 mL) was added LiOH (1.0 M in H$_2$O, 1.4 mL, 5.0 equiv) at r.t. The reaction mixture was heated at reflux for 15 h. The reaction mixture was acidified with 1 M KHSO$_4$ (ca. 2 mL) at 0° C. The aqueous layer was extracted with CH$_2$Cl$_2$ (3×10 mL). The combined organic layers were dried over Na$_2$SO$_4$, filtered, concentrated, and dried under high vacuum to afford the carboxylic acid as a colorless oil.

To a solution of crude carboxylic acid in anhydrous CH$_2$Cl$_2$ (3.0 mL) was added sequentially 4-amino-TEMPO (75.0 mg, 0.416 mmol, 1.5 equiv), DMAP (47.0 mg, 0.385 mmol, 1.4 equiv), HOBT.H$_2$O (52.0 mg, 0.385 mmol, 1.4 equiv), and EDC.HCl (74.0 mg, 0.385 mmol, 1.4 equiv). The resulting orange solution was stirred at r.t. for 20 h under nitrogen atmosphere. The reaction mixture was diluted with CH$_2$Cl$_2$ (10 mL). The organic layer was washed with saturated NH$_4$Cl (2×5 mL). The combined organic layers were dried over Na$_2$SO$_4$, filtered, and concentrated. Flash column chromatography carried out on silica gel with gradient elution of 15-35% EtOAc/hexanes afforded the title compound as a peach colored foam (72.8 mg, 0.154 mmol, 56% yield). R$_f$=0.66 (50% EtOAc/hexanes); IR (neat) 3327, 2974, 2927, 1696, 1648, 1516, 1456, 1364, 1310, 1244, 1169 cm$^{-1}$; mp 65° C. (softening point 55° C.); LC-MS m/z: 473.3 [M+2H]$^+$, 496.3 [M+H+Na]$^+$; HRMS (ESI) m/z: [M+H]$^+$ calcd for C$_{27}$H$_{43}$N$_3$O$_4$ 473.3248, found 473.3233. [α]$_D^{24}$=+12.4 (c 0.5, CH$_2$Cl$_2$).

A sample of this nitroxide (13.8 mg, 0.0292 mmol, 1.0 equiv) was dissolved in MeOH (degassed, 0.3 mL) and L-ascorbic acid (26.0 mg, 0.145 mmol, 5.0 equiv) was added. Complete discoloration of the solution occurred within a few seconds. The reaction mixture was stirred for 3 h at r.t. Solvent was removed under reduced pressure. The resulting residue was partitioned between CH$_2$Cl$_2$ (3 mL) and H$_2$O (1 mL). The aqueous phase was extracted with CH$_2$Cl$_2$ (2×3 mL). The combined organic layers were dried over Na$_2$SO$_4$, filtered, concentrated, and dried under high vacuum to yield the corresponding hydroxylamine as a white foam (13.5 mg, 0.0285 mmol, 98% yield). $^1$H NMR (300 MHz, CD$_3$OD) δ 7.36-7.23 (m, 5H), 5.79-5.69 (m, 2H), 5.16 (d, J=5.0 Hz, 1H), 4.14 (m, 1H), 1.75 (dd, J=13.1, 3.8 Hz, 2H), 1.58-1.52 (m, 2H), 1.45 (s, 9H), 1.25 (s, 18H); $^{13}$C NMR (151 MHz, CDCl$_3$) δ 178.4, 157.6, 143.0, 137.0, 131.5, 129.6, 128.4, 128.0, 80.3, 62.5, 57.9, 45.2, 44.9, 42.0, 31.6, 28.8, 25.6, 25.60, 25.57, 20.4.

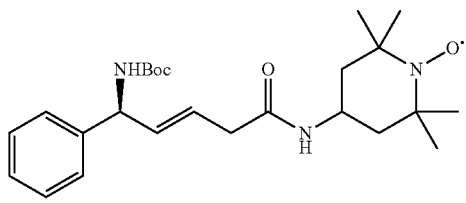

6b tert-Butyl (S,E)-(5-((1-oxy-2,2,6,6-tetramethylpiperidin-4-yl)amino)-5-oxo-1-phenylpent-2-en-1-yl)carbamate (6b). To a solution of ester 5b (72.2 mg, 0.236 mmol, 1.0 equiv) in THF (3 mL) was added LiOH (1.0 M in H$_2$O, 1.2 mL, 5.0 equiv) at r.t. The reaction mixture was stirred for 4 h at r.t. The reaction mixture was acidified with 1 M KHSO$_4$ (ca. 2 mL) at 0° C. The aqueous layer was extracted with EtOAc (3×10 mL). The combined organic layers were dried over Na$_2$SO$_4$, filtered, concentrated, and dried under high vacuum to afford the carboxylic acid as a white solid.

To a solution of crude carboxylic acid in anhydrous CH$_2$Cl$_2$ (3.0 mL) was added sequentially 4-amino-TEMPO (65.0 mg, 0.360 mmol, 1.5 equiv), DMAP (35.0 mg, 0.284 mmol, 1.2 equiv), HOBT.H$_2$O (40.0 mg, 0.292 mmol, 1.2 equiv), and EDC.HCl (55.0 mg, 0.287 mmol, 1.2 equiv). The resulting orange solution was stirred at r.t. for 24 h under nitrogen atmosphere. The reaction mixture was diluted with CH$_2$Cl$_2$ (10 mL). The organic layer was washed with aqueous solution of saturated NH$_4$Cl (2×5 mL). The aqueous phase was separated and extracted with CH$_2$Cl$_2$ (2×5 mL). The combined organic layers were dried over Na$_2$SO$_4$, filtered, and concentrated. Flash column chromatography carried out on silica gel with gradient elution of 25-55% EtOAc/hexanes afforded the title compound as a peach colored solid (62.0 mg, 0.140 mmol, 59% yield). R$_f$=0.39 (70% EtOAc/hexanes); IR (neat) 3311, 2975, 1690, 1648, 1528, 1365, 1244, 1169 cm$^{-1}$; mp 147-153° C.; [α]$_D^{23}$=−28.6 (c 0.1, CH$_2$Cl$_2$); LC-MS m/z: 446.2 [M+2H]$^+$, 467.2 [M+Na]$^+$; HRMS (ESI) m/z: [M+H]$^+$ calcd for C$_{25}$H$_{39}$N$_3$O$_4$ 445.2935, found 445.2936.

A sample of this nitroxide (14.9 mg, 0.0334 mmol, 1.0 equiv) was dissolved in MeOH (degassed, 0.3 mL) and L-ascorbic acid (30.0 mg, 0.167 mmol, 5.0 equiv) was added. Complete discoloration of the solution occurred within a few seconds. After stirring for 3 h at r.t., the solvent was removed under reduced pressure. The resulting residue was partitioned between CH$_2$Cl$_2$ (3 mL) and H$_2$O (1 mL). The aqueous phase was extracted with CH$_2$Cl$_2$ (2×3 mL). The combined organic layers were dried over Na$_2$SO$_4$, filtered, concentrated, and dried under high vacuum to yield the corresponding hydroxylamine as a white foam (14.1 mg, 0.0316 mmol, 95% yield). $^1$H NMR (500 MHz, CD$_3$OD) δ 7.33-7.27 (m, 4H), 7.25-7.21 (m, 1H), 5.75 (d, J=15.5, 5.9 Hz, 1H), 5.70-5.64 (m, 1H), 5.17 (br s, 1H), 4.11 (m, 1H), 2.93 (d, J=6.6 Hz, 2H), 1.80 (m, 2H), 1.55-1.36 (m, 12H), 1.23 (d, J=8.0, 1.8 Hz, 12H); 13C NMR (151 MHz, CD$_3$OD) δ 173.1, 157.6, 143.1, 135.3, 129.5, 128.2, 127.9, 125.8, 80.3, 62.0, 57.4, 45.3, 41.8, 40.5, 31.7, 28.8, 20.3.

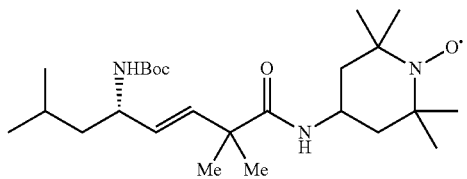

tert-Butyl (S,E)-(8-((1-oxy-2,2,6,6-tetramethylpiperidin-4-yl)amino)-2,7,7-trimethyl-8-oxooct-5-en-4-yl)carbamate (6c). To a solution of 5c (135 mg, 0.431 mmol, 1.0 equiv) in THF (4.3 mL) was added LiOH (1.0 M in H$_2$O, 2.2 mL, 5.1 equiv) at r.t. The reaction mixture was heated at reflux for 15 h. The reaction mixture was allowed to r.t. and acidified with 1 M KHSO4 (ca. 2 mL) at 0° C. The aqueous layer was extracted with EtOAc (3×10 mL). The combined organic layers were dried over Na$_2$SO$_4$, filtered, concentrated, and dried under high vacuum to afford the carboxylic acid as colorless oil.

To a solution of carboxylic acid in anhydrous CH$_2$Cl$_2$ (4.3 mL) was added sequentially 4-amino-TEMPO (115 mg, 0.646 mmol, 1.5 equiv), DMAP (73.6 mg, 0.603 mmol, 1.4 equiv), HOBT.H$_2$O (82.6 mg, 0.603 mmol, 1.4 equiv), and EDC.HCl (115 mg, 0.599 mmol, 1.4 equiv). The resulting orange solution was stirred at r.t. for 24 h under nitrogen atmosphere. The reaction mixture was diluted with CH$_2$Cl$_2$ (10 mL). The organic layer was washed with aqueous solution of saturated NH$_4$Cl (2×5 mL). The aqueous phase was separated and extracted with CH$_2$Cl$_2$ (2×5 mL). The combined organic layers were dried over Na$_2$SO$_4$, filtered, and concentrated. Flash column chromatography carried out on silica gel with isocratic elution of 20% EtOAc/hexanes afforded the title compound as a peach-colored foam (105 mg, 0.231 mmol, 54% yield). R$_f$=0.60 (40% EtOAc/hexanes); IR (neat) 3329, 2972, 2934, 1695, 1648, 1517, 1461, 1364, 1243, 1168 cm$^{-1}$; mp 58° C. (softening point: 44° C.); [α]$_D^{25}$=+19.8 (c 0.5, CH$_2$Cl$_2$); LC-MS m/z: 454.3 [M+2H]$^+$, 475.3 [M+Na]$^+$; HRMS (ESI) m/z: [M+H]$^+$ calcd for C$_{25}$H$_{47}$N$_3$O$_4$ 453.3567, found 453.3561; HRMS (ESI) m/z: [M+Na]$^+$ calcd for C$_{25}$H$_{46}$N$_3$NaO$_4$ 475.3381, found 475.3382.

A sample of this nitroxide (13.9 mg, 0.0307 mmol, 1.0 equiv) was dissolved in MeOH (degassed, 0.3 mL) and L-ascorbic acid (27.5 mg, 0.153 mmol, 5.0 equiv) was added. Complete discoloration of the solution occurred within a few seconds. After stirring for 3 h at r.t., the solvent was removed under reduced pressure. The resulting residue was partitioned between CH$_2$Cl$_2$ (4 mL) and H$_2$O (2 mL). The aqueous phase was extracted with CH$_2$Cl$_2$ (2×3 mL). The combined organic layers were dried over Na$_2$SO$_4$, filtered, concentrated, and dried under high vacuum to yield the corresponding hydroxylamine as a white foam (11.7 mg, 0.0259 mmol, 84% yield). $^1$H NMR (500 MHz, CD$_3$OD) δ 6.81 (d, J=8.0 Hz, 1H), 6.65 (s, 1H), 5.70 (d, J=15.6 Hz, 1H), 5.45 (dd, J=15.7, 6.7 Hz, 1H), 4.13-4.07 (m, 1H), 4.03-3.97 (m, 1H), 1.71-1.61 (m, 3H), 1.53-1.36 (m, 12H, app s 1.45 ppm), 1.32-1.27 (m, 2H), 1.23 (s, 6H), 1.17-1.15 (m, 12H with app d, 1.17 ppm, J=2.1 Hz), 0.92 (d, J=6.6 Hz, 6H); $^{13}$C NMR (126 MHz, CD$_3$OD) δ 178.5, 157.9, 136.0, 132.8, 79.9, 60.1, 52.4, 45.8, 45.7, 45.1, 44.9, 42.5, 32.7, 29.0, 25.8, 25.5, 23.0, 22.7, 20.3.

Cross metathesis batch (S): To a solution of 5c (110 mg, 0.351 mmol, 1.0 equiv) in THF (3.5 mL) was added LiOH (1.0 M in H$_2$O, 1.80 mL, 5.1 equiv) at r.t. The reaction mixture was heated at reflux for 15 h. The reaction mixture was acidified with 1 M KHSO$_4$ (ca. 2 mL) at 0° C. The aqueous layer was extracted with CH$_2$Cl$_2$ (3×10 mL). The combined organic layers were dried over Na$_2$SO$_4$, filtered, concentrated, and dried under high vacuum to afford the carboxylic acid as colorless oil.

To a solution of crude carboxylic acid in anhydrous CH$_2$Cl$_2$ (3.5 mL) was added sequentially 4-amino-TEMPO (95.0 mg, 0.526 mmol, 1.5 equiv), DMAP (60.0 mg, 0.491 mmol, 1.4 equiv), HOBT.H$_2$O (50.0 mg, 0.503 mmol, 1.4 equiv) and EDC.HCl (95.0 mg, 0.495 mmol, 1.4 equiv). The resulting orange solution was stirred at r.t. for 20 h under nitrogen atmosphere. The reaction mixture was diluted with CH$_2$Cl$_2$ (10 mL). The organic layer was washed with saturated NH$_4$Cl (2×5 mL). The combined organic layers were dried over Na$_2$SO$_4$, filtered, and concentrated. Flash column chromatography carried out on silica gel with isocratic elution of 20% EtOAc/hexanes afforded the title compound as a peach colored foam (0.104 g, 0.230 mmol, 66% yield). Mp 55° C. (softening point: 48° C.); [α]$_D^{25}$=+22.5 (c 0.2, CH$_2$Cl$_2$); LC-MS m/z 454.3 [M+2H]$^+$, 476.3 [M+H+Na]$^+$; HRMS (ESI) m/z: [M+H]$^+$ calcd for C$_{25}$H$_{47}$N$_3$O$_4$ 453.3561, found 453.3551.

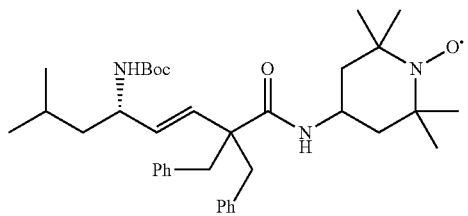

tert-Butyl (S,E)-(7,7-dibenzyl-8-((1-oxy-2,2,6,6-tetramethylpiperidin-4-yl)amino)-2-methyl-8-oxooct-5-en-4-yl)carbamate (6d). To a solution of ester 5d (0.137 g, 0.294 mmol, 1.0 equiv) in MeOH:H$_2$O (4 mL, 1:1) was added KOH (198 mg, 3.52 mmol, 12.0 equiv) at r.t. The reaction mixture was heated at reflux for 48 h. The reaction mixture was acidified with 1 M KHSO4 (ca. 4 mL) at 0° C. The aqueous layer was extracted with EtOAc (3×10 mL). The combined organic layers were dried over Na$_2$SO$_4$, filtered, and concentrated, and dried under high vacuum to afford the carboxylic acid as a pale yellow oil.

To a solution of crude carboxylic acid in anhydrous CH$_2$Cl$_2$ (3.0 mL) was added sequentially 4-amino-TEMPO (87.0 mg, 0.483 mmol, 1.6 equiv), DMAP (52.0 mg, 0.421 mmol, 1.4 equiv), HOBT.H$_2$O (58.0 mg, 0.423 mmol, 1.4 equiv), and EDC.HCl (82.0 mg, 0.427 mmol, 1.4 equiv). The resulting orange solution was stirred at r.t. for 24 h under nitrogen atmosphere. The reaction mixture was diluted with CH$_2$Cl$_2$ (10 mL). The organic layer was washed with a solution of saturated NH$_4$Cl (2×5 mL). The aqueous phase was separated and extracted with CH$_2$Cl$_2$ (2×5 mL). The combined organic layers were dried over Na$_2$SO$_4$, filtered, and concentrated. Flash column chromatography carried out on silica gel with gradient elution of 5-20% EtOAc/hexanes afforded the title compound as a peach colored foam (80.8 mg, 0.134 mmol, 45% yield). R$_f$=0.25 (15% EtOAc/hexanes); IR (neat) 3326, 2973, 2932, 1694, 16647, 1518, 1496, 1365, 1241, 1167 cm$^{-1}$; mp 63° C. (softening point 48° C.); [α]$_D^{25}$=+12.8 (c 0.5, CH$_2$Cl$_2$); LC-MS m/z: 606.3 [M+2H]$^+$, 627.2 [M+Na]$^+$; HRMS (ESI) m/z: [M+H]$^+$ calcd for C$_{37}$H$_{55}$N$_3$O$_4$ 605.4187, found 605.4178.

A sample of this nitroxide (6.27 mg, 0.0104 mmol, 1.0 equiv) was dissolved in MeOH (degassed, 0.3 mL) and L-ascorbic acid (10.0 mg, 0.056 mmol, 5.4 equiv) was added. Complete discoloration of the solution occurred within a few seconds. After stirring for 3 h at r.t., the solvent was removed under reduced pressure. The resulting residue was partitioned between CH$_2$Cl$_2$ (3 mL) and H$_2$O (1 mL). The aqueous phase was extracted with CH$_2$Cl$_2$ (2×3 mL). The combined organic layers were dried over Na$_2$SO$_4$, filtered, concentrated, and dried under high vacuum to yield the corresponding hydroxylamine as a white foam (6.00 g, 0.010 mmol, 96% yield). $^1$H NMR (600 MHz, CD$_3$OD) δ 7.25-7.14 (m, 10H), 5.60 (d, J=16.1 Hz, 1H), 5.49 (dd, J=16.1, 6.7 Hz, 1H), 4.04-3.99 (m, 1H), 3.94-3.88 (m, 1H), 3.17 (d, J=13.7 Hz, 1H), 2.97 (d, J=13.8 Hz, 1H), 2.84 (d, J=13.4 Hz, 1H), 1.60-1.52 (m 2H), 1.45-1.41 (m, 10H, with apparent s, 1.41), 1.38-1.21 (m, 4H), 1.21-1.11 (m, 12H), 0.90 (d, J=6.6, 6H); $^{13}$C NMR (151 MHz, CD$_3$OD) δ 175.7, 157.9, 139.0, 138.9, 136.1, 131.80, 131.76, 131.6, 128.9, 127.5, 127.4, 79.9, 61.0, 55.1, 49.4, 45.8, 45.3, 44.6, 44.5, 42.6, 32.3, 29.0, 25.8, 22.9, 22.8, 20.3.

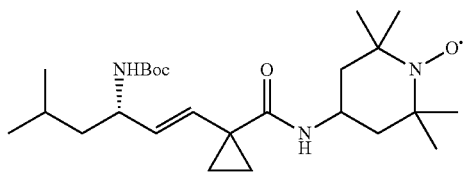

6e tert-Butyl (S,E)-(1-(1-((1-oxy-2,2,6,6-tetramethylpiperidin-4-yl)carbamoyl)cyclopropyl)-5-methylhex-1-en-3-yl)carbamate (6e). To a solution of 5e (92.7 mg, 0.298 mmol, 1.0 equiv) in THF (3.0 mL) was added LiOH (1.0 M in H$_2$O, 1.5 mL, 1.50 mmol, 5.0 equiv) at r.t. The reaction mixture was heated at reflux for 14 h. The reaction mixture was acidified with 1 M KHSO4 (ca. 2 mL) at 0° C. The aqueous layer was extracted with EtOAc (3×10 mL). The combined organic layers were dried over Na$_2$SO$_4$, filtered, concentrated, and dried under high vacuum to afford the carboxylic acid as a colorless oil.

To a solution of carboxylic acid in anhydrous CH$_2$Cl$_2$ (3.0 mL) was added sequentially 4-amino-TEMPO (89.0 mg, 0.504 mmol, 1.7 equiv), DMAP (51.0 mg, 0.413 mmol, 1.4 equiv), HOBT.H$_2$O (57.0 mg, 0.416 mmol, 1.4 equiv), and EDC.HCl (80.0 mg, 0.417 mmol, 1.4 equiv). The resulting orange solution was stirred at r.t. for 24 h under nitrogen atmosphere. The reaction mixture was diluted with CH$_2$Cl$_2$ (10 mL). The organic layer was washed with aqueous solution of saturated NH$_4$Cl (2×5 mL). The aqueous phase was separated and extracted with CH$_2$Cl$_2$ (2×5 mL). The combined organic layers were dried over Na$_2$SO$_4$, filtered, and concentrated. Flash column chromatography carried out on silica gel with isocratic elution of 20% EtOAc/hexanes afforded the title compound as a peach-colored foam (43.0 mg, 0.0951 mmol, 32% yield). R$_f$=0.53 (40% EtOAc/hexanes); IR (neat) 3306, 2975, 1687, 1644, 1525, 1365, 1323, 1272, 1244, 1167 cm$^{-1}$; mp 59° C. (softening point: 49° C.); [α]$_D^{25}$=+31.2 (c 0.6, CH$_2$Cl$_2$); LC-MS m/z: 452.3 [M+2H]$^+$, 473.3 [M+Na]$^+$; HRMS (ESI) m/z: [M+Na]$^+$ calcd for C$_{25}$H$_{44}$N$_3$NaO$_4$ 473.3224, found 473.3226.

A sample of this nitroxide (12.5 mg, 0.0278 mmol, 1.0 equiv) was dissolved in MeOH (degassed, 0.3 mL) and L-ascorbic acid (25.0 mg, 0.138 mmol, 5.0 equiv) was added. Complete discoloration of the solution occurred within a few seconds. After stirring for 3 h at r.t., the solvent was removed under reduced pressure. The resulting residue was partitioned between CH$_2$Cl$_2$ (3 mL) and H$_2$O (1 mL). The aqueous phase was extracted with CH$_2$Cl$_2$ (2×3 mL). The combined organic layers were dried over Na$_2$SO$_4$, filtered, concentrated, and dried under high vacuum to yield the corresponding hydroxylamine as a white foam (12.2 mg, 0.0266 mmol, 96% yield). $^1$H NMR (400 MHz, CD$_3$OD) δ 5.89 (d, J=15.3 Hz, 1H), 5.50 (dd, J=15.3, 6.5 Hz, 1H), 4.25-4.10 (m, 1H), 4.01 (m, 1H), 1.87-1.79 (m, 2H), 1.67-1.57 (m, 3H), 1.45 (s, 9H), 1.44-1.32 (m, 2H), 1.31-1.26 (m, 15H), 0.92 (m, 7H, apparent dd, J=6.7, 1.5 Hz), 0.79 (m, 1H); $^{13}$C NMR (126 MHz, CD$_3$OD) δ 175.3, 158.0, 136.9, 128.9, 80.0, 62.5, 52.0, 45.2, 45.1, 44.7, 42.5, 31.6, 29.0, 27.3, 25.9, 23.1, 22.6, 20.4, 16.1, 15.4.

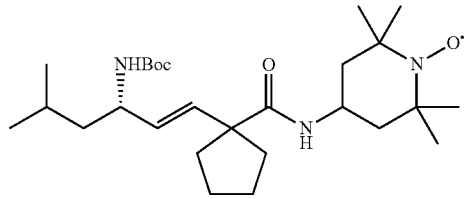

6f tert-Butyl (S,E)-(1-(1-((1-oxy-2,2,6,6-tetramethylpiperidin-4-yl)carbamoyl)cyclopentyl)-5-methylhex-1-en-3-yl)carbamate (6f). To a solution of 5f (0.118 g, 0.349 mmol, 1.0 equiv) in THF (3.5 mL) was added LiOH (1.0 M in H$_2$O, 2.4 mL, 2.40 mmol, 6.9 equiv) at r.t. The reaction mixture was heated at reflux for 24 h. The reaction mixture was acidified with 1 M KHSO4 (ca. 2 mL) at 0° C. The aqueous layer was extracted with EtOAc (3×10 mL). The combined organic layers were dried over Na$_2$SO$_4$, filtered, concentrated, and dried under high vacuum to afford the carboxylic acid as a pale yellow oil.

To a solution of carboxylic acid in anhydrous CH$_2$Cl$_2$ (3.5 mL) was added sequentially 4-amino-TEMPO (97.0 mg, 0.549 mmol, 1.6 equiv), DMAP (60.0 mg, 0.486 mmol, 1.4 equiv), HOBT.H$_2$O (67.0 mg, 0.488 mmol, 1.4 equiv), and EDC.HCl (94.0 mg, 0.490 mmol, 1.4 equiv). The resulting orange solution was stirred at r.t. for 24 h under nitrogen atmosphere. The reaction mixture was diluted with CH$_2$Cl$_2$ (10 mL). The organic layer was washed with aqueous solution of saturated NH$_4$Cl (2×5 mL). The aqueous phase was separated and extracted with CH$_2$Cl$_2$ (2×5 mL). The combined organic layers were dried over Na$_2$SO$_4$, filtered, and concentrated. Flash column chromatography carried out on silica gel with isocratic elution of 15% EtOAc/hexanes afforded the title compound as a peach colored amorphous solid (67.6 mg, 0.141 mmol, 41% yield). R$_f$=0.55 (40% EtOAc/hexanes); IR (neat) 3333, 2954, 1695, 1644, 1519, 1364, 1243, 1168 cm$^{-1}$; mp 132-140° C.; [α]$_D^{25}$=+25.6 (c 0.5, CH$_2$Cl$_2$); LC-MS m/z: 480.3 [M+2H]$^+$, 501.3 [M+Na]$^+$; HRMS (ESI) m/z: [M+H]$^+$ calcd for C$_{27}$H$_{49}$N$_3$O$_4$ 479.3718, found 479.3711.

A sample of this nitroxide (14.7 mg, 0.0306 mmol, 1.0 equiv) was dissolved in MeOH (degassed, 0.3 mL) and L-ascorbic acid (28.0 mg, 0.156 mmol, 5.1 equiv) was added. Complete discoloration of the solution occurred within a few seconds. After stirring for 3 h at r.t., the solvent was removed under reduced pressure. The resulting residue was partitioned between CH$_2$Cl$_2$ (3 mL) and H$_2$O (1 mL). The aqueous phase was extracted with CH$_2$Cl$_2$ (2×3 mL). The combined organic layers were dried over Na$_2$SO$_4$, filtered, concentrated, and dried under high vacuum to yield the corresponding hydroxylamine as a white foam (14.6 mg, 0.0305 mmol, quantitative). ¹H NMR (600 MHz, CD₃OD) δ 5.64 (d, J=15.7 Hz, 1H), 5.43 (dd, J=15.7, 6.9 Hz, 1H), 4.15 (m, 1H), 4.00 (q, J=7.4 Hz, 1H), 2.08-1.98 (m, 2H), 1.78-1.52 (m, 11H), 1.45 (s, 9H), 1.41-1.34 (m, 1H), 1.33-1.27 (m, 1H), 1.25-1.21 (m, 12H), 0.92 (d, J=6.6 Hz, 6H); ¹³C NMR (126 MHz, CD₃OD) δ 177.9, 157.9, 134.5, 133.3, 79.9, 61.7, 57.4, 52.4, 45.2, 45.0, 42.2, 36.9, 36.5, 32.0, 28.9, 25.9, 24.7, 22.9, 20.3.

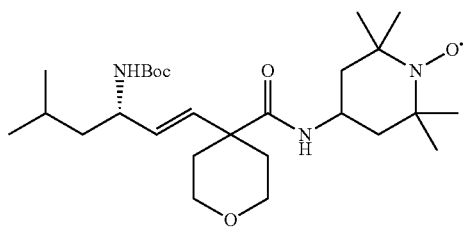

tert-Butyl (S,E)-(1-(4-((1-oxy-2,2,6,6-tetramethylpiperidin-4-yl)carbamoyl)tetrahydro-2H-pyran-4-yl)-5-methylhex-1-en-3-yl)carbamate (6g). To a solution of ester 5g (0.130 g, 0.365 mmol, 1.0 equiv) in THF (3.6 mL) was added LiOH (1.0 M in H₂O, 1.8 mL, 5.0 equiv) at r.t. The reaction mixture was heated at reflux for 12 h. The reaction mixture was acidified with 1 M KHSO4 (ca. 2 mL) at 0° C. The aqueous layer was extracted with EtOAc (3×10 mL). The combined organic layers were dried over Na₂SO₄, filtered, concentrated, and dried under high vacuum to afford the carboxylic acid as a pale yellow oil.

To a solution of crude carboxylic acid in anhydrous CH₂Cl₂ (4.0 mL) was added sequentially 4-amino-TEMPO (99.0 mg, 0.550 mmol, 1.5 equiv), DMAP (63.0 mg, 0.516 mmol, 1.4 equiv), HOBT.H₂O (70.0 mg, 0.518 mmol, 1.4 equiv), and EDC.HCl (100 mg, 0.521 mmol, 1.4 equiv). The resulting orange solution was stirred at r.t. for 24 h under nitrogen atmosphere. The reaction mixture was diluted with CH₂Cl₂ (10 mL). The organic layer was washed with saturated NH₄Cl (2×5 mL). The aqueous phase was separated and extracted with CH₂Cl₂ (2×5 mL). The combined organic layer was dried over Na₂SO₄, filtered, and concentrated. Flash column chromatography carried out on silica gel with gradient elution of 25-50% EtOAc/hexanes afforded the title compound as a peach colored solid (94.9 mg, 0.192 mmol, 53% yield). R$_f$=0.46 (60% EtOAc/hexanes); IR (neat) 3322, 2956, 2868, 1694, 1645, 1520, 1365, 1243, 1168 cm⁻¹; mp 147-152° C.; [α]$_D^{24}$=+24.8 (c 0.5, CH₂Cl₂); LC-MS m/z: 496.3 [M+2H]⁺, 517.3 [M+Na]⁺; HRMS (ESI) m/z: [M+H]⁺ calcd for C₂₇H₄₉N₃O₅ 495.3667, found 495.3662.

A sample of this nitroxide (13.7 mg, 0.0276 mmol, 1.0 equiv) was dissolved in MeOH (degassed, 0.3 mL) and L-ascorbic acid (25.0 mg, 0.139 mmol, 5.0 equiv) was added. Complete discoloration of the solution occurred within a few seconds. After stirring for 3 h at r.t., the solvent was removed under reduced pressure. The resulting residue was partitioned between CH₂Cl₂ (3 mL) and H₂O (1 mL). The aqueous phase was extracted with CH₂Cl₂ (2×3 mL). The combined organic layers were dried over Na₂SO₄, filtered, concentrated, and dried under high vacuum to yield the corresponding hydroxylamine as a white foam (12.8 mg, 0.0257 mmol, 93% yield). ¹H NMR (400 MHz, CD₃OD) δ 5.57 (d, J=15.9 Hz, 1H), 5.49-5.43 (m, 1H), 4.18-4.10 (m, 1H), 4.03 (q, 7.3 Hz, 1H), 3.74-3.57 (m, 4H), 2.16-2.06 (m, 2H), 1.73-1.60 (m, 5H), 1.53-1.26 (m, 13H, with app s, 1.44 ppm), 1.18 (d, J=8.0H, 12H), 0.92 (d, J=6.6 Hz, 6H); 13C NMR (151 MHz, CD₃OD) δ 176.3, 157.8, 135.0, 133.9, 79.9, 65.6, 60.4, 52.5, 47.1, 45.6, 45.0, 42.57, 42.46, 34.67, 34.58, 32.6, 28.9, 25.9, 22.87, 22.80, 20.3.

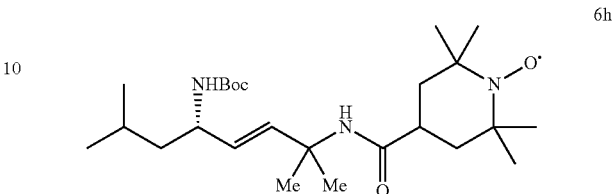

tert-Butyl (S,E)-(7-(1-oxy-2,2,6,6-tetramethylpiperidine-4-carboxamido)-2,7-dimethyloct-5-en-4-yl)carbamate (6h). To a solution of PIFA (200 mg, 0.452 mmol, 1.5 equiv) in acetonitrile:H₂O (3:1, 2.4:0.8 mL) was added primary amide 12a (90.0 mg, 0.302 mmol, 1.0 equiv) at r.t. After 15 min of stirring, pyridine (50 µL, 0.0485 mmol, 2.0 equiv) was added and the reaction mixture was stirred for 48 h at r.t. under nitrogen atmosphere. The solvent was evaporated under reduced pressure, and the resulting yellow oil was dried under high vacuum. To a solution of crude allylic amine in anhydrous CH₂Cl₂ (3 mL) was as added 4-carboxy-tempo (0.125 g, 0.605 mmol, 2.0 equiv), EDC.HCl (0.174 g, 0.907 mol, 3.0 equiv), HOBT.H₂O (0.123 g, 0.910 mmol, 3.0 equiv), DMAP (0.112 g, 0.908 mmol, 3.0 equiv). The reaction mixture was stirred for 72 h at r.t. under nitrogen atmosphere. The reaction was monitored by LC-MS, which showed remaining allylic amine. Therefore, additional reagents 4-carboxy-tempo (62 mg), EDC.HCl (86 mg), HOBT (61 mg), DMAP (56 mg) were added and the reaction mixture was stirred for an additional 72 h at r.t. under nitrogen atmosphere. The reaction mixture was diluted with CH₂Cl₂. The organic layer was washed with saturated NH₄Cl (2×5 mL). The organic layer was dried over anhydrous Na₂SO₄, filtered, and concentrated. Flash column chromatography was carried out with gradient elution of 20-40% EtOAc/hexanes to afford peach oil. The peach oil was passed through a plug of basic alumina with gradient elution of 50% EtOAc/hexanes to 90% EtOAc/hexanes to remove residual 4-carboxy-tempo. Concentration of solvents afforded the title compound as a peach-colored solid (0.0207 g, 0.0456 mmol, 15% yield). The title compound was passed through a plug of silica with 100% diethyl ether. The title compound was obtained as a yellow solid (16.9 mg, 0.0373 mmol, 12% yield).

Due to low-yields several batches were combined for complete characterization of final compound. The combined orange oil was flushed through a plug of silica using 100% diethyl ether to obtain pure final compound as an orange solid (60 mg). IR (neat) 3296, 2973, 1695, 1659, 1540, 1456, 1364, 1279, 1243, 1172 cm⁻¹; mp 155-164° C.; [α]$_D^{23}$=−6.8 (c 0.5, CH₂Cl₂); LC-MS m/z: 454.3 [M+2H]⁺, 475.3 [M+Na]⁺; HRMS (ESI) m/z: [M+H]⁺ calcd for C₂₅H₄₇N₃O₅ 453.3561, found 453.3583.

A sample of this nitroxide (13.6 mg, 0.0300 mmol, 1.0 equiv) was dissolved in MeOH (degassed, 0.3 mL) and L-ascorbic acid (27.0 mg, 0.150 mmol, 5.0 equiv) was added. Complete discoloration of the solution occurred within a few seconds. After stirring for 3 h at r.t., the solvent was removed under reduced pressure. The resulting residue was partitioned between CH₂Cl₂ (3 mL) and H₂O (1 mL). The aqueous phase was extracted with CH₂Cl₂ (2×3 mL).

The combined organic layers were dried over Na₂SO₄, filtered, concentrated, and dried under high vacuum to yield the corresponding hydroxylamine as a white foam (13.2 mg, 0.0290 mmol, 96% yield). ¹H NMR (400 MHz, CD₃OD) δ 5.75 (d, J=15.7 Hz, 1H), 5.39 (m, 1H), 4.04 (br s, 1H), 2.66 (m, 1H), 1.72-1.54 (m, 5H), 1.44 (s, 9H), 1.41-1.24 (m, 8H, with app s, 1.38 ppm), 1.19 (d, J=7.8 Hz, 12H), 0.91 (d, J=6.6 Hz, 6H); ¹³C NMR (151 MHz, CD₃OD) δ 176.7, 157.9, 136.8, 129.6, 79.8, 60.7, 54.3, 51.4, 45.5, 43.0, 37.3, 32.0, 28.8, 27.8, 25.8, 23.1, 22.8, 20.2.

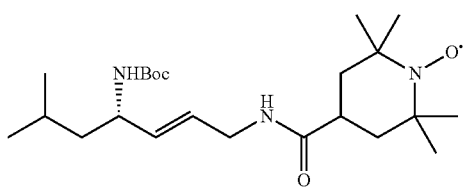

6i tert-Butyl (S,E)-(1-(1-oxy-2,2,6,6-tetramethylpiperidine-4-carboxamido)-6-methylhept-2-en-4-yl)carbamate (6h). To a solution of PIFA (242 mg, 0.546 mmol, 1.5 equiv) in dioxane:H₂O (1:1, 2.6 mL) was added 12b (98.0 mg, 0.362 mmol, 1.0 equiv) at r.t. After 15 min of stirring, pyridine (60 μL, 0.734 mmol, 2.0 equiv) was added and the reaction mixture was stirred for 4 h at r.t under nitrogen atmosphere. The solvent was evaporated under reduced pressure, and the resulting yellow oil was dried under high vacuum.

A solution of allylic amine and 4-carboxy-tempo (113 mg, 0.547 mmol, 1.5 equiv) in anhydrous CH₂Cl₂ (4 mL) at 0° C. was treated with HOBT.H₂O (100 mg, 0.729 mmol, 2.0 equiv), EDC.HCl (140 mg, 0.730 mmol, 2.0 equiv), and DMAP (90.0 mg, 0.729 mmol, 2.0 equiv). The reaction mixture was stirred at r.t for 48 h under nitrogen atmosphere. The reaction mixture was diluted with CH₂Cl₂ and washed with saturated NH₄Cl (2×5 mL). The aqueous layer was extracted with CH₂Cl₂. The combined organic layer was dried over Na₂SO₄, filtered, and concentrated. Flash column chromatography was carried out on silica gel with gradient elution of 20-50% EtOAc/hexanes. The combined fractions were concentrated and filtered through a plug of basic alumina using EtOAc as eluent. Concentration of solvent afforded the title compound as a peach colored foam (79.5 mg, 0.187 mmol, 52% yield). $R_f$=0.45 (70% EtOAc/hexanes); mp 63° C. (softening point: 46° C.); $[α]_D^{25}$=−7.8 (c 0.5, CH₂Cl₂); IR (neat) 3318, 2973, 2933, 2869, 1689, 1649, 1525, 1457, 1365, 1243, 1172 cm⁻¹; LC-MS m/z: 426.3 [M+2H]⁺, 447.2 [M+Na]⁺; HRMS (ESI) m/z: [M+H]⁺ calcd for C₂₃H₄₃N₃O₄ 425.3248, found 425.3246; HRMS (ESI) m/z: [M+Na]⁺ calcd for C₂₃H₄₂N₃NaO₄ 447.3068, found 447.3066.

A sample of this nitroxide (13.7 mg, 0.0322 mmol, 1.0 equiv) was dissolved in MeOH (degassed, 0.3 mL) and L-ascorbic acid (29.0 mg, 0.161 mmol, 5.0 equiv) was added. Complete discoloration of the solution occurred within a few seconds. After stirring for 30 min at r.t. the solvent was removed under reduced pressure. The resulting residue was partitioned between CH₂Cl₂ (4 mL) and H₂O (2 mL). The aqueous phase was extracted with CH₂Cl₂ (2×3 mL). The combined organic layers were dried over Na₂SO₄, filtered, concentrated, and dried under high vacuum to yield the corresponding hydroxylamine as a white foam (12.2 mg, 0.0286 mmol, 89% yield). ¹H NMR (400 MHz, CD₃OD) δ 6.63 (d, J=8.5 Hz, 1H), 5.59-5.48 (m, 2H), 4.05 (br s, 1H), 3.74 (d, J=4.5 Hz, 2H), 2.71-2.63 (m, 1H), 1.76-1.55 (m, 5H), 1.43 (s, 9H), 1.43-1.25 (m, 2H), 1.21 (d, J=14.7, 12H) 0.91 (dd, J=6.7, 1.5 Hz, 6H); ¹³C NMR (151 MHz, CD₃OD) δ 177.2, 157.9, 134.8, 126.8, 79.9, 61.2, 51.4, 45.3, 42.8, 41.6, 37.0, 31.9, 28.8, 25.8, 23.1, 22.6, 20.1.

Enantioenriched batch: To a solution of PIFA (221 mg, 0.495 mmol, 1.5 equiv) in dioxane:H₂O (1:1, 2.4 mL) was added 12b (90.0 mg, 0.332 mmol, 1.0 equiv) at r.t. After 15 min of stirring, pyridine (55 μL, 0.668 mmol, 2.0 equiv) was added and the reaction mixture was stirred for 12 h at r.t. under nitrogen atmosphere. The solvent was evaporated under reduced pressure, and the resulting yellow oil was dried under high vacuum.

A solution of allylic amine and 4-carboxy-tempo (104 mg, 0.504 mmol, 1.5 equiv) in anhydrous CH₂Cl₂ (3.5 mL) at 0° C. was treated with HOBT.H₂O (90 mg, 0.666 mmol, 2.0 equiv), EDC.HCl (128 mg, 0.666 mmol, 2.0 equiv) and DMAP (82.0 mg, 0.671 mmol, 2.0 equiv). The reaction mixture was stirred at r.t. for 44 h under nitrogen atmosphere. The reaction mixture was diluted with CH₂Cl₂ and washed with an aqueous solution of saturated NH₄Cl (2×5 mL). The aqueous layer was extracted with CH₂Cl₂. The combined organic layers were dried over Na₂SO₄, filtered, and concentrated. Flash column chromatography was carried out on silica gel with gradient elution of 20-50% EtOAc/hexanes. The combined fractions were concentrated and filtered over a plug of basic alumina using EtOAc eluent. Concentration of solvent afforded the title compound as a peach-colored foam (56.6 mg, 0.133 mmol, 40% yield). Mp 54-63° C.; $[α]_D^{14}$=−13.0 (c 0.5, CH₂Cl₂); LC-MS m/z: 426.2 [M+2H]⁺, 448.2 [M+H+Na]⁺; HRMS (ESI) m/z: [M+H]⁺ calcd for C₂₃H₄₃N₃O₄ 425.3248, found 425.3249.

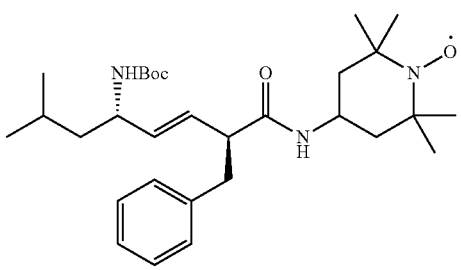

6j tert-Butyl ((4S,7S,E)-7-benzyl-8-((1-oxy-2,2,6,6-tetramethylpiperidin-4-yl)amino)-2-methyl-8-oxooct-5-en-4-yl)carbamate (6j). To a 0° C. solution of 11b (0.113 g, 0.218 mmol, 1.0 equiv) in THF/H₂O (4:1, 5 mL) was added sequentially 35% H₂O₂ (76 μL, 0.868 mmol, 4.0 equiv) and 1 M aqueous LiOH (0.44 mL, 2.0 equiv). The reaction mixture was stirred at 0° C. for 1 h. The reaction was quenched with saturated Na₂SO₃ (ca 8 mL, KI/starch paper was used to check for peroxides), and then acidified with saturated KHSO₄ (ca 15 mL). The aqueous layer was extracted with EtOAc (3×15 mL). The combined organic layers were dried over Na₂SO₄, filtered, concentrated, and dried under high vacuum. The crude carboxylic acid was used without further purification.

To a solution of crude carboxylic acid (0.218 mmol, 1.0 equiv) and 4-amino-TEMPO (63.0 mg, 0.350 mmol, 1.6 equiv) in anhydrous CH₂Cl₂ (3.0 mL) was added DMAP (37.0 mg, 0.303 mmol, 1.4 equiv), HOBT.H₂O (41.0 mg, 0.303 mmol, 1.4 equiv), and EDC.HCl (59.0 mg, 0.307 mmol, 1.4 equiv). The resulting orange solution was stirred at r.t. for 24 h under nitrogen atmosphere. The reaction was diluted with CH₂Cl₂ (10 mL). The organic layer was washed with saturated NH₄Cl (2×5 mL). The organic layer was dried over Na$_2$SO$_4$, filtered, and concentrated. Flash column chromatography was carried out on silica gel with gradient elution of 15-20% EtOAc/hexanes afforded the title compound as a peach foam (66.5 mg, 0.129 mmol, 59% yield). R$_f$=0.51 (40% EtOAc/hexanes); IR (neat) 3318, 2973, 2934, 1691, 1648, 1523, 1455, 1365, 1242, 1168 cm$^{-1}$; mp 88-94° C.; [α]$_D^{23}$=+47.4 (c 0.5, CH$_2$Cl$_2$); LC-MS m/z: 516.3 [M+2H]$^+$, 537.3 [M+Na]$^+$; HRMS (ESI) m/z: [M+H]$^+$ calcd for C$_{30}$H$_{49}$N$_3$O$_5$ 515.3718, found 515.3750.

A sample of this nitroxide (13.9 mg, 0.0270 mmol, 1.0 equiv) was dissolved in MeOH (degassed, 0.3 mL) and L-ascorbic acid (24.0 mg, 0.134 mmol, 5.0 equiv) was added. Complete discoloration of the solution occurred within a few seconds. The reaction mixture was stirred for 3 h at r.t. Solvent was removed under reduced pressure. The resulting residue was partitioned between CH$_2$Cl$_2$ (3 mL) and water (1 mL). The aqueous phase was extracted with CH$_2$Cl$_2$ (2×3 mL). The combined organic layers were dried over Na$_2$SO$_4$, filtered, concentrated, and dried under high vacuum to yield the corresponding hydroxylamine as a white foam (12.2 mg, 0.0236 mmol, 88% yield). $^1$H NMR (400 MHz, CD$_3$OD) δ 7.25-7.14 (m, 5H), 5.63 (m, 1H), 5.39 (m, 1H), 4.06-3.98 (m, 2H), 3.14 (m, 1H), 2.98 (dd, J=13.3, 8.4 Hz, 1H), 2.74 (dd, J=13.3, 6.9 Hz, 1H), 1.73-1.68 (m, 1H), 1.54-1.37 (m, 12H, with apparent s, 1.43 ppm), 1.34-1.15 (m, 15H), 0.86 (dd, J=6.6, 3.6 Hz, 6H); $^{13}$C NMR (150 MHz, CD$_3$OD) δ 175.2, 157.8, 140.4, 135.4, 130.3, 129.6, 129.3, 127.3, 79.8, 61.6, 53.4, 51.7, 45.3, 45.2, 45.1, 41.6, 40.0, 31.9, 28.8, 25.7, 22.9, 22.8, 20.3.

Flash column chromatography carried out on silica gel with gradient elution of 20-40% EtOAc/hexanes afforded the title compound as peach-colored foam (0.0583 g, 0.110 mmol, 54% yield). IR (neat) 3319, 2934, 1693, 1651, 1509, 1365, 1241, 1220, 1160, 972, 824 cm$^{-1}$; [α]$_D^{23}$+45.0 (c 0.3, CHCl$_3$); HRMS (ESI) m/z: [M+H]$^+$ calcd for C$_{30}$H$_{46}$N$_3$O$_4$F 531.3467, found 531.3444.

A sample of this nitroxide (13.0 mg, 0.024 mmol, 1.0 equiv) was dissolved in MeOH (degassed, 1.0 mL) and L-ascorbic acid (31.0 mg, 0.176 mmol, 5.0 equiv) was added. Complete discoloration of the solution occurred within a few seconds. The reaction mixture was stirred for 3 h at r.t. Solvent was removed under reduced pressure. The resulting residue was partitioned between CH$_2$Cl$_2$ (3 mL) and water (1 mL). The aqueous phase was extracted with CH$_2$Cl$_2$ (2×3 mL). The combined organic layers were dried over Na$_2$SO$_4$, filtered, concentrated, and dried under high vacuum to yield the corresponding hydroxylamine as a light yellow oil (11.0 mg, 0.021 mmol, 84% yield). 1H NMR (600 MHz, CD$_3$OD) δ 7.73 (s, 1H), 7.16 (dd, J=8.4, 6.0 Hz, 2H), 6.97 (t, J=8.4 Hz), 6.95 (s, 1H), 5.61 (dd, J=15.0, 8.4 Hz, 1H), 5.38 (app d, J=10.2 Hz, 1H), 4.04-3.98 (m, 2H), 3.13-3.09 (m, 1H), 2.96 (dd, J=8.4, 4.8 Hz, 1H), 2.73 (q, J=6.6 Hz), 1.76-1.74 (m, 1H), 1.57-1.55 (m, 1H), 1.57 (s, 12H), 1.55-1.17 (m, 15H), 0.87 (dd, J=6.3, 4.0 Hz, 6H); $^{13}$C NMR (150 MHz, CD$_3$OD) δ 175.1, 163.8, 162.2, 157.8, 136.4, 135.6, 132.0, 131.9, 129.3, 115.9, 115.8, 79.9, 62.3, 53.4, 51.7, 49.9, 45.2, 45.1, 41.5, 39.1, 31.5, 30.8, 28.8, 25.7, 22.9, 22.7, 20.3; $^{19}$F (376 MHz, CD$_3$OD) δ −119.3.

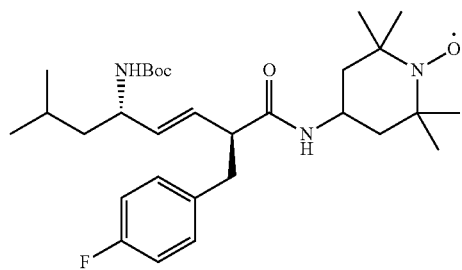

6k tert-Butyl ((4S,7S,E)-7-(4-fluorobenzyl)-8-((1-oxy-2,2,6,6-tetramethylpiperidin-4-yl)amino)-2-methyl-8-oxooct-5-en-4-yl)carbamate (6k). To a 0° C. solution of 11c (0.109 g, 0.202 mmol, 1.0 equiv) in THF:H$_2$O (4:1 mL) was added sequentially 35% H$_2$O$_2$ (71 μL, 0.811 mmol, 4.0 equiv) and 1 M aqueous LiOH (0.41 mL, 2.0 equiv). The reaction mixture was stirred at 0° C. for 1 h. The reaction was quenched with aqueous solution of saturated Na$_2$SO$_3$ and acidified to pH 2 with saturated KHSO$_4$. The aqueous solution was extracted with EtOAc (3×15 mL). The combined organic layers were dried over Na$_2$SO$_4$, filtered, concentrated, and dried under high vacuum. The crude carboxylic acid was used without further purification.

To a solution of crude carboxylic acid and 4-amino-TEMPO (58.0 mg, 0.322 mmol, 1.6 equiv) in anhydrous CH$_2$Cl$_2$ (2.0 mL) was added sequentially DMAP (35 mg, 0.286 mmol, 1.4 equiv), HOBT.H$_2$O (38.0 mg, 0.281 mmol, 1.4 equiv), and EDC.HCl (54.0 mg, 0.281 mmol, 1.4 equiv). The resulting orange solution was stirred at r.t. for 24 h under nitrogen atmosphere. The reaction mixture was diluted with CH$_2$Cl$_2$ (10 mL). The organic layer was washed with saturated NH$_4$Cl (2×5 mL). The combined organic layers were dried over Na$_2$SO$_4$, filtered, and concentrated.

61 tert-Butyl (S,Z)-(8-((1-oxy-2,2,6,6-tetramethylpiperidin-4-yl)amino)-2-methyl-8-oxooct-5-en-4-yl)carbamate (6l). To a solution of 5h' (92.1 mg, 0.323 mmol, 1.0 equiv) in THF (3 mL) was added LiOH (1.0 M in H$_2$O, 1.50 mL, 4.6 equiv) at r.t. The reaction mixture was stirred at r.t. for 4 h. The reaction mixture was acidified with 1 M KHSO4 (ca. 2 mL) at 0° C. The aqueous layer was extracted with EtOAc (3×10 mL). The combined organic layers were dried over Na$_2$SO$_4$, filtered, concentrated, and dried under high vacuum to afford the carboxylic acid as a colorless oil.

To a solution of crude carboxylic acid in anhydrous CH$_2$Cl$_2$ (3.0 mL) was added sequentially 4-amino-TEMPO (85 mg, 0.481 mmol, 1.5 equiv), DMAP (46.0 mg, 0.377 mmol, 1.2 equiv), HOBT.H$_2$O (53.0 mg, 0.386 mmol, 1.2 equiv), and EDC.HCl (74.0 mg, 0.386 mmol, 1.2 equiv). The resulting orange solution was stirred at r.t. for 24 h under nitrogen atmosphere. The reaction mixture was diluted with CH$_2$Cl$_2$ (10 mL). The organic layer was washed with saturated NH$_4$Cl (2×5 mL). The aqueous phase was separated and extracted with CH$_2$Cl$_2$ (2×5 mL). The combined organic layer was dried over Na$_2$SO$_4$, filtered, and concentrated. Flash column chromatography carried out on silica gel with isocratic elution of 20% EtOAc/hexanes afforded the title compound as a peach colored foam (0.105 g, 0.231 mmol, 54% yield). R$_f$=0.46 (50% EtOAc/hexanes); IR (neat) 3298, 2973, 1687, 1665, 1647, 1525, 1458, 1365, 1269, 1244, 1169 cm$^{-1}$; mp 55° C. (softening point: 44° C.); $[\alpha]_D^{25}=-65.7$ (c 1.0, CH$_2$Cl$_2$); LC-MS m/z: 425.3 [M+H]$^+$, 426.2 [M+2H]$^+$, 448.2 [M+Na]$^+$; HRMS (ESI) m/z: [M+Na]$^+$ calcd for C$_{23}$H$_{42}$N$_3$O$_4$ 447.3068, found 447.3069.

A sample of this nitroxide (11.6 mg, 0.0273 mmol, 1.0 equiv) was dissolved in MeOH (degassed, 0.3 mL) and L-ascorbic acid (25.0 mg, 0.139 mmol, 5.0 equiv) was added. Complete discoloration of the solution occurred within a few seconds. After stirring for 30 min at r.t., the solvent was removed under reduced pressure. The resulting residue was partitioned between CH$_2$Cl$_2$ (4 mL) and H$_2$O (2 mL). The aqueous phase was extracted with CH$_2$Cl$_2$ (2×3 mL). The combined organic layers were dried over Na$_2$SO$_4$, filtered, concentrated, and dried under high vacuum to yield the corresponding hydroxylamine as a white foam (10.3 mg, 0.0242 mmol, 89% yield). $^1$H NMR (400 MHz, CD$_3$OD) δ 5.47-5.43 (m, 1H), 5.26-5.23 (m, 1H), 4.22-4.19 (m, 1H), 3.00 (1H), 3.13-(m, 1H), 2.80 (m, 1H), 1.70-1.62 (m, 2H), 1.53-1.50 (m, 1H), 1.42-1.29 (m, 12H, app s, 1.33 ppm), 1.19-1.05 (m, 13H), 0.82 (t, J=6.0 Hz, 6H); $^{13}$C NMR (126 MHz, CD$_3$OD) δ 173.0, 157.8, 135.7, 124.2, 79.9, 60.5, 47.3, 45.9, 45.1, 42.2, 36.3, 32.6, 28.9, 25.8, 23.2, 22.8, 20.3.

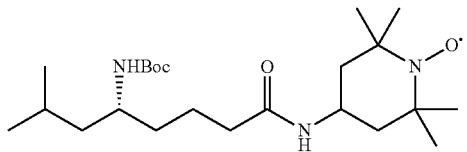

6m tert-Butyl (R)-(8-((1-oxy-2,2,6,6-tetramethylpiperidin-4-yl)amino)-2-methyl-8-oxooctan-4-yl)carbamate (6m). To a solution of ester S5 (0.149 g, 0.519 mmol, 1.0 equiv) in THF (5.2 mL) was added LiOH (1.0 M in H$_2$O, 2.6 mL, 5.0 equiv) at r.t. The reaction mixture was stirred at r.t. for 6 h. The reaction mixture was acidified with 1 M KHSO$_4$ (ca. 3 mL) at 0° C. The aqueous layer was extracted with CH$_2$Cl$_2$ (3×15 mL). The combined organic layers were dried over Na$_2$SO$_4$, filtered, concentrated, and dried under high vacuum to afford the carboxylic acid as colorless oil.

To a solution of crude carboxylic acid in anhydrous CH$_2$Cl$_2$ (5.2 mL) was added sequentially 4-amino-TEMPO (140 mg, 0.777 mmol, 1.4 equiv), DMAP (89.0 mg, 0.728 mmol, 1.4 equiv), HOBT.H$_2$O (100 mg, 0.729 mmol, 1.4 equiv), and EDC.HCl (140 mg, 0.729 mmol, 1.4 equiv). The resulting orange solution was stirred at r.t. for 20 h under nitrogen atmosphere. The reaction mixture was diluted CH$_2$Cl$_2$ (20 mL). The organic layer was washed with aqueous solution of saturated NH$_4$Cl (2×10 mL). The combined organic layers were dried over Na$_2$SO$_4$, filtered, and concentrated. Flash column chromatography carried out on silica gel with gradient elution of 40-60% EtOAc/hexanes afforded the title compound as a peach colored foam (0.214 g, 0.470 mmol, 59% yield). R$_f$=0.46 (70% EtOAc/hexanes); IR (neat) 3308, 2954, 1687, 1648, 1529, 1459, 1364, 1243, 1170, 1048 cm$^{-1}$; mp 140-142° C.; LC-MS m/z: 428.3 [M+2H]$^+$, 450.2 [M+H+Na]$^+$; HRMS (ESI) m/z: [M+H]$^+$ calcd for C$_{23}$H$_{45}$N$_3$O$_5$ 427.3405, found 427.3394. $[\alpha]_D^{24}=+12.4$ (c 0.5, CH$_2$Cl$_2$).

A sample of this nitroxide (14.3 mg, 0.0335 mmol, 1.0 equiv) was dissolved in MeOH (degassed, 0.3 mL) and L-ascorbic acid (30.0 mg, 0.167 mmol, 5.0 equiv) was added. Complete discoloration of the solution occurred within a few seconds. The reaction mixture was stirred for 3 h at r.t. Solvent was removed under reduced pressure. The resulting residue was partitioned between CH$_2$Cl$_2$ (3 mL) and H$_2$O (1 mL). The aqueous phase was extracted with CH$_2$Cl$_2$ (2×3 mL). The combined organic layers were dried over Na$_2$SO$_4$, filtered, concentrated, and dried under high vacuum to yield the corresponding hydroxylamine as a white foam (12.4 mg, 0.0290 mmol, 87% yield). $^1$H NMR (400 MHz, CD$_3$OD) δ 4.11 (tt, J=12.3, 3.9 Hz, 1H), 3.55 (m, 1H), 2.22-2.09 (m, 2H), 1.79-1.75 (m, 2H), 1.72-1.59 (m, 3H), 1.47-1.41 (m, 12H), 1.38-1.26 (m, 3H), 1.20 (d, J=6.8 Hz, 12H), 0.91 (d, J=6.6 Hz, 6H); $^{13}$C NMR (151 MHz, CDCl$_3$) δ 175.2, 158.3, 79.6, 61.0, 45.7, 41.9, 36.8, 36.5, 32.3, 28.8, 26.1, 23.7, 23.5, 22.5, 20.3

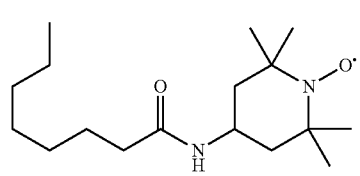

6n

N-(1-Oxy-2,2,6,6-tetramethylpiperidin-4-yl)octanamide (6n). A solution of 4-amino-TEMPO (173 mg, 0.960 mmol, 1.4 equiv), DMAP (118 mg, 0.965 mmol, 1.4 equiv), HOBT.H$_2$O (132 mg, 0.977 mmol, 1.4 equiv) EDC.HCl (185 mg, 0.963 mmol, 1.4 equiv), and octanoic acid (0.11 mL, 0.687 mmol, 1.0 equiv) in anhydrous CH$_2$Cl$_2$ (6.9 mL) was stirred at r.t. for 20 h under nitrogen atmosphere. The reaction mixture was diluted with CH$_2$Cl$_2$ (10 mL). The organic layer was washed with saturated NH$_4$Cl (2×5 mL). The combined organic layers were dried over Na$_2$SO$_4$, filtered, and concentrated. Flash column chromatography carried out on silica gel with gradient elution of 20-50% EtOAc/hexanes afforded the title compound as peach-colored oil (0.192 g, 0.647 mmol, 94% yield). R$_f$=0.38 (15% EtOAc/hexanes); IR (neat) 3283, 2927, 2857, 1641, 1542, 1460, 1363, 1301, 1242, 1179, 1118 cm$^{-1}$; LC-MS m/z 298.2 [M+H]$^+$, 320.2 [M+Na]$^+$; HRMS (ESI) m/z: [M+H]$^+$ calcd for C$_{17}$H$_{34}$N$_2$O$_2$ 298.2615, found 298.2607.

A sample of this nitroxide (13.5 mg, 0.0454 mmol, 1.0 equiv) was dissolved in MeOH (degassed, 0.45 mL) and L-ascorbic acid (41.0 mg, 0.228 mmol, 5.0 equiv) was added. Complete discoloration of the solution occurred within a few seconds. The reaction mixture was stirred for 1 h at r.t. Solvent was removed under reduced pressure. The resulting residue was partitioned between CH$_2$Cl$_2$ (3 mL) and H$_2$O (1 mL). The aqueous phase was extracted with CH$_2$Cl$_2$ (2×3 mL). The combined organic layers were dried over Na$_2$SO$_4$, filtered, concentrated, and dried under high vacuum to yield the corresponding hydroxylamine as a colorless oil (10.6 mg, 0.0355 mmol, 78% yield). $^1$H NMR (400 MHz, CD$_3$OD) δ 4.12 (tt, J=12.3, 3.8 Hz, 1H), 2.14 (t, J=7.5 Hz, 2H), 1.77 (m, 2H), 1.60 (m, 2H), 1.44 (m, 2H), 1.37-1.26 (m, 8H), 1.20 (d, J=8.2 Hz, 12H), 0.90 (m, 3H); $^{13}$C NMR (150 MHz, CDCl$_3$) δ 175.6, 60.9, 45.7, 41.9, 37.2, 32.9, 32.3, 30.2, 30.1, 27.1, 23.7, 20.3, 14.4.

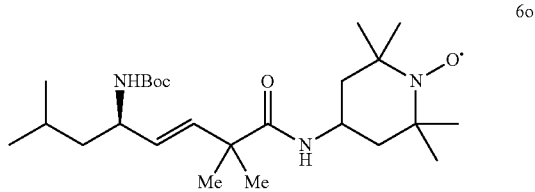

6o tert-Butyl (R,E)-(8-((1-oxy-2,2,6,6-tetramethylpiperidin-4-yl)amino)-2,7,7-trimethyl-8-oxooct-5-en-4-yl)carbamate (6o). To a solution of ester 5i (0.107 g, 0.342 mmol, 1.0 equiv) in THF (3.4 mL) was added LiOH (1.0 M in H$_2$O, 1.7 mL, 5.0 equiv) at r.t. The reaction mixture was heated at reflux for 18 h. The reaction mixture was acidified with 1 M KHSO$_4$ (ca. 3 mL) at 0° C. The aqueous layer was extracted with CH$_2$Cl$_2$ (3×15 mL). The combined organic layers were dried over Na$_2$SO$_4$, filtered, concentrated, and dried under high vacuum to afford the carboxylic acid as colorless oil.

To a solution of crude carboxylic acid in anhydrous CH$_2$Cl$_2$ (3.5 mL) was added sequentially 4-amino-TEMPO (86.0 mg, 0.477 mmol, 1.4 equiv), DMAP (50.0 mg, 0.411 mmol, 1.2 equiv), HOBT.H$_2$O (56.0 mg, 0.411 mmol, 1.2 equiv), and EDC.HCl (78.9 mg, 0.411 mmol, 1.2 equiv). The resulting orange solution was stirred at r.t. for 20 h under nitrogen atmosphere. The reaction mixture was diluted CH$_2$Cl$_2$ (20 mL). The organic layer was washed with saturated NH$_4$Cl (2×10 mL). The combined organic layers were dried over Na$_2$SO$_4$, filtered, and concentrated. Flash column chromatography carried out on silica gel with gradient elution of 40-60% EtOAc/hexanes afforded the title compound as a peach colored foam (0.0775 g, 0.171 mmol, 50% yield); IR (neat) 3326, 2972, 1693, 1646, 1519, 1364, 1243, 1166, 973, 873 cm$^{-1}$ [α]$_D^{24}$ 33.1 (c 0.2, CH$_2$Cl$_2$); HRMS (ESI) m/z: [M+H]$^+$ calcd for C$_{25}$H$_{48}$N$_3$O$_4$ 454.3639, found 454.3638.

A sample of this nitroxide (11.0 mg, 0.024 mmol, 1.0 equiv) was dissolved in MeOH (degassed, 1.0 mL) and L-ascorbic acid (31.0 mg, 0.17 mmol, 5.0 equiv) was added. Complete discoloration of the solution occurred within a few seconds. The reaction mixture was stirred for 3 h at r.t. Solvent was removed under reduced pressure. The resulting residue was partitioned between CH$_2$Cl$_2$ (3 mL) and H$_2$O (1 mL). The aqueous phase was extracted with CH$_2$Cl$_2$ (2×3 mL). The combined organic layers were dried over Na$_2$SO$_4$, filtered, concentrated, and dried under high vacuum to yield the corresponding hydroxylamine as a white foam (11.0 mg, 0.024 mmol, quantitative). $^1$H NMR (600 MHz, CD$_3$OD) δ 6.84 (d, J=7.2 Hz, 1H), 5.65 (d, J=15.6 Hz, 1H), 5.40 (dd, J=9.6, 6.6 Hz, 1H), 4.08 (br s, 1H), 3.98-3.95 (m, 1H), 3.27 (t, J=1.2 Hz, 1H), 1.71-1.67 (m, 2H), 1.61-1.48 (m, 3H), 1.46 (s, 9H), 1.46-1.14 (m, 18H), (d, J=6.6 Hz, 6H); $^{13}$C NMR (150 MHz, CD$_3$OD) δ 178.6, 158.0, 136.0, 132.7, 79.9, 61.1, 52.4, 49.8, 45.5, 45.3, 45.12, 45.09, 44.9, 42.3, 32.3, 29.0, 25.8, 25.5, 23.0, 22.7, 20.3.

filtered, concentrated, and dried under high vacuum to afford the carboxylic acid as colorless oil.

To a solution of crude carboxylic acid in anhydrous CH$_2$Cl$_2$ (1.7 mL) was added sequentially 4-amino-TEMPO (35.1 mg, 0.195 mmol, 1.4 equiv), DMAP (20.4 mg, 0.167 mmol, 1.2 equiv), HOBT.H$_2$O (22.9 mg, 0.167 mmol, 1.2 equiv), and EDC.HCl (32.1 mg, 0.167 mmol, 1.2 equiv). The resulting orange solution was stirred at r.t. for 14.5 h under nitrogen atmosphere. The reaction mixture was diluted CH$_2$Cl$_2$ (3 mL). The organic layer was washed with aqueous solution of saturated NH$_4$Cl (2×3 mL). The combined organic layers were dried over MgSO$_4$, filtered, and concentrated. Flash column chromatography carried out on silica gel with gradient elution of 15-45% EtOAc/hexanes afforded the title compound as a peach colored solid (35.4 mg, 0.0765 mmol, 55% yield). Mp 69-70° C.; IR (neat) 3294, 2941, 2932, 1647, 1508, 1365, 1222, 1184, 1014, 974, 838; [α]$_D^{25}$+33.4 (c 0.2, CHCl$_3$); HRMS (ESI) m/z: [M+H]$^+$ calcd for C$_{25}$H$_{38}$FN$_3$O$_4$ 463.2841, found 463.2820.

A sample of this nitroxide (6.88 mg, 0.0149 mmol, 1.0 equiv) was dissolved in MeOH (degassed, 0.15 mL, 0.1 M) and L-ascorbic acid (13.4 mg, 0.0744 mmol, 5.0 equiv) was added. Complete discoloration of the solution occurred within a few seconds. The reaction mixture was stirred for 1 h at r.t. Solvent was removed under reduced pressure. The resulting residue was partitioned between CH$_2$Cl$_2$ (3 mL) and H$_2$O (1 mL). The aqueous phase was extracted with CH$_2$Cl$_2$ (2×3 mL). The combined organic layers were dried over MgSO$_4$, filtered, concentrated, and dried under high vacuum to yield the corresponding hydroxylamine as a white foam (quantitative). $^1$H NMR (600 MHz, CD$_3$OD) δ 7.31 (dd, J=8.4, 5.4 Hz, 2H), 7.05 (t, J=8.4 Hz, 2H), 5.76-5.72 (m, 1H), 5.70-5.65 (m, 1H), 5.17 (br s, 1H), 4.10-4.06 (m, 1H), 2.94 (d, J=6.6 Hz, 2H), 1.73 (dd, J=13.2, 3.6 Hz, 2H), 1.44 (s, 9H), 1.40-1.29 (m, 4H), 1.17 (d, J=10.2 Hz, 12H); $^{13}$C NMR (150 MHz, CD$_3$OD) δ 173.1, 164.2, 162.6, 139.1, 135.1, 129.9, 129.8, 116.2, 116.0, 80.5, 60.2, 45.8, 42.2, 40.5, 32.6, 28.8, 20.3; $^{19}$F NMR (376 MHz, CD$_3$OD) δ −117.9.

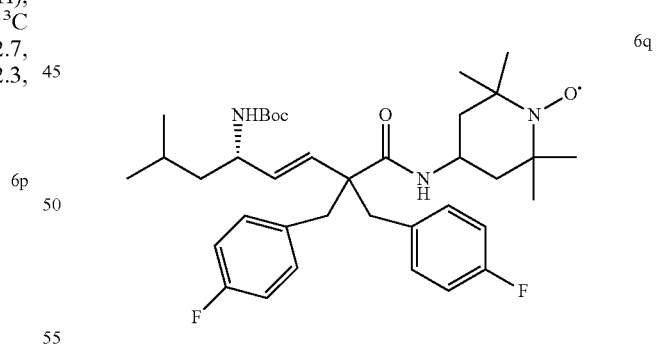

6q

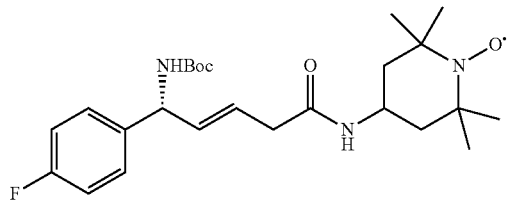

6p tert-Butyl (R,E)-(1-(4-fluorophenyl)-5-((1-oxy-2,2,6,6-tetramethylpiperidin-4-yl)amino)-5-oxopent-2-en-1-yl)carbamate (6p). To a solution of ester 4d (0.045 g, 0.139 mol, 1.0 equiv) in THF (1.7 mL) was added LiOH (1.0 M in H$_2$O, 0.70 mL, 5.0 equiv). The reaction mixture was stirred at r.t. for 20 hours and then heated at 60° C. for 5.5 h. The reaction mixture was acidified with 1 M KHSO$_4$ (ca. 1 mL) at 0° C. The aqueous layer was extracted with CH$_2$Cl$_2$ (3×5 mL). The combined organic layers were dried over MgSO$_4$, tert-Butyl (S,E-(7,7-bis(4-fluorobenzyl)-8-((1-oxy-2,2,6,6-tetramethylpiperidin-4-yl)amino)-2-methyl-8-oxooct-5-en-4-yl)carbamate (6q). To a solution of ester 5j (0.194 g, 0.387 mmol, 1.0 equiv) in MeOH/THF (2/1 mL) was added 2 M KOH (1.0 mL, 5.1 equiv) at r.t. The reaction mixture was heated at reflux for 14 h. The reaction mixture was acidified with 1 M KHSO$_4$ (ca. 8 mL) at 0° C. The reaction mixture was extracted with CH$_2$Cl$_2$ (2×). The combined organic layer was washed with brine, dried dried over Na$_2$SO$_4$, filtered, concentrated, and dried under high vacuum to afford the crude carboxylic acid as a light yellow oil (0.157 g, 0.322 mmol, 83% yield) that was used without further purification. HRMS (ESI) m/z: [M−H]+ calcd for $C_{28}H_{34}F_2NO_4$ 486.2450, found 486.2464.

To a solution of crude carboxylic acid (0.157 g, 0.322 mmol, 1 equiv) in anhydrous $CH_2Cl_2$ (1.0 mL) was added sequentially 4-amino-TEMPO (83 mg, 0.46 mmol, 1.4 equiv) in $CH_2Cl_2$ (1.5 mL), DMAP (59 mg, 0.48 mol, 1.5 equiv), HOBT.$H_2O$ (57 mg, 0.42 mmol, 1.3 equiv), and EDC.HCl (86 mg, 0.45 mmol, 1.4 equiv) at room temperature. The resulting orange solution was stirred at r.t. for 2 h under nitrogen atmosphere. The solvent was removed under reduced pressure and the resulting residue was extracted with $CH_2Cl_2$ and washed with $H_2O$, brine, dried over $Na_2SO_4$, filtered, concentrated, and dried under high vacuum to yield the corresponding hydroxylamine as a light yellow oil (10.1 mg, 0.016 mmol, 76% yield). $^1$H NMR (600 MHz, $CD_3OD$) δ 7.19-7.15 (m, 4H), 6.95-6.92 (m, 4H), 5.56 (d, J=16.1 Hz, 1H), 5.50 (dd, J=13.3, 6.3 Hz, 1H), 4.02-3.99 (m, 1H), 3.95-3.93 (m, 1H), 3.27 (d, J=13.5 Hz, 1H), 3.13 (d, J=13.7 Hz, 1H), 2.93 (d, J=13.7 Hz, 1H), 2.83 (d, J=13.6 Hz, 1H), 1.58-1.54 (m, 2H), 1.42 (s, 9H), 1.34-1.26 (m, 6H), 1.18 (d, J=9.6 Hz, 6H), 1.13 (d, J=16.1 Hz, 6H), 0.91 (d, J=6.5 Hz, 6H); $^{13}$C NMR (151 MHz, $CD_3OD$) δ 175.3, 163.94, 163.90, 162.33, 162.29, 157.9, 136.3, 134.8, 133.42, 133.37, 131.3, 115.5, 115.4, 80.0, 77.1, 70.7, 63.5, 61.1, 55.1, 52.9, 45.3, 44.7, 44.5, 43.5, 42.5, 32.2, 29.0, 25.8, 22.9, 22.7, 20.3; $^{19}$F NMR (565 MHz, $CD_3OD$) δ −118.9, −119.0.

Having described this invention above, it will be understood to those of ordinary skill in the art that the same can be performed within a wide and equivalent range of conditions, formulations and other parameters without affecting the scope of the invention or any embodiment thereof. Any document incorporated herein by reference is only done so to the extent of its technical disclosure and to the extent it is consistent with the present document and the disclosure provided herein.

What is claimed is:

1. A compound having the structure:

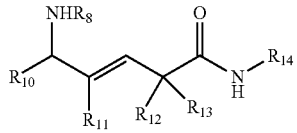

wherein, $R_8$ is an acyl group;

$R_{10}$ is $(C_1$-$C_6)$alkyl or $(C_3$-$C_8)$cycloalkyl, optionally substituted with, independently, 1, 2, or 3 F atoms;

$R_{11}$ is H;

$R_{12}$ and $R_{13}$ are, independently, $(C_1$-$C_6)$alkyl or $(C_3$-$C_8)$cycloalkyl, that is optionally substituted with 1, 2, or 3 F atoms, or $R_{12}$ and $R_{13}$ together form a cycloalkyl ring or a heterocycloalkyl ring comprising one O, S, or N atom;

$R_{14}$ is optionally substituted —NH—$R_{15}$, wherein $R_{15}$ is a nitroxide -containing group; and the double bond is cis or trans configured, or a pharmaceutically-acceptable salt thereof, including stereoisomers thereof and mixtures of stereoisomers thereof.

2. The compound of claim 1, wherein $R_{15}$ is:

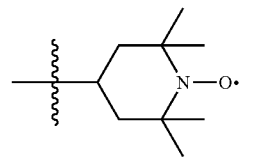

(2,2,6,6-tetramethylpiperidin-N-oxyl).

3. The compound of claim 1, wherein, $R_8$ is 9-fluorenylmethyloxy carbonyl (Fmoc), t-butyloxycarbonyl (Boc), benzhydryloxycarbonyl (Bhoc), benzyloxycarbonyl (Cbz), O-nitroveratryloxycarbonyl (Nvoc), benzyl (Bn), allyloxycarbonyl (alloc), trityl (Trt), 1-(4,4-dimethyl-2,6-dioxacyclohexylidene)ethyl (Dde), diathiasuccinoyl (Dts), benzothiazole-2-sulfonyl (Bts), dimethoxytrityl (DMT), or monomethoxytrityl (MMT).

4. The compound of claim 1, wherein $R_{12}$ and $R_{13}$ together form a cycloalkyl ring or a heterocycloalkyl ring comprising one O, S, or N atom.

5. The compound of claim 1, wherein $R_{12}$ and $R_{13}$ together form a cyclopropyl, cyclobutyl, cyclopentyl, or tetrahydropyranyl ring.

6. The compound of claim 1, wherein $R_{12}$ and $R_{13}$ are both methyl, $R_{11}$ is H, and $R_{10}$ is $(C_1$-$C_4)$alkyl.

7. The compound of claim 1, having a structure:

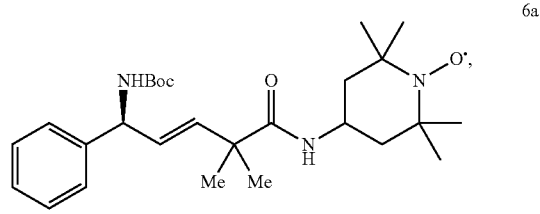

6a

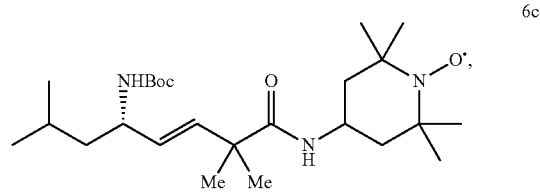

6c

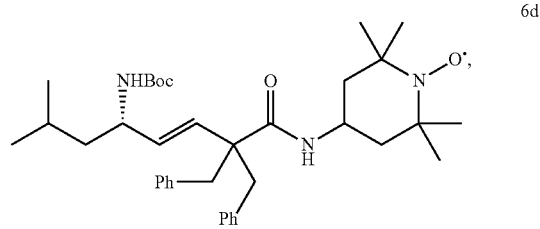

6d

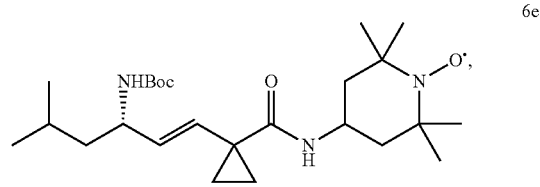

6e

-continued

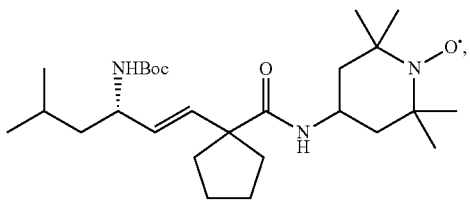

6f

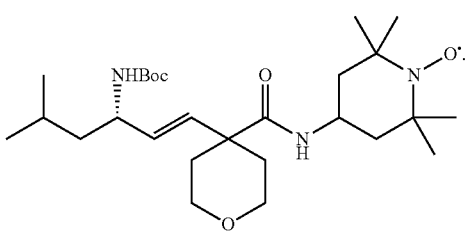

6g

8. The compound of claim 1, comprising one or more substituted groups, wherein each substituent of the one or more substituted groups is, independently, F, or $(C_1-C_6)$ alkyl, $(C_1-C_6)$alkoxyl, $(C_3-C_8)$cycloalkyl, or $(C_2-C_7)$cycloether that is optionally substituted with 1, 2, or 3 F atoms.

9. The compound of claim 1, having a structure:

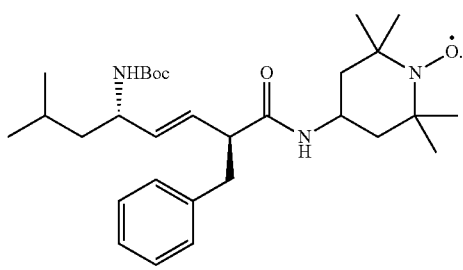

6j

10. The compound of claim 1, wherein $R_8$ is t-butyloxycarbonyl (Boc), $R_{10}$ is isobutyl, $R_{11}$ is H, and $R_{12}$ and $R_{13}$ together form a benzyl ring.

11. A method of treating or preventing ferroptosis in a patient in need thereof, comprising administering to the patient an amount of a compound of claim 1, effective to reduce or prevent ferroptosis in the patient, thereby reducing ferroptosis in the patient.

12. The method of claim 11, wherein, in the compound that is administered to the patient, $R_8$ is t-butyloxycarbonyl (Boc), $R_{10}$ is isobutyl, $R_{11}$ is H, and $R_{12}$ and $R_{13}$ together form a benzyl ring.

13. The compound of claim 1, wherein $R_8$ is —C(O)$XR_9$, where $R_9$ is $(C_1-C_6)$alkyl or $(C_3-C_8)$cycloalkyl, optionally-substituted with phenyl, substituted phenyl, heteroaryl, or substituted heteroaryl, and X is —NH, —O—, or is not present.

14. The compound of claim 1, wherein:
$R_{10}$ is $C_4H_9$, phenyl, phenyl substituted with one F atom, or a heterocyclic 5-membered ring comprising one O atom;
$R_{11}$ is H;
$R_{12}$ and $R_{13}$ are, independently, $CH_3$ or benzyl, where the benzyl is optionally substituted with one F atom, or $R_{12}$ and $R_{13}$ together form a cycloalkyl ring or a heterocycloalkyl ring comprising one O atom; and
$R_{14}$ is NH—$R_{15}$, where $R_{15}$ is 15. The method of claim 11, wherein the compound administered to the patient has a structure:

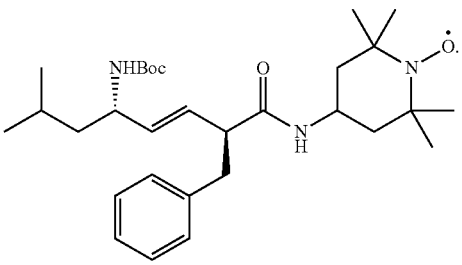

6j

16. The method of claim 11, wherein the patient has a neurodegenerative disease, traumatic brain injury, acute kidney disease, liver injury, ischemic stroke, intracerebral hemorrhage, liver fibrosis, diabetes, acute myeloid leukemia, age-related macular degeneration, psoriasis, a hemolytic disorder, or an inflammatory disease.

* * * * *